US012586691B2

(12) United States Patent　　(10) Patent No.: US 12,586,691 B2

Cella　　(45) Date of Patent: *Mar. 24, 2026

(54) NETWORK AND INFORMATION SYSTEMS AND METHODS FOR SHIPYARD MANUFACTURED AND OCEAN DELIVERED NUCLEAR PLATFORM

(71) Applicant: Strong Force IOT Portfolio 2016, LLC, Fort Lauderdale, FL (US)

(72) Inventor: Charles Howard Cella, Pembroke, MA (US)

(73) Assignee: STRONG FORCE IOT PORTFOLIO 2016, LLC, Fort Lauderdale, FL (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/543,260

(22) Filed: Dec. 18, 2023

(65) Prior Publication Data

US 2024/0304349 A1　　Sep. 12, 2024

Related U.S. Application Data

(63) Continuation of application No. 16/578,335, filed on Sep. 21, 2019, now Pat. No. 11,848,113, which is a
(Continued)

(51) Int. Cl.
G21D 1/00　　(2006.01)
B63B 75/00　　(2020.01)
(Continued)

(52) U.S. Cl.
CPC ............... G21D 1/00 (2013.01); B63B 75/00 (2020.01); G21D 3/008 (2013.01); G21D 3/04 (2013.01);
(Continued)

(58) Field of Classification Search
CPC . G21D 1/00; G21D 3/008; G21D 3/04; B63B 75/00; B63B 2035/4446; G21C 13/02; Y02E 30/30; Y02E 30/00
See application file for complete search history.

(56) References Cited

U.S. PATENT DOCUMENTS

| | | | |
|---|---|---|---|
| 3,545,215 | A | 12/1970 | Burrus |
| 3,572,041 | A | 3/1971 | Graaf |
| | | (Continued) | |

FOREIGN PATENT DOCUMENTS

| | | |
|---|---|---|
| CN | 102556293 A | 7/2012 |
| CN | 104299662 A | 1/2015 |
| | (Continued) | |

OTHER PUBLICATIONS

PCT International Search Report and Written Opinion dated Oct. 2, 2018 for International Application No. PCT/US2018/023663, 26 pages.

*Primary Examiner* — Matthew T Largi
(74) *Attorney, Agent, or Firm* — RMCK Law Group, PLC

(57)　　ABSTRACT

The systems and methods generally include a nuclear power plant unit assembled in a shipyard from a plurality of structural modules, each of the structural modules having manufactured components for use in power production when moored or fixed to a floor at least one of in and proximal to at least one of an offshore marine environment, a river environment and a coastal marine environment. The nuclear power plant unit is subdivided into at least one arrangement of structural modules that includes an electrical interface for one of transmitting electrical power generated by the nuclear unit and powering a system of the unit, a communications interface for communications internal or external to the unit, a user interface that is configured to permit a user to access (Continued)

a system of the unit, and a network interface for data communications to or from the unit.

9 Claims, 51 Drawing Sheets

Related U.S. Application Data continuation of application No. PCT/US2018/023663, filed on Mar. 21, 2018.

(60) Provisional application No. 62/532,780, filed on Jul. 14, 2017, provisional application No. 62/527,303, filed on Jun. 30, 2017, provisional application No. 62/474,455, filed on Mar. 21, 2017.

(51) Int. Cl.

| | |
|---|---|
| *G21D 3/00* | (2006.01) |
| *G21D 3/04* | (2006.01) |
| *B63B 35/44* | (2006.01) |
| *G21C 13/02* | (2006.01) |

(52) U.S. Cl.
CPC ...... *B63B 2035/4446* (2013.01); *G21C 13/02* (2013.01); *Y02E 30/30* (2013.01)

(56) References Cited

U.S. PATENT DOCUMENTS

| | | | |
|---|---|---|---|
| 3,608,630 A | | 9/1971 | Wooden et al. |
| 3,794,849 A | | 2/1974 | Perry et al. |
| 3,837,308 A | | 9/1974 | Harvey et al. |
| 3,974,789 A | | 8/1976 | Groot |
| 4,188,157 A | | 2/1980 | Vigander |
| 4,202,648 A | * | 5/1980 | Kvamsdal ............... B63B 35/44 |
| | | | 405/195.1 |
| 4,302,291 A | | 11/1981 | Severs et al. |
| 4,355,001 A | * | 10/1982 | Pierart ................... G21C 13/00 |
| | | | 376/463 |
| 4,436,050 A | | 3/1984 | Liden |
| 4,753,185 A | | 6/1988 | Salusbury-Hughes |
| 4,839,137 A | | 6/1989 | Tower et al. |
| 4,919,882 A | | 4/1990 | Aul et al. |
| 5,036,782 A | | 8/1991 | Linde et al. |
| 5,247,553 A | | 9/1993 | Herring |
| 6,701,861 B2 | | 3/2004 | Key et al. |
| 6,899,049 B2 | | 5/2005 | Gehring |
| 7,575,397 B2 | | 8/2009 | Sharapov |
| 7,872,363 B2 | | 1/2011 | Morse |
| 7,978,806 B1 | | 7/2011 | Hayman |
| 8,567,194 B2 | | 10/2013 | Bailey et al. |
| 8,640,462 B2 | | 2/2014 | Shnell |
| 8,684,630 B2 | | 4/2014 | Mahmoud |
| 8,858,149 B2 | | 10/2014 | Munson, Jr. |
| 8,867,691 B1 | * | 10/2014 | Root ........................ G21D 1/00 |
| | | | 376/277 |
| 9,347,425 B2 | | 5/2016 | Wright |
| 9,493,216 B2 | | 11/2016 | Scott et al. |
| 9,545,980 B2 | | 1/2017 | Morimoto |
| 9,580,150 B2 | | 2/2017 | Lee |
| 9,649,582 B2 | | 5/2017 | Shnell |
| 9,776,689 B2 | | 10/2017 | Lee |
| 9,810,204 B2 | | 11/2017 | Aubault et al. |
| 9,903,647 B2 | | 2/2018 | Scott et al. |

| | | | |
|---|---|---|---|
| 10,196,114 B2 | | 2/2019 | Peace et al. |
| 10,252,777 B2 | | 4/2019 | Hardcastle |
| 10,269,462 B2 | | 4/2019 | Richardson |
| 10,345,050 B2 | | 7/2019 | Pietsch et al. |
| 10,590,918 B2 | | 3/2020 | Cole |
| 10,633,815 B2 | | 4/2020 | Vartdal et al. |
| 10,919,606 B2 | | 2/2021 | Andersen et al. |
| 11,034,418 B2 | | 6/2021 | Lee |
| 11,107,595 B2 | | 8/2021 | Ganesan |
| 2002/0154725 A1 | | 10/2002 | Hayman |
| 2003/0205189 A1 | | 11/2003 | Key et al. |
| 2003/0221603 A1 | | 12/2003 | Horton |
| 2005/0092226 A1 | | 5/2005 | Gehring |
| 2005/0139595 A1 | | 6/2005 | Pepin-Lehalleur et al. |
| 2006/0243186 A1 | | 11/2006 | Park |
| 2008/0038061 A1 | | 2/2008 | Morse |
| 2008/0038067 A1 | | 2/2008 | Sharapov |
| 2008/0304914 A1 | | 12/2008 | Stewart |
| 2009/0103984 A1 | | 4/2009 | Zarisfi |
| 2009/0256421 A1 | | 10/2009 | Chung |
| 2009/0317212 A1 | | 12/2009 | Munson, Jr. |
| 2010/0031652 A1 | | 2/2010 | Shnell |
| 2010/0051624 A1 | | 3/2010 | Finn et al. |
| 2010/0180924 A1 | | 7/2010 | Bailey et al. |
| 2011/0158370 A1 | * | 6/2011 | Morgan ................. B63B 1/107 |
| | | | 405/195.1 |
| 2011/0174206 A1 | | 7/2011 | Kupersmith |
| 2012/0020742 A1 | | 1/2012 | Mahmoud |
| 2013/0032075 A1 | | 2/2013 | Hannus et al. |
| 2013/0036731 A1 | | 2/2013 | Kerckove |
| 2013/0101356 A1 | | 4/2013 | Newcomer |
| 2014/0140466 A1 | | 5/2014 | Richardson |
| 2014/0190899 A1 | | 7/2014 | Shnell |
| 2015/0007763 A1 | | 1/2015 | Morimoto |
| 2015/0088346 A1 | | 3/2015 | Lee |
| 2015/0211477 A1 | | 7/2015 | Wright |
| 2015/0219404 A1 | | 8/2015 | Pietsch et al. |
| 2015/0361948 A1 | | 12/2015 | Schmidt-Boecking et al. |
| 2016/0046354 A1 | | 2/2016 | Scott et al. |
| 2016/0203883 A1 | | 7/2016 | Richardson |
| 2016/0341173 A1 | | 11/2016 | Coulon |
| 2016/0341185 A1 | | 11/2016 | Cole |
| 2016/0369780 A1 | | 12/2016 | Aubault et al. |
| 2017/0016666 A1 | | 1/2017 | Scott et al. |
| 2017/0183062 A1 | | 6/2017 | Lee |
| 2018/0051677 A1 | | 2/2018 | Aubault et al. |
| 2018/0141625 A1 | * | 5/2018 | Peace .................... B63B 39/005 |
| 2018/0163359 A1 | | 6/2018 | Vartdal et al. |
| 2018/0254115 A1 | | 9/2018 | Richardson |
| 2018/0258904 A1 | | 9/2018 | Gorman |
| 2018/0304970 A1 | | 10/2018 | Hardcastle |
| 2019/0308693 A9 | | 10/2019 | Lee |
| 2020/0411204 A1 | * | 12/2020 | Ganesan ................. G21C 11/04 |
| 2020/0411205 A1 | * | 12/2020 | Ganesan .................. G21D 1/00 |
| 2021/0082591 A1 | * | 3/2021 | Cella ....................... B63B 75/00 |
| 2022/0115156 A1 | | 4/2022 | Filippone |
| 2022/0246318 A1 | * | 8/2022 | Castillo .................... G21D 1/00 |
| 2022/0281568 A1 | * | 9/2022 | Trojer .................... G21C 13/02 |

FOREIGN PATENT DOCUMENTS

| | | | |
|---|---|---|---|
| EP | 0061675 A1 | 10/1982 |
| KR | 20090084786 A | 8/2009 |
| KR | 20130062823 A | 6/2013 |
| KR | 20130120129 A | 11/2013 |
| WO | 2013154337 A1 | 10/2013 |

* cited by examiner

1300

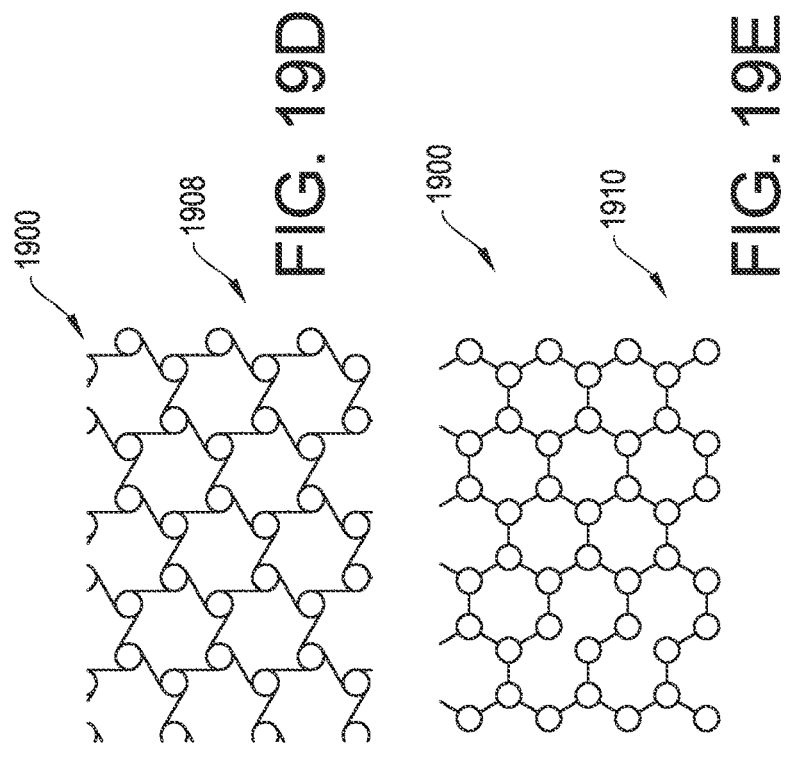
FIG. 19D
FIG. 19E
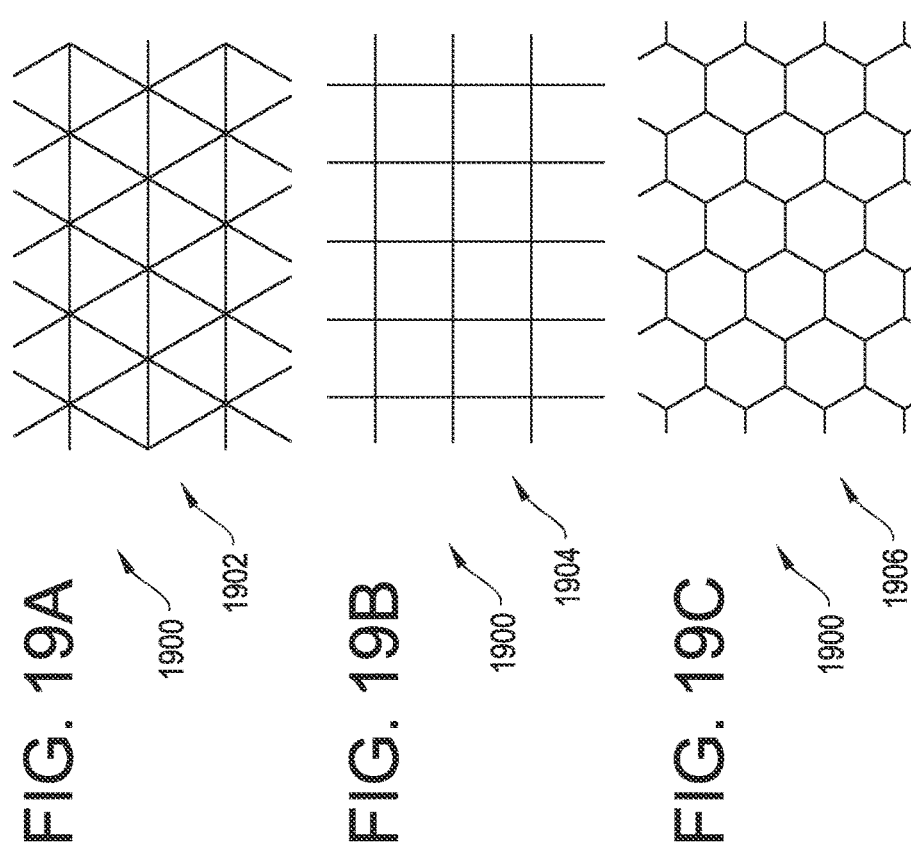
FIG. 19A
FIG. 19B
FIG. 19C

3900

4000

4000

4100

4100

4200

4400

4500

NETWORK AND INFORMATION SYSTEMS AND METHODS FOR SHIPYARD MANUFACTURED AND OCEAN DELIVERED NUCLEAR PLATFORM

CROSS-REFERENCE TO RELATED APPLICATIONS

The present application is a continuation of U.S. patent application Ser. No. 16/578,335, filed Sep. 21, 2019, which is a bypass continuation of International Application number PCT/US2018/023663, filed Mar. 21, 2018, published as WO/2018/175663 on Sep. 27, 2018, and entitled Systems And Methods for Shipyard Manufactured and Ocean Delivered Nuclear Platform, which claims priority to U.S. Provisional Application No. 62/474,455, filed Mar. 21, 2017, entitled Systems and Methods for Shipyard Manufactured and Ocean Delivered Nuclear Platform; U.S. Provisional Application No. 62/527,303, filed Jun. 30, 2017, entitled Systems and Methods for Shipyard Manufactured and Ocean Delivered Nuclear Platform; and U.S. Provisional Application No. 62/532,780, filed Jul. 14, 2017, entitled Systems and Methods for Incorporation of Small Modular Reactors in a Manufactured Nuclear Platform. All of the above applications are hereby incorporated by reference as if set forth herein in their entirety.

FIELD

The present disclosure relates to containment vessel support systems and the deployment, configuration, and modularity of nuclear power plants.

BACKGROUND

Pollution, cost, and other detrimental aspects of fossil fuels have led to an increasing focus on alternative energy sources such as wind, solar, geothermal, hydroelectric, and biofuels as valuable alternatives to fossil fuels: however, there are numerous limitations for renewable energy sources: siting constraints, environmental impacts, limited reliability, and low capacity. Inexorably, the global need for reliable, safe, secure, and inexpensive energy rapidly grows. Consumers of electricity, heat, utilities, and industrial commodities require energy sources that are sustainable, low-cost, produce low carbon emissions, and have high capacity factor. Novel nuclear power plant designs can meet this need. To overcome the drawbacks of earlier designs, such plants should be adaptable to areas with existing grid infrastructure, minimize development footprint (e.g., near expanding coastal population centers), and entail the least possible development of new transmission infrastructure. To be secure and sustainable, they must be robust against potential impacts of climate change, including sea level rise and dwindling supplies of freshwater for cooling. They should also be robust against mechanical failures, malicious attack, human error, and natural disasters, including seismic events and tsunamis. Low population density in proximity to development sites is preferable because it tends to mitigate emergency-planning concerns. Also, novel designs should avoid the exceedingly long lead times for key components that result from complex processes involved in finding and approving suitable sites and from stick-build construction processes that vary from site to site. Site-specific design, approval, and construction processes results in high construction costs and long project durations that make nuclear power projects difficult to finance and insure and more complex to operate. The inventors have identified needs that exist for methods and systems that standardize nuclear power plant site engineering, procurement, and construction, allowing for faster design and deployment to a wider range of potential sites. The inventors have also identified that novel baseload generating sources should complement increasing renewables penetration and provide capacity for load following and alternative product support in the form of process heat generation.

The inventors have recognized that manufactured nuclear plants (MNPs), e.g., nuclear plants partly or wholly manufactured in shipyards and towed to locations on or near shorelines, can meet the whole range of foregoing needs. For example, the inventors have recognized that offshore MNPs they require relatively little onshore land development (mostly for landfall of transmission lines) and are immersed in an inexhaustible supply of coolant water. If floating, they are inherently secure against sea-level rise, the direct impacts of earthquakes, and (if sufficiently far offshore) tsunamis. Security concerns are mitigated by the MNP's open sea-and-air environment, which make any form of approach relatively easy to detect. Also, a structure sealed against the oceanic environment is inherently more difficult to infiltrate, ceteris paribus, than a sprawling terrestrial facility. Further, sectional manufacture and assembly using well-known shipyard techniques can lower MNP cost as compared to terrestrial construction of a comparable-sized plant, because preassembled module size is severely constrained on land by the difficulty of overland transport. Practical shipyard module size for MNP construction is at least an order of magnitude greater than for terrestrial construction, and can be organized on the basis of efficiency and engineering considerations. Additionally, site-specific variations in context (terrain, geohydrology, settlement patterns, etc.), which have invariably raised construction costs for land-based plants despite efforts to standardize designs, are greatly mitigated for MNPs. Also MNPs can be easily relocated at any time (e.g., for re-deployment, in response to changing security concerns, or for transport to a decommissioning location), in contrast to terrestrial nuclear power plants, which are non-relocatable.

Thus, the inventors have recognized that MNPs potentially offer an elegant solution to some of the most intractable costs of conventional, onshore nuclear power plants. MNPs may also be advantageously constructed in a standardized, modular manner using shipyard techniques and towed to its service location, where it may be anchored as a floating unit or grounded in relatively shallow water.

The inventors have recognized the important advent of commercially viable small modular reactors (SMRs). e.g., the NuScale Power Module™, which generates a quantity of steam capable of support an electrical power output of approximately 50 megawatts (MW). SMRs offer a number of potential advantages over the relatively large (i.e., gigawatt-scale) nuclear reactors previously employed for commercial power generation: these advantages include but are not limited to lower accident risk due to passive internal coolant circulation and other features, standardized mass manufacture, adjustment of total generating capacity of a multi-SMR facility by addition or removal of SMRs, swap-out and refueling capability for individual SMRs at a multi-SMR facility without shutdown of the whole facility, and deliverability by truck or barge enabled by small form factor (e.g., 2.7 meters wide by 20 meters high).

To reduce the per-unit cost of electricity from SMRs to competitive levels and thus enable the advantages of SMRs to be fully realized, multiple SMRs will typically be located at single generating facilities. Moreover, it is desirable that the economic and other advantages of MNPs be combined with the advantages of SMRs. However, nuclear power station designs incorporating SMRs into MNPs have not hitherto been disclosed.

There is therefore a need for systems and methods of incorporating SMRs into MNPs.

The prior art has provided for the manufacture of SMRs of various types, and for their deployment, singly or in groups, in nuclear power stations of various configurations. All such deployments and configurations, and the methods by which they are built, are readily distinguishable from the methods and systems of embodiments, as shall be made clear hereinbelow.

In particular, the prior art includes a number of types of constructed sites (a.k.a. "artificial islands") for nuclear power plants either adjacent to, surrounded by, or floating upon bodies of water such as rivers, lakes, or seas: the text Islands for Offshore Nuclear Power (Binnie & Partners. London. 1982), whose contents are incorporated herein by reference, describes a range of such constructed sites, which are further discussed hereinbelow with reference to several of the Figures. Also comprised by the prior art are methods for the delivery of certain components of power plants by flotation to prepared onshore or near-shore sites. The methods of the prior art include the use of dredged channels to enable the delivery of power-plant components to a littoral site where the components may be grounded (e.g., by flooding and filling). The methods of the prior art also include partial disassembly of large reactor containments to enable passage along constrained delivery routes (e.g., the St. Lawrence Seaway): such disassembly requires technically difficult and therefore expensive welding assembly of the unified containment at the final installation site. The methods of the prior art also include the delivery and positioning (e.g., by grounding) of caissons for the construction of breakwaters or protective barriers around such plants. The methods of the prior art also include the deployment of SMRs in common enclosures. e.g., proposals by NuScale Power. Inc. for the colocation of some number of SMRs (e.g., six SMRs) of approximately 50 MW capacity each within a single structure, where the number of SMRs are be immersed in a single coolant pool. Also, the methods of the prior art provide the construction of vertically-oriented floating structures containing nuclear reactors.

All this prior art, as well as prior art not described herein, are fundamentally distinguishable from all of the embodiments. Embodiments comprise systems and methods for the delivery of nuclear generation facilities or portions of such facilities, including but not limited to SMRs, structures to house and service multiple SMRs, and turbine houses, by flotation and/or land transport in a manner that provides for the special security needs of modern nuclear power stations, and exploits the small size and other unique properties of integrated SMRs (e.g., self-containment of cores with primary heat-exchange loops). Embodiments advantageously enable the potential separate delivery by water and/or land of one or more SMRs, reactor house (structure that will house and service the SMRs), turbine house, and aircraft impact shield to offshore, littoral, and coastal sites. Moreover, embodiments include racked or arrayed SMRs in configurations that obviate the use of a single, massive aircraft impact shield structure custom-built onsite in favor of a relatively low-profile shield structure that can be assembled onsite from sub-modules, or delivered as a module, and readily mated with a flotation-delivered plant structures. These and other distinguishing aspects of embodiments along with various advantages will be clarified hereinbelow with reference to the Figures.

SUMMARY

Provided herein are methods, systems, components and the like for design, development, delivery, deployment and operation of nuclear power plants, including offshore nuclear power (ONP) units that are designed to be assembled in a shipyard from standardized, manufactured components and floated to a marine environment where they are operated to produce electricity for delivery to an electrical grid and/or for other purposes, such as to enable various industrial, agricultural or other processes and/or to enable production of various products. In embodiments, the term "ONP." may be understood to encompass, except where context indicates otherwise, such an offshore nuclear platform, which in embodiments is assembled in a shipyard, primarily from manufactured components, and floated to a marine site where it will produce electricity or other products. The marine site may be an offshore site, a coastal site, a near shore site, or a cove, bay, inlet, or harbor (which may include a harbor created for the ONP). An individual ONP or "unit" typically contains one or more nuclear reactors, a turbine generator set, and associated systems for navigation, cooling, control, safety, power transmission, crew maintenance, and other functions. Units may be deployed in a variety of arrangements. e.g., as solitary units or in clusters. Unit deployment occurs in a complex environment having physical, economic, regulatory, political, military, and other facets that motivate implementation of both necessary and desirable system capabilities while constraining provision of those capabilities. Embodiments of the disclosure enable the provision of ONP capabilities within various constraints in a more economical manner than is enabled by the prior art.

The prior art includes methods for constructing terrestrial reactor systems and ocean-going reactors for vessel propulsive power (e.g., in submarines). Terrestrial reactor systems would realize no advantage from vertically stacking major components (e.g., core, condenser, turbine house) and have not been so constructed. Extant naval reactors have also enjoyed relatively unconstrained linear, horizontal placement of reactor subsystems due to the small size of such reactors compared to typical ONPs including embodiments of the disclosure. The prior art also includes designs for ONPs such as the U.S.S. Sturgis MH-1A floating nuclear power plant (c. 1968-76) and recent Russian and Chinese design proposals. Such designs have featured the mounting of relatively small reactors (e.g., ~ 10-100 MW) in repurposed naval vessels or barge-like structures. None of these designs include inventive arrangements similar to those described herein. Nor do any of the methods of the prior art employ the fully modularized approach to construction described herein, which is employed in the assembly of some ONPs, in accordance with the many embodiments of the present disclosure.

The ONP may take various forms and may include various modules that are designed with interfaces that allow the modules to interconnect and interoperate. In embodiments, the term "form." may be understood to encompass, except where context indicates otherwise, a visible shape, arrangement or configuration of a frame, housing, infrastructure, superstructure, skeleton, foundation, or the like in or on which a system or component is shaped, mounted, or installed. In embodiments, the term "module." such as in reference to one or more structural modules of an ONP unit, may be understood to encompass, except where context indicates otherwise, a set of parts and components configured to facilitate the operation of systems theron located that can be used to construct a more complex structure, optionally assembled in shipyards, taking the form of, for example, skids, panels, blocks and megablocks.

In embodiments, the term "system" may be understood to encompass, except where context indicates otherwise, a set of interacting components, processes, services, units, or the like, such as located on one or more structural modules that enables a capability of or for an ONP unit or performs a function of interest. A system may include various subsystems and components, which may include hardware elements, software elements, data communication elements, electrical elements, elements for handling fluids, elements for handling heat, and many other functions. Systems may include interfaces, such as among sub-systems and components and with other systems that enable the foregoing. Among other systems, systems disclosed herein may include auxiliary systems, plant systems (such as nuclear plant systems), marine systems, contingency systems (including emergency systems), defense systems, control systems, integral systems, accessory systems, associated systems, and interface systems.

In embodiments, the term "unit" may be understood to encompass, except where context indicates otherwise, an individual thing regarded as single and complete, such as for accomplishing a defined function or purpose, but embodiments referring to units should be understood to encompass multiple units except where context indicates otherwise. In embodiments, the terms "ONP unit" and/or "the unit." may be understood to encompass, except where context indicates otherwise, a structure containing a nuclear power plant capable of being deployed to and operating in a marine environment, such as assembled in a dry-dock or other berth at a shipyard and floated to a site where it will produce electricity or other products.

In embodiments, the term "capability," may be understood to encompass, except where context indicates otherwise, the characteristics of a system that make it useful for an indicated use, process, function, application, or deployment.

In embodiments, the term "constraint" may be understood to encompass, except where context indicates otherwise, a limitation or restriction imposed by the unit environment on ONP unit systems.

In embodiments, the terms "unit environment" and "site" may be understood to encompass, except where context indicates otherwise, the location, surroundings and/or conditions in which an ONP 1000 unit is situated and operates, such as to produce power. The unit's environment may be defined by the capabilities that various stakeholders require, as well as the physical constraints of the environment, such as a marine environment.

In embodiments, the term "unit deployment" may be understood to encompass, except where context indicates otherwise, (system configurations) is a configuration of the structural modules and nuclear, marine, accessory, and contingency systems arranged as a unit superstructure that satisfies the requirements of a unit environment.

In embodiments, the term "function of interest" may be understood to encompass, except where context indicates otherwise, an action, process, or capability involved in the lifecycle of nuclear power plants and marine vessels performed by systems on, interfacing, or associated with one or more ONP Units.

In embodiments, improved containment support structures are provided for an ONP that may be produced from manufacturing materials such as metals or alloys, such as steel, including cellular lattice support structures and columnar support structures. Methods of assembling such structures may include robotic assembly, such as with a special purpose robot that is configured to be disposed within a cell of a cellular lattice.

In embodiments, an offshore nuclear power unit is provided, which may include a cylindrical containment vessel having a shell for containing pressure and radioactivity of a nuclear reactor; and a support structure configured to transfer load from the shell of the containment vessel shell to the hull of the offshore nuclear power unit. In embodiments, the support structure is made of at least one of a metal and an alloy. In embodiments, the support structure is made of steel. In embodiments, the support structure is a regular cellular lattice structure. In embodiments, the cellular lattice structure is a hexagonal lattice structure. In embodiments, the cellular lattice structure is a rectangular lattice structure. In embodiments, the cellular lattice structure is a triangular lattice structure. In embodiments, the support structure is an irregular cellular lattice structure. In embodiments, the support structure is a cellular lattice structure and in embodiments the lattice includes a support column positioned at a vertex of the lattice. In embodiments, the support structure is a cellular lattice structure, which in embodiments is welded. In embodiments, a robotic welding machine is configured to be disposed in a cell of the cellular lattice to weld the lattice.

In embodiments, the support structure is a columnar structure. In embodiments, the columnar structure is a rectangular columnar structure. In embodiments, the columnar structure is a cylindrical columnar structure. In embodiments, the support structure includes an interface element configured to interface with the curvature of the containment vessel.

Provided herein are methods and systems for the incorporation of small modular reactors (SMRs) into manufactured nuclear plants. Embodiments include nuclear installations comprising manufactured facilities manufactured in a standardized manner and delivered by flotation to a prepared littoral or offshore site, where such a facility preferably houses a number of SMRs.

The prior art has provided for the manufacture of SMRs of various types, and for their deployment, singly or in groups, in nuclear power stations of various configurations. All such deployments and configurations, and the methods by which they are built, are readily distinguishable from the methods and systems of many embodiments, as shall be made clear hereinbelow.

In particular, the prior art includes a number of types of constructed sites (a.k.a. "artificial islands") for nuclear power plants either adjacent to, surrounded by, or floating upon bodies of water such as rivers, lakes, or seas: the text Islands for Offshore Nuclear Power (Binnie & Partners. London. 1982), whose contents are incorporated herein by reference, describes a range of such constructed sites, which are further discussed hereinbelow with reference to several of the Figures. Also comprised by the prior art are methods for the delivery of certain components of power plants by flotation to prepared onshore or near-shore sites. The methods of the prior art include the use of dredged channels to enable the delivery of power-plant components to a littoral site where the components may be grounded (e.g., by flooding and filling). The methods of the prior art also include partial disassembly of large reactor containments to enable passage along constrained delivery routes (e.g., the St. Lawrence Seaway): such disassembly requires technically difficult and therefore expensive welding assembly of the unified containment at the final installation site. The methods of the prior art also include the delivery and positioning (e.g., by grounding) of caissons for the construction of breakwaters or protective barriers around such plants. The methods of the prior art also include the deployment of SMRs in common enclosures. e.g., proposals by NuScale Power. Inc. for the colocation of some number of SMRs (e.g., six SMRs) of approximately 50 MW capacity each within a single structure, where the number of SMRs are be immersed in a single coolant pool. Also, the methods of the prior art provide the construction of vertically-oriented floating structures containing nuclear reactors.

All this prior art, as well as prior art not described herein, are fundamentally distinguishable from the various embodiments. The many embodiments include systems and methods for the delivery of nuclear generation facilities or portions of such facilities, including but not limited to SMRs, structures to house and service multiple SMRs, and turbine houses, by flotation and/or land transport in a manner that provides for the special security needs of modern nuclear power stations, and exploits the small size and other unique properties of integrated SMRs (e.g., self-containment of cores with primary heat-exchange loops). The many embodiments advantageously enable the potential separate delivery by water and/or land of one or more SMRs, reactor house (structure that will house and service the SMRs), turbine house, and aircraft impact shield to offshore, littoral, and coastal sites. Moreover, the many embodiments include racked or arrayed SMRs in configurations that obviate the use of a single, massive aircraft impact shield structure custom-built onsite in favor of a relatively low-profile shield structure that can be assembled onsite from sub-modules, or delivered as a module, and readily mated with a flotation-delivered plant structures.

Of note, a system of terminology has been adopted herein that serves to succinctly classify various units of the many embodiments. A table of symbols used herein to denote unit types is as follows, ordered approximately by decreasing frequency of use:

| M | manufactured | MNPP | manufactured nuclear [plant plus] power plant | R | reactor |
|---|---|---|---|---|---|
| N | nuclear | D | docked | GC | gas cooled |
| MP | manufactured plant | B | Basin | BW | boiling water |
| N | nuclear | M | marine | PW | pressurized water |
| NP | nuclear plant | F | floating | S | steam |
| P | plant | A | agriculture | SS | supply system |
| PP | power plant (energy conversion system) | DS | desalination | | |
| MNP | manufactured nuclear plant | CP | carbon producing | | |

Numbers appended to unit names typically describe the power output of the unit configuration: e.g., "1100" designates a unit having 1100 MWe output from a single reactor, and "12×50" designates a unit comprising 12 SMRs of 50 MWe output apiece or a power plant (PP) comprising 12 50-MW turbogenerators.

Exemplary applications of this terminology are as follows:

MNPP-F PWR 1100: A manufactured nuclear power plant which floats in deep water

MNP-D PWR 12×50: A docked MNP comprising 12 50-MWe self-contained SMRs.

MPP-D 12×50: A docked PP (i.e., power conversion system: e.g., turbogenerators and condensers) that would pair with the MNP-D PWR/BWR 12×50 at deployment sites where an existing turbine hall was not being refurbished.

MNP-D BWR 2×1350: A docked MNP (i.e., the nuclear steam supply system and auxiliary systems only): could supply steam to a refurbished turbine hall.

MNPP-D BWR 6×1700: An MNP comprising a PP for deployment at an artificial island.

MNP-D GCR 600: An MNP in which the NSSS is driven by a gas ($CO_2$/He)—cooled reactor core (prismatic or spherical fuel) and operates at sufficient steam temperature to easily retrofit any existing fossil fuel plant steam turbine system designed for supercritical/superheated steam. Many plants at ~600 MWe exist worldwide.

MNPP-F PWR 2×50: A unit comprising two small, self-contained SMRs: likely attractive to the military for powering remote bases on islands. Designed to pair with a number of other units similarly designed to be deployed to remote and/or temporary sites.

MPCP-F 50: A Unit comprising a small carbon-based fuel production plant. e.g., one that generates hydrocarbons from water using extracted oceanic $CO_2$.

MDSP-F 10: A small desalination plant designed to be deployed to remote and/or temporary sites.

MAP-F 10: A deepwater floating mariculture plant that uses beat and electricity from MNP or MNPP to circulate and fertilize a fish farming operation. (i.e., water column circulation, fertilizer addition.

In embodiments, a system includes a nuclear power plant unit, that is assembled in a shipyard from a plurality of structural modules, each of the structural modules having manufactured components for use in power production when moored or fixed to a floor at least one of in and proximal to at least one of an offshore marine environment, a river environment and a coastal marine environment. The nuclear power plant unit is subdivided into at least one arrangement of structural modules.

In embodiments, at least one of the plurality of structural modules is selected from the group consisting of a skid module, a panel, and a deck assembly. In embodiments, at least one of the plurality of structural modules is selected from the group consisting of a heat transport and reactor module: at least one nuclear reactor module selected from the group consisting of a single reactor module and a multiple reactor module: a power conversion module: a balance-of-plant module: a containment module for containing radioactivity: an upper hull module: a lower hull module: a fore hull module: an aft hull module; and a barge docking module. In embodiments, at least one of the plurality of structural modules is selected from the group consisting of an electricity generation and transformation module: an emergency electrical module; a heat transport module: a turbine and condenser module: a spent fuel storage module: a nuclear fuel module: a chemical volume control module: a crew and accommodations module: an evacuation and health physics module: an external access and security module: a ballast tank module: a side hull module: a water intake structure module: a stability skirt module: a base-plate module: a propulsion module for moving the platform: a reactor support module: a reactor operations module: a marine operations module: a mooring module: a seafloor mounting foundation module; a control room module; and a data acquisition module. In embodiments, at least one of the plurality of structural modules is a skid structural module selected from the group consisting of a turbine module: a condenser module; and a vertical object transport module. In embodiments, the skid structural modules are configured to be connected for installation by skidding them horizontally relative to each other after transport. In embodiments, at least one of the plurality of structural modules is a panel structural module configured to provide a separation between other modules of the unit.

In embodiments, the unit further at least one of includes and interoperates with at least one operational system selected from the group consisting of a nuclear fuel system: a refueling system, a control system for at least one component of the unit: a communications system: a cyber security system: a spent fuel transport system: a cooling system: an emergency cooling system: a defense system: a storm mitigation system: an earthquake mitigation system: a tsunami mitigation system: an assembly system: a module arrangement system: a module manufacturing system: a component manufacturing system: an environmental impact mitigation system: a thermal handling system: a supply/logistics system; and a decommissioning system. In embodiments, the unit at least one of has and interoperates with at least one accessory system selected from the group consisting of a mooring system for mooring the platform for power production: a foundation system for attaching the platform to a floor of the environment in which it is located: a ballast system for stabilizing at least one of the platform and a component of the unit: at least one bearing system for bearing at least one of a deck module and a component of the unit: an internal transport system for transporting items on the unit: an external transport system for moving items between the unit and an external position: a barge system: a remote control system for at least one of at deck module and a component of the unit: a remote defense system for providing defense for the unit: a reporting system: a regulatory compliance system: a desalination system: a process heat system and a skid module. In embodiments, the unit includes at least one emergency system selected from the group consisting of an emergency cooling system, a passive defense system, an active defense system, a pressure containment system and a pressure suppression system.

In embodiments, the unit includes at least one of a plurality of interfaces selected from the group consisting of: an electrical interface selected from the group consisting of:

an interface for transmitting electrical power generated by the nuclear unit and an electrical interface for powering a system of the unit: a communications interface comprising at least one of an interface for communications internal to the unit and an interface for communications external to the unit: a user interface for allowing a user to access a system of the unit, a network interface for data communications: a physical interface for connecting structural elements of the unit: a fluid handling interface: a control interface for controlling at least one component of the platform: a hull interface: a sea interface; a personnel transport interface; and a component transport interface.

In embodiments, the unit includes at least one of a plurality of courses for the movement of items selected from the group consisting of: one or more conduits for transporting fluids, the fluids selected from the group consisting of one or more cooling fluids, one or more heated fluids used for steam generation of power, one or more condensed fluids and one or more emergency cooling fluids: one or more passageways for movement of personnel: one or more conduits for transporting fuel: one or more conduits for transporting spent fuel; and one or more passageways for moving components for maintenance, repair or replacement.

In embodiments, the one or more conduits is formed by the arrangement of the structural modules. In embodiments, the one or more conduits is formed between at least two structural modules when the modules are installed after transport of the unit. In embodiments, the unit is subdivided into at least one arrangement for transport and is configured for rearrangement of a plurality of structural modules for installation at a site in the environment. In embodiments, the unit is subdivided into at least one arrangement at the start of transport and is configured for rearrangement of a plurality of structural modules during transport. In embodiments, the unit is assembled in an arrangement of structural modules consisting of at least one of a substantially vertical arrangement: a substantially horizontal arrangement: a substantially cylindrical arrangement: a substantially rectangular solid arrangement: an arrangement in which modules are moveable between an intermediate arrangement for transport and a final arrangement for moored power production: an arrangement in which modules are configured as a set of wedge-shaped modules: an arrangement in which the modules are configured to enable interconnection in alternative geometries based on at least one functional requirement for the platform.

The functional requirement is selected from the group consisting of a regulatory requirement, a constraint on shipyard size, a constraint on depth during transportation: a constraint on height during transportation: a water-level requirement and a power output requirement: an arrangement in which at least one component contained in at least one of the modules is configured to enable interconnection of components in alternative geometries based on at least one functional requirement for the platform. The functional requirement is selected from the group consisting of a regulatory requirement, a constraint on shipyard size, a constraint on depth during transportation, a constraint on height during transportation, a water level requirement and a power output requirement, an arrangement in which modules are configured to place modules in preferred locations relative to a water level of the environment when the unit is positioned to generate power; a floating arrangement: a moored arrangement; and a seafloor mounted arrangement.

In embodiments, a platform includes a nuclear power platform assembled by arranging a plurality of modules of integrated manufactured components for use in electricity power generation when the platform is at least one of moored, mounted and fixed to a surface at least one of in and in proximity to at least one marine environment selected from the group consisting of an offshore marine environment, a coastal marine environment, a lake marine environment and a river marine environment.

In embodiments, the platform is assembled at least in part in a shipyard for shipping to the marine environment. In embodiments, the platform has a hull infrastructure configured for arrangement of the plurality of deck modules for transport and for installation at a site in the marine environment. In embodiments, the platform has a double hull infrastructure configured for supporting an arrangement of a plurality of deck modules. In embodiments, the platform has at least two deck modules selected from the group consisting of a heat transport and reactor module; a heat transport module: at least one nuclear reactor module selected from the group consisting of a single reactor module and a multiple reactor module: an electricity generation module: a turbine and condenser module for converting steam to electrical power: a balance-of-plant module for converting heat to electrical power: a containment module for containing radioactivity: a spent fuel storage module: a crew and accommodations module: a control room module: a top deck module: a floatation module for enabling the platform to float; and a propulsion module for moving the platform.

In embodiments, the platform has at least one hull module consisting of at least one of an upper hull module: a lower hull module: a fore hull module: an aft hull module; and a barge docking module. In embodiments, the platform has at least one module selected from the group consisting of an electricity generation and transformation module: an emergency electrical module: a heat transport module: a turbine and condenser module: a spent fuel storage module: a nuclear fuel module: a chemical volume control module: a crew and accommodations module: an evacuation and health physics module: an external access and security module: a ballast tank module: a side hull module: a water intake structure module: a stability skirt module; a base-plate module: a propulsion module for moving the platform: a reactor support module: a reactor operations module: a marine operations module; a mooring module: a seafloor mounting foundation module: a control room module; and a data acquisition module.

In embodiments, the platform has a power conversion mega-block module consisting of a turbine and condenser block module and an electrical generation and transformation block module. In embodiments, the platform has a nuclear mega-block module consisting of a plurality of blocks each having at least one reactor. In embodiments, the platform has a nuclear mega-block module having a plurality of modules selected from among a containment block module: reactor support system block modules: a cooling system block module: a nuclear fuel block module: a chemical volume control system block module; and an emergency electrical block module. In embodiments, the platform has a personnel mega-block module that includes a crew accommodation block module: an evacuation and health physics block module and an external access and security block module. In embodiments, the platform has the personnel mega-block module is an upper hull module. In embodiments, the platform has a lower hull mega block module consisting of a plurality of block modules selected form the group consisting of a stability skirt block module, a water intake block module, a side hull module, a ballast tank module, and a base plate block module.

In embodiments, the platform has a power conversion block module having a turbine deck module, a turbine skid module, and a condenser deck module. In embodiments, the platform has a routing system consisting of a physical path through the structure of the platform and allowing the interfacing of a plurality of systems within the platform. In embodiments, the routing system is at least one of a pipe routing system, a cable tray routing system, a coolant routing system, a utility routing system, an equipment transport routing system, and a human routing system. In embodiments, the platform has a heat transport and reactor module that is configured to enable emergency cooling by water from the marine environment.

In embodiments, the platform has a plurality of reactor modules configured to feed a common heat transport system. In embodiments, the platform has a heat transport and reactor module that positions a steam turbine and compressor facility on a deck that is above the reactor. In embodiments, the platform has a plurality of heat pipes reaching into the reactor core to assist with cooling the core. In embodiments, the platform has a nuclear reactor using a heat-tolerant fuel for the reactor. In embodiments, the fuel is silicon carbide. In embodiments, the platform has a heat transport module that is configured to transport heat vertically from a nuclear reactor to a turbine and compressor facility: In embodiments, the platform has at least one nuclear reactor module selected from the group consisting of a single reactor module and a multiple reactor module. In embodiments, the platform has an electricity generation module. In embodiments, the platform has a turbine and condenser module for converting steam to electrical power. In embodiments, the platform has a balance-of-plant module for converting heat to electrical power. In embodiments, the platform has a containment module for containing radioactivity wherein the containment is configured to store spent fuel. In embodiments, the platform has a containment module for containing radioactivity wherein the containment is configured with dual walls configured to include a flooded region there between.

In embodiments, the platform has a containment module for containing radioactivity wherein the containment has a double wall with structural support members that are designed to support the containment wall while allowing thermal expansion upon heating. In embodiments, the platform has a containment module for containing radioactivity wherein the containment has in-wall tubing for handling pressure. In embodiments, the platform has a containment module for containing radioactivity wherein the containment has a plurality of elements configured to accept and dissipate thermal energy. In embodiments, the platform has a containment module for containing radioactivity wherein the containment is configured to be cooled by circulating water. In embodiments, the platform has a containment module for containing radioactivity wherein the containment is configured to be cooled by a passive cooling facility. In embodiments, the platform has a containment module for containing radioactivity wherein the containment is configured to be cooled by a passive cooling facility that includes circulating water that is moved by natural circulation based on a thermal gradient in the surrounding marine environment. In embodiments, the platform has a containment module for containing radioactivity wherein the containment is cylindrically configured to contain a substantially cylindrical nuclear reactor. In embodiments, the platform has a containment module for containing radioactivity wherein the containment is configured rectangularly.

In embodiments, the platform has a containment module for containing radioactivity wherein the containment is configured as a low-volume, high pressure containment facility having a facility for managing pressure within the containment. In embodiments, the platform has a containment module for containing radioactivity wherein the containment is configured as a low-volume, high pressure containment facility having a set of pipes for releasing pressure through flooded containment walls for managing pressure within the containment. In embodiments, the platform has a containment module for containing radioactivity wherein the containment is configured as a low-volume, high pressure containment facility having containment walls that are adapted to handle high pressure and having thermal sinks to absorb heat from the containment to reduce the pressure in the containment. In embodiments, the platform has a containment module for containing radioactivity wherein the containment is configured as a low-volume, high pressure containment facility having blocks of perforated solid salts that are in thermal contact with the containment and that melt at appropriate pressures to absorb heat from the containment. In embodiments, the salts melt in the range of 80-150 degrees C. In embodiments, the salts are selected from the group consisting of lead bismuth, and sodium metals.

In embodiments, the platform has a containment module for containing radioactivity wherein the containment is configured as a low-volume, low-flammability, high pressure containment facility having a low volatility, low-corrosive phase change material that is solid during normal operating conditions and liquid in the case of elevated temperatures in order to absorb heat without producing substantial amounts of steam to absorb heat from the containment. In embodiments, the platform has a containment module for containing radioactivity wherein the containment is configured as a low-volume, high pressure containment facility having ice condensers for taking heat from the containment to reduce pressure in the containment. In embodiments, the platform has a catalytic containment coating for reducing hydrogen concentration in the containment. In embodiments, the coating includes at least one of palladium and platinum. In embodiments, the platform has a passive recombiner for reducing hydrogen concentration in the containment. The passive recombiner is coated with a catalytic material. In embodiments, the platform has a facility for flooding the containment for a nuclear reactor with a nano-fluid to enhance in-vessel retention of a molten core in the case of an accident. In embodiments, the platform has a water-shielded containment for a nuclear reactor. In embodiments, the platform has a double walled containment for a nuclear reactor, wherein internal walls provide radioactive shielding for a reactor vessel, and wherein a fluid having thermal capacity is provided between internal and external walls. The double walled structure is configured with structural supports that handle pressure when the space between the walls is flooded with the fluid.

In embodiments, the platform has a double walled containment for a nuclear reactor, wherein internal walls provide radioactive shielding for a reactor vessel. A fluid having thermal capacity is provided between internal and external walls. The double walled containment structure is provided with containment vessel shielding. In embodiments, the platform has a double walled containment for a nuclear reactor, wherein internal walls provide radioactive shielding for a reactor vessel. A fluid having thermal capacity is provided between internal and external walls. The double walled structure is configured with structural supports that handle pressure when the space between the walls is flooded with the fluid. The fluid between the walls can be drained under power of gravity to augment absorption of heat from the reactor core in the case of an accident. In embodiments, the platform has a double walled containment for a nuclear reactor, wherein internal walls provide radioactive shielding for a reactor vessel. A fluid having thermal capacity is provided between internal and external walls. The double walled structure is positioned with the hull of the platform to facilitate transmission of heat from the containment through the hull to the marine environment of the platform. In embodiments, the platform has a double walled containment for a nuclear reactor, wherein internal walls provide radioactive shielding for a reactor vessel. A fluid having thermal capacity is provided between internal and external walls. A natural circulation path is configured to circulate the fluid to remove heat from the containment.

In embodiments, the platform has a spent fuel storage module for storing spent fuel that accumulates after power generation. In embodiments, the platform has a crew and accommodations module for accommodating the human crew that operates the platform. In embodiments, the platform has a control room module that includes control interfaces for onboard control of operations of the platform. In embodiments, the platform has a top deck module. In embodiments, the platform has a flotation module for enabling the platform to float. In embodiments, the platform has a propulsion module for moving the platform. In embodiments, the propulsion module is an emergency propulsion module for collision avoidance.

In embodiments, the platform further at least one of includes and interoperates with at least one operational facility selected from the group consisting of a nuclear fuel: a refueling facility: a control facility for at least one component: a communications facility: a cyber security facility: a refueling facility: a spent fuel transport facility: a cooling facility: an emergency cooling facility: a defense facility: a storm mitigation facility: an earthquake mitigation facility: a tsunami mitigation facility: an assembly facility: a module arrangement facility: a module manufacturing facility: a component manufacturing facility: an environmental impact mitigation facility: a thermal handling facility: a supply/logistics facility: a decommissioning facility; and a desalination facility. In embodiments, the platform has a nuclear fuel facility selected from the group consisting of an oxide fuel, a uranium oxide (UOX) fuel, uranium dioxide fuel, a plutonium-uranium mixed fuel, a mixed oxide (MOX) fuel, a metal fuel, uranium zirconium hydride fuel, a Training-Research-Isotopes-General Atomics™ (TRIGA) fuel, actinide fuel, molten plutonium fuel, a ceramic fuel, uranium nitride fuel, uranium carbide fuel, a liquid fuel, a molten salt fuel, an aqueous solution fuel, a uranyl salt fuel, a pressurized water reactor (PWR) fuel, a boiling water reactor (BWR) fuel, heavy water reactor fuel, a deuterium uranium fuel, a Canadian deuterium uranium (CANDU) fuel, a magnox fuel, a tristructural isotropic (TRISO) fuel, a quadruple isotropic (QUADRISO) fuel, a high-power channel reactor fuel, a reaktor bolshoy moshchnosty kanalny (RBMK) fuel, a ceramic-metallic (CerMet) fuel, a spherical Cermet fuel, a plate-type fuel, a sodium-bonded fuel, and a fusion fuel. In embodiments, the platform has a refueling facility that includes refueling water that is cooled by thermal exchange with the marine environment of the platform. In embodiments, the platform has a refueling facility that includes refueling water that is cooled by a plurality of structural components that are configured to transfer heat to the marine environment. In embodiments, the structural components include at least one of a fin, a vane, a honeycomb, and a biomimetic heat dissipation structure. In embodiments, the platform has a control facility for at least one component.

In embodiments, the platform has a communications facility for enabling communications at least one of within the platform and between the platform and an external point of communications. In embodiments, the platform has a cyber security facility. In embodiments, the platform has a refueling facility. In embodiments, the platform has a spent fuel transport facility configured to move spent fuel from a reactor to a spent fuel storage facility. The transport facility includes a refrigerated sleeve for keeping the spent fuel cool during transport. In embodiments, the platform has a spent fuel transport facility configured to move spent fuel from a reactor to a spent fuel storage facility. The transport facility includes a cart and rail facility for moving the spent fuel. In embodiments, the platform has a cooling facility. In embodiments, the platform has an emergency cooling facility. In embodiments, the emergency cooling facility uses water from the marine environment for emergency cooling. In embodiments, the platform has a defense facility. In embodiments, the platform has a storm mitigation facility. In embodiments, the platform has an earthquake mitigation facility. The earthquake mitigation facility includes a seismic isolation facility.

In embodiments, the platform has an earthquake mitigation facility. The earthquake mitigation facility includes a seismic isolation facility. The seismic isolation facility is disposed on a base mat in the sea floor between the sea floor and the foundation of the platform. In embodiments, the platform has an earthquake mitigation facility. The earthquake mitigation facility includes a seismic isolation facility that is deployed at least in part by a base mat barge. In embodiments, the platform has an earthquake mitigation facility. The earthquake mitigation facility includes a seismic isolation facility. The seismic isolation facility is configured to provide isolation from the impact of wave action. In embodiments, the platform has an earthquake mitigation facility. The earthquake mitigation facility includes a seismic isolation facility. The seismic isolation facility can support tension loads. In embodiments, the platform has an earthquake mitigation facility. The earthquake mitigation facility includes a seismic isolation facility. The seismic isolation facility is a seismic pendulum that can support tension loads. In embodiments, the platform has an earthquake mitigation facility. The earthquake mitigation facility includes a seismic isolation facility. The seismic isolation facility is a barge-deployed seismic isolation bearing configured for an environment and positioned to support an offshore nuclear platform. In embodiments, the platform has a Tsunami mitigation facility. In embodiments, the platform has an assembly facility for enabling assembly of at least one structural module of the platform. In embodiments, the platform has a module arrangement facility for arranging the modules into a structural arrangement. In embodiments, the module arrangement facility is selected from the group consisting of a crane, a lift, an elevator, a skid, a rail system, a hydraulic system, a magnetic levitation system, a screw drive system, a hauling system, and a pushing system.

In embodiments, the platform has a module manufacturing facility. In embodiments, the module manufacturing facility includes at least one of a robotic manufacturing system, an assembly line system, and a machine vision system. In embodiments, the platform has a component manufacturing facility. In embodiments, the platform has an environmental impact mitigation facility. The impact mitigation facility is configured to disperse cooling water at a selectable depth based on the temperature of the water in the marine environment. In embodiments, the platform has a thermal handling facility. In embodiments, the platform has a supply/logistics facility. In embodiments, the platform has a decommissioning facility. In embodiments, the platform has at least one of a decontamination facility and a desalination facility for removing at least one of a salt and a pollutant from water of the marine environment.

In embodiments, the platform further at least one of has and interoperates with at least one accessory facility selected from the group consisting of a mooring facility for mooring the platform for power production: a foundation facility for attaching the platform to a floor of the environment in which it is located: a ballast facility for stabilizing at least one of the platform and a component of the platform: at least one bearing facility for bearing at least one of a deck module and a component of the platform: an internal transport facility for transporting items on the platform: an external transport facility for moving items between the platform and an external position: a barge facility: a remote control facility for at least one of at deck module and a component of the platform: a remote defense facility for providing defense for the platform: a reporting facility; and a regulatory compliance facility. In embodiments, the platform has a mooring facility for mooring the platform for power production. In embodiments, the platform has a foundation facility for attaching the platform to a floor of the environment in which it is located. In embodiments, the platform has a ballast facility for stabilizing at least one of the platform and a component of the platform. In embodiments, the platform has at least one bearing facility for bearing at least one of a deck module and a component of the platform. In embodiments, the platform has an internal transport facility for transporting items on the platform; an external transport facility for moving items between the platform and an external position. In embodiments, the platform has a barge facility. In embodiments, the platform has a remote control facility for at least one of at deck module and a component of the platform. In embodiments, the platform has a remote defense facility for providing defense for the platform. In embodiments, the platform has a reporting facility. In embodiments, the platform has a regulatory compliance facility. In embodiments, the platform includes at least one emergency facility selected from the group consisting of an emergency cooling facility: a passive defense facility; and an active defense facility. In embodiments, the platform has an emergency cooling facility. In embodiments, the platform has a passive defense facility. In embodiments, the platform has an active defense facility.

In embodiments, the platform includes at least one of a plurality of interfaces selected from the group consisting of an electrical interface selected from the group consisting of an interface for transmitting electrical power generated by the nuclear platform and an electrical interface for powering a facility of the nuclear power platform: a communications interface comprising at least one of an interface for communications internal to the platform and an interface for communications external to the platform: a network interface for data communications: a physical interface: a fluid handling interface: a control interface for controlling at least one component of the platform: a hull interface: a sea interface: a personnel transport interface; and a component transport interface. In embodiments, the platform has an electrical interface selected from the group consisting of an interface for transmitting electrical power generated by the nuclear platform and an electrical interface for powering a facility of the nuclear power platform. In embodiments, the platform has a communications interface comprising at least one of an interface for communications internal to the platform and an interface for communications external to the platform. In embodiments, the platform has a network interface for data communications. In embodiments, the platform has a physical interface for physically interconnecting at least one of a structural module with another structural module and a block of a structural module with another block of a structural module. In embodiments, the platform has a fluid handling interface. In embodiments, the platform has a control interface for controlling at least one component of the platform. In embodiments, the platform has a hull interface that provides an interface of the hull of the platform to at least a portion of the marine environment. In embodiments, the platform has a sea interface that provides an interface to an underwater portion of a marine environment. In embodiments, the sea interface allows movement of water between the platform and the marine environment while blocking at least one contaminant from moving across the sea interface. In embodiments, the platform has a personnel transport interface whereby personnel may enter or exit the platform. In embodiments, the platform has a component transport interface whereby at least one component may be transported to or from the platform.

In embodiments, the platform includes at least one of a plurality of routes for the movement of things selected from the group consisting of one or more conduits for transporting fluids: a cooling fluid conduit: a conduit for a heated fluid used for steam generation of power: a conduit for condensed fluid: an emergency cooling fluid conduit: one or more passageways for movement of personnel: one or more conduits for transporting fuel: one or more conduits for transporting spent fuel; and one or more passageways for moving components for maintenance, repair or replacement. In embodiments, the platform has one or more conduits for transporting fluids. In embodiments, the platform has a cooling fluid conduit. In embodiments, the cooling fluid conduit accepts water from a river marine environment. In embodiments, the platform has a conduit for a heated fluid used for steam generation of power. In embodiments, the platform has a conduit for condensed fluid. In embodiments, the platform has an emergency cooling fluid conduit. In embodiments, the platform has one or more passageways for movement of personnel. In embodiments, the platform has one or more conduits for transporting fuel. In embodiments, the platform has one or more conduits for transporting spent fuel. In embodiments, the platform has one or more passageways for moving components for maintenance, repair or replacement.

In embodiments, the platform is assembled in an arrangement selected from the group consisting of a substantially vertical arrangement: a substantially horizontal arrangement: a substantially cylindrical arrangement: a substantially rectangular solid arrangement: an arrangement in which modules are moveable between an intermediate arrangement for transport and a final arrangement for moored power production: an arrangement in which modules are configured as a set of wedge-shaped modules: an arrangement in which the modules are configured to enable interconnection in alternative geometries based on at least one functional requirement for the platform. The functional requirement is selected from the group consisting of a regulatory requirement, a constraint on shipyard size, a constraint on depth during transportation, a constraint on height during transportation, a water-level requirement and a power output requirement: an arrangement in which at least one component contained in at least one of the modules is configured to enable interconnection of components in alternative geometries based on at least one functional requirement for the platform. The functional requirement is selected from the group consisting of a regulatory requirement, a constraint on shipyard size, a constraint on depth during transportation, a constraint on height during transportation, a water level requirement and a power output requirement: an arrangement in which modules are configured to place modules in preferred locations relative to a water level of the environment when the platform is positioned to generate power: a floating arrangement: a moored arrangement: a river-proximal arrangement; and a seafloor mounted arrangement. In embodiments, the platform has a substantially vertical arrangement. In embodiments, the platform has a substantially horizontal arrangement. In embodiments, the platform has a substantially cylindrical arrangement. In embodiments, the platform has a substantially rectangular solid arrangement. In embodiments, the platform has an arrangement in which modules are moveable between an intermediate arrangement for transport and a final arrangement for power production. In embodiments, the platform has an arrangement in which modules are configured as a set of wedge-shaped modules.

In embodiments, the platform has an arrangement in which the modules are configured to enable interconnection in alternative geometries based on at least one functional requirement for the platform. The functional requirement is selected from the group consisting of a regulatory requirement, a constraint on shipyard size, a constraint on depth during transportation: a constraint on height during transportation: a water-level requirement and a power output requirement. In embodiments, the platform has an arrangement in which at least one component contained in at least one of the modules is configured to enable interconnection of components in alternative geometries based on at least one functional requirement for the platform. The functional requirement is selected from the group consisting of a regulatory requirement, a constraint on shipyard size, a constraint on depth during transportation: a constraint on height during transportation: a water level requirement and a power output requirement. In embodiments, the platform has an arrangement in which modules are configured to place modules in preferred locations relative to a water level of the environment when the platform is positioned to generate power. In embodiments, the platform has a floating arrangement. In embodiments, the platform has a moored arrangement. In embodiments, the platform has a seafloor mounted arrangement. In embodiments, the platform has a river-proximal arrangement.

In embodiments, the platform has a vertical arrangement of modules. The platform is configured to be attached to the floor of the marine environment. The platform is configured to be positioned in a coastal environment. The platform has a substantially cylindrical configuration. The platform is configured with a set of layered deck modules. In embodiments, the platform has a vertical arrangement of modules. The platform is configured to be attached to the floor of the marine environment. The platform is configured to be positioned in a coastal environment. The platform has a substantially cylindrical configuration. The platform is configured with a set of horizontally intersecting deck modules. In embodiments, the platform has a vertical arrangement of modules. The platform is configured to be attached to the floor of the marine environment. The platform is configured to be positioned in a coastal environment. The platform has a substantially rectangular configuration. The platform is configured with a set of horizontally intersecting deck modules. In embodiments, the platform has a vertical arrangement of modules. The platform is configured to be attached to the floor of the marine environment. The platform is configured to be positioned in a coastal environment. The platform has a substantially rectangular configuration. The platform is configured with a set of layered deck modules. In embodiments, the platform has a vertical arrangement of modules. The platform is configured to be attached to the floor of the marine environment. The platform is configured to be located offshore. The platform has a substantially cylindrical configuration. The platform is configured with a set of layered deck modules. In embodiments, the platform has a vertical arrangement of modules. The platform is configured to be attached to the floor of the marine environment. The platform is configured to be located offshore. The platform has a substantially cylindrical configuration. The platform is configured with a set of horizontally intersecting deck modules.

In embodiments, the platform has a vertical arrangement of modules. The platform is configured to be attached to the floor of the marine environment. The platform is configured to be located offshore. The platform has a substantially rectangular configuration. The platform is configured with a set of horizontally intersecting deck modules. In embodiments, the platform has a vertical arrangement of modules. The platform is configured to be attached to the floor of the marine environment. The platform is configured to be located offshore. The platform has a substantially rectangular configuration. The platform is configured with a set of layered deck modules. In embodiments, the platform has a vertical arrangement of modules. The platform is configured to float. The platform is configured to be positioned in a coastal environment. The platform has a substantially cylindrical configuration. The platform is configured with a set of layered deck modules. In embodiments, the platform has a vertical arrangement of modules. The platform is configured to float. The platform is configured to be positioned in a coastal environment. The platform has a substantially cylindrical configuration. The platform is configured with a set of horizontally intersecting deck modules. In embodiments, the platform has a vertical arrangement of modules. The platform is configured to float. The platform is configured to be positioned in a coastal environment. The platform has a substantially rectangular configuration. The platform is configured with a set of horizontally intersecting deck modules. In embodiments, the platform has a vertical arrangement of modules. The platform is configured to float. The platform is configured to be positioned in a coastal environment. The platform has a substantially rectangular configuration. The platform is configured with a set of layered deck modules.

In embodiments, the platform has a vertical arrangement of modules. The platform is configured to float. The platform is configured to be located offshore. The platform has a substantially cylindrical configuration. The platform is configured with a set of layered deck modules. In embodiments, the platform has a vertical arrangement of modules. The platform is configured to float. The platform is configured to be located offshore. The platform has a substantially cylindrical configuration. The platform is configured with a set of horizontally intersecting deck modules. In embodiments, the platform has a vertical arrangement of modules. The platform is configured to float. The platform is configured to be located offshore. The platform has a substantially rectangular configuration. The platform is configured with a set of horizontally intersecting deck modules. In embodiments, the platform has a vertical arrangement of modules. The platform is configured to float. The platform is configured to be located offshore. The platform has a substantially rectangular configuration. The platform is configured with a set of layered deck modules. In embodiments, the platform has a horizontal arrangement of modules. The platform is configured to be attached to the floor of the marine environment. The platform is configured to be positioned in a coastal environment. The platform has a substantially cylindrical configuration. The platform is configured with a set of layered deck modules. In embodiments, the platform has a horizontal arrangement of modules. The platform is configured to be attached to the floor of the marine environment. The platform is configured to be positioned in a coastal environment. The platform has a substantially cylindrical configuration. The platform is configured with a set of horizontally intersecting deck modules.

In embodiments, the platform has a horizontal arrangement of modules. The platform is configured to be attached to the floor of the marine environment. The platform is configured to be positioned in a coastal environment. The platform has a substantially rectangular configuration. The platform is configured with a set of horizontally intersecting deck modules. In embodiments, the platform has a horizontal arrangement of modules. The platform is configured to be attached to the floor of the marine environment. The platform is configured to be positioned in a coastal environment. The platform has a substantially rectangular configuration. The platform is configured with a set of layered deck modules. In embodiments, the platform has a horizontal arrangement of modules. The platform is configured to be attached to the floor of the marine environment. The platform is configured to be located offshore. The platform has a substantially cylindrical configuration. The platform is configured with a set of layered deck modules. In embodiments, the platform has a horizontal arrangement of modules. The platform is configured to be attached to the floor of the marine environment. The platform is configured to be located offshore. The platform has a substantially cylindrical configuration. The platform is configured with a set of horizontally intersecting deck modules. In embodiments, the platform has a horizontal arrangement of modules. The platform is configured to be attached to the floor of the marine environment. The platform is configured to be located offshore. The platform has a substantially rectangular configuration. The platform is configured with a set of horizontally intersecting deck modules. In embodiments, the platform has a horizontal arrangement of modules. The platform is configured to be attached to the floor of the marine environment. The platform is configured to be located offshore. The platform has a substantially rectangular configuration. The platform is configured with a set of layered deck modules.

In embodiments, the platform has a horizontal arrangement of modules. The platform is configured to float. The platform is configured to be positioned in a coastal environment. The platform has a substantially cylindrical configuration. The platform is configured with a set of layered deck modules. In embodiments, the platform has a horizontal arrangement of modules. The platform is configured to float. The platform is configured to be positioned in a coastal environment. The platform has a substantially cylindrical configuration. The platform is configured with a set of horizontally intersecting deck modules. In embodiments, the platform has a horizontal arrangement of modules. The platform is configured to float. The platform is configured to be positioned in a coastal environment. The platform has a substantially rectangular configuration. The platform is configured with a set of horizontally intersecting deck modules. In embodiments, the platform has a horizontal arrangement of modules. The platform is configured to float. The platform is configured to be positioned in a coastal environment. The platform has a substantially rectangular configuration. The platform is configured with a set of layered deck modules. In embodiments, the platform has a horizontal arrangement of modules. The platform is configured to float. The platform is configured to be located offshore. The platform has a substantially cylindrical configuration. The platform is configured with a set of layered deck modules. In embodiments, the platform has a horizontal arrangement of modules. The platform is configured to float. The platform is configured to be located offshore. The platform has a substantially cylindrical configuration. The platform is configured with a set of horizontally intersecting deck modules. In embodiments, the platform has a horizontal arrangement of modules. The platform is configured to float. The platform is configured to be located offshore. The platform has a substantially rectangular configuration. The platform is configured with a set of horizontally intersecting deck modules. In embodiments, the platform has a horizontal arrangement of modules. The platform is configured to float. The platform is configured to be located offshore. The platform has a substantially rectangular configuration. The platform is configured with a set of layered deck modules.

A system, comprising: a nuclear power plant unit. The nuclear power plan unit is assembled in a shipyard from a plurality of structural modules, each of the structural modules having manufactured components for use in power production when moored or fixed to a floor at least one of in and proximal to at least one of an offshore marine environment, a river environment, and a coastal marine environment. The nuclear power plant unit is subdivided into at least one arrangement of structural modules, wherein at least one of the structural modules is a containment module for containment of radioactivity.

In embodiments, the containment configured to store spent fuel within the containment module. In embodiments, the containment is configured with dual walls configured to include a flooded region in between the walls. In embodiments, the containment has a double wall with structural support members that are designed to support the containment wall while allowing thermal expansion upon heating. In embodiments, the containment wall has in-wall tubing for handling pressure. In embodiments, the containment has a plurality of heat transfer elements configured to accept and dissipate thermal energy. In embodiments, the containment is configured to be cooled by circulating water. In embodiments, the containment is configured to be cooled by a passive cooling facility. In embodiments, the containment is configured to be cooled by a passive cooling facility that includes circulating water that is moved by natural circulation based on a thermal gradient in the surrounding marine environment. In embodiments, the containment is cylindrically configured to contain a substantially cylindrical nuclear reactor. In embodiments, the containment is configured to support a spherical reactor. In embodiments, the containment is configured in a rectangular solid shape.

In embodiments, the containment is configured as a low-volume, high pressure containment facility having a facility for managing pressure within the containment. In embodiments, the containment is configured as a low-volume, high pressure containment facility having a set of pipes for releasing pressure through flooded containment walls for managing pressure within the containment. In embodiments, the containment is configured as a low-volume, high pressure containment facility having containment walls that are adapted to handle high pressure and having thermal sinks to absorb heat from the containment to reduce the pressure in the containment. In embodiments, the containment is configured as a low-volume, high pressure containment facility having blocks of perforated solid salts that are in thermal contact with the containment and that melt at appropriate pressures to absorb heat from the containment. In embodiments, the containment is configured as a low-volume, low-flammability, high pressure containment facility having a low volatility, low-corrosive phase change material that is solid during normal operating conditions and liquid in the case of elevated temperatures in order to absorb heat without producing substantial amounts of steam to absorb heat from the containment.

In embodiments, the containment is configured as a low-volume, high pressure containment facility having ice condensers for taking heat from the containment to reduce pressure in the containment. In embodiments, the containment has a catalytic containment coating for reducing hydrogen concentration in the containment. In embodiments, the coating includes at least one of palladium and platinum. In embodiments, the containment includes a passive recombiner for reducing hydrogen concentration in the containment. The passive recombiner is coated with a catalytic material. In embodiments, the containment has a facility for flooding the containment for a nuclear reactor with a nano-fluid to enhance in-vessel retention of a molten core in the case of an accident. In embodiments, the containment includes a water-shield for a nuclear reactor.

In embodiments, the containment is a double walled containment for a nuclear reactor. Internal walls provide radioactive shielding for a reactor vessel. A fluid having thermal capacity is provided between internal and external walls. The double walled structure is configured with structural supports that handle pressure when the space between the walls is flooded with the fluid. In embodiments, the containment is a double walled containment for a nuclear reactor. Internal walls provide radioactive shielding for a reactor vessel. A fluid having thermal capacity is provided between internal and external walls. The double walled containment structure is provided with containment vessel shielding. In embodiments, the containment is a double walled containment for a nuclear reactor. Internal walls provide radioactive shielding for a reactor vessel. A fluid having thermal capacity is provided between internal and external walls. The double walled structure is configured with structural supports that handle pressure when the space between the walls is flooded with the fluid. The fluid between the walls can be drained under power of gravity to augment absorption of heat from the reactor core in the case of an accident. In embodiments, the containment is a double walled containment for a nuclear reactor. Internal walls provide radioactive shielding for a reactor vessel. A fluid having thermal capacity is provided between internal and external walls. The double walled structure is positioned with the hull of the platform to facilitate transmission of heat from the containment through the hull to the marine environment of the platform. In embodiments, the containment is a double walled containment for a nuclear reactor. Internal walls provide radioactive shielding for a reactor vessel. A fluid having thermal capacity is provided between internal and external walls. A natural circulation path is configured to circulate the fluid to remove heat from the containment. In embodiments, the containment is a flat bottom water-cooled integrated containment with reinforced double bottom.

An offshore nuclear power unit, comprising: a cylindrical containment vessel having a shell for containing pressure and radioactivity of a nuclear reactor; and a support structure configured to transfer load from the shell of the containment vessel shell to a bull of the offshore nuclear power unit.

In embodiments, the support structure is made of at least one of a metal and an alloy. In embodiments, the support structure is made of steel. In embodiments, the support structure is a regular cellular lattice structure. In embodiments, the cellular lattice structure is a hexagonal lattice structure. In embodiments, the cellular lattice structure is a rectangular lattice structure. In embodiments, the cellular lattice structure is a triangular lattice structure. In embodiments, the support structure is an irregular cellular lattice structure. In embodiments, the support structure is a columnar structure. In embodiments, the columnar structure is a rectangular columnar structure. In embodiments, the columnar structure is a cylindrical columnar structure. In embodiments, the support structure includes an interface element configured to interface with the curvature of the containment vessel. In embodiments, the support structure is a cellular lattice structure and wherein the lattice includes a support column positioned at a vertex of the lattice. In embodiments, the support structure is a cellular lattice structure. The cellular lattice structure is welded. In embodiments, a unit includes further comprising a robotic welding machine configured to be disposed in a cell of the cellular lattice to weld the lattice.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the of the examples in the disclosure. In the following description, various embodiments of the present disclosure are described with reference to the following drawings, in which:

FIGS. 19A, 19B, 19C, 19D and 19E are partial diagrammatic views each depicting illustrative lattice types for support of a containment vessel in accordance with the present disclosure.

DETAILED DESCRIPTION OF THE FIGURES

Figure 1:
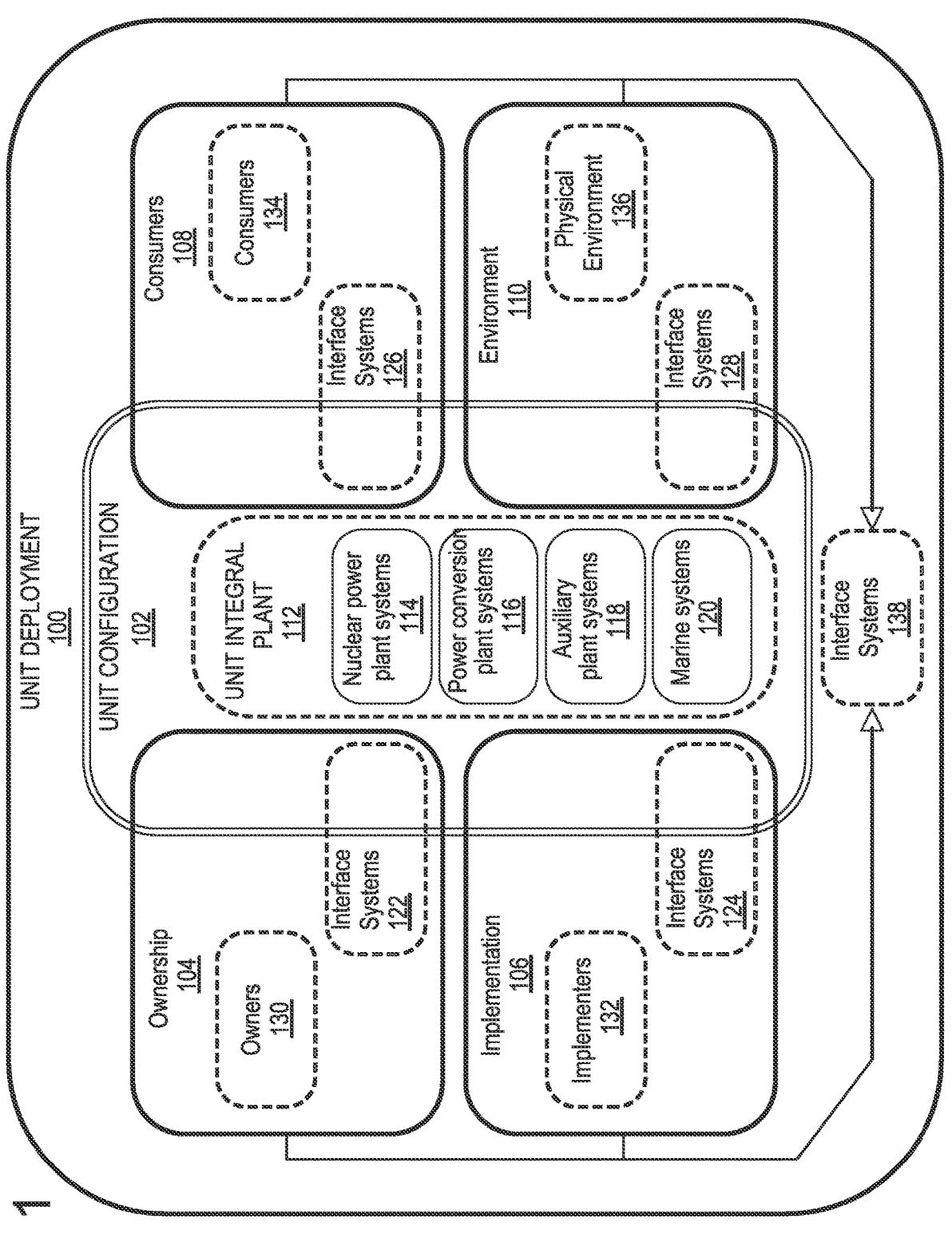
FIG. 1 is a relational block diagram depicting constituent systems of an illustrative offshore nuclear plant (ONP) and associated systems with which the ONP interacts in accordance with the present disclosure.

Provided herein are methods, systems, components and the like for design, development, delivery, deployment, and operation of nuclear power plants, including offshore nuclear power (ONP) units, that are designed to be assembled in a shipyard from standardized, manufactured components and floated to a marine environment where they are operated to produce electricity for delivery to an electrical grid and/or for other purposes, such as to enable various industrial, agricultural or other processes and/or to enable production of various products. Also, provided herein are efficient and advantageous systems and methods for the support of a reactor containment vessel that includes an ONP in a manner that transfers the weight forces of the containment vessel to portions of the ONP and ultimately to the ONP's environment.

ONPs can meet the whole range of foregoing needs. For example, they require relatively little onshore land development (mostly for landfall of transmission lines) and are immersed in an inexhaustible supply of coolant water. If floating, they can be inherently secure against sea-level rise, the direct impacts of earthquakes, and (if sufficiently far offshore) tsunamis. Security concerns can be mitigated by the ONP's open sea-and-air environment, which can make any form of approach relatively easy to detect. Also, a structure sealed against the oceanic environment can be inherently more difficult to infiltrate, ceteris paribus, than a sprawling terrestrial facility. Further, modular manufacture and assembly with the contribution of well-known shipyard techniques can be shown to lower ONP cost and associated risk as compared to terrestrial construction of a comparable-sized plant, because preassembled module size can be severely constrained on land by the difficulty of overland transport. Practical shipyard module size for ONP construction is at least an order of magnitude greater than for terrestrial construction, and can be organized on the basis of efficiency and engineering considerations. Additionally, site-specific variations in context (terrain, geohydrology, settlement patterns, etc.), which have invariably raised construction costs for land-based plants despite efforts to standardize designs, can be greatly mitigated for ONPs. Also, ONPs can be easily relocated at any time (e.g., for re-deployment, in response to changing security concerns, or for transport to a decommissioning location), in contrast to terrestrial nuclear power plants, which are non-relocatable.

Thus. ONPs potentially offer an elegant solution to some of the most intractable costs of conventional, onshore nuclear power plants. It will be appreciated in light of the disclosure that ONPs also present many novel design challenges including, but are not limited to, vulnerability to loss of offsite power, continual erratic movement even of the most massive components (e.g., turbines, pumps, generators) due to wave action, the structural threat posed by extreme winds and waves, the corrosive effects of seawater, secure anchorage of the unit, vulnerability to submarine as well as other forms of assault, the secure loading of radioactive materials onto and off of the unit, and many combinations thereof. Other challenges of operation in a marine environment can include constraints on system delivery (such as water depths, heights of bridges that may block transport to marine sites, and the like), security challenges (such as resulting from the absence of conventional defense perimeters and remoteness of backup security operations), environmental sensitivity (e.g., system impacts on marine life), and the like. The inventors have therefore identified needs for nuclear power design and construction that is suitable for marine environments. Moreover, the inventors have identified needs for methods and systems of standardized ONP design and construction that allow for faster and lower-cost design, construction, and deployment to a wider range of available sites of ONPs meeting all relevant design challenges.

One inherent challenge of ONP design can be the disposition and support of essential components or subsystems within the overall ONP unit. In an onshore nuclear power plant, the main considerations governing disposition of components are simplicity and proximity: for example, a typical terrestrial-based turbine-house layout is linear, with turbines and other major components lined up in a row, with often a second, lower level for a condensate system. It will be appreciated in light of the disclosure that such terrestrial-based arrangements are not practical for some ONP designs. For example, one class of ONP designs has an overall buoy-like (vertical) geometry that is highly resistant to capsizing. In such a design, the approximate overall form of the plant is a vertically oriented cylinder. Conventional, linear, and terrestrial-based layouts are less favorable if they were incorporated into such buoy-like (vertical) geometry. Moreover, it will be appreciated in light of the disclosure that the terrestrial construction practice of supporting large, heavy components such as the reactor itself, generators, condensers, and the like using massive concrete plinths communicating their loads more or less directly to the Earth is unfavorable for ONP construction. Concrete is used in terrestrial-based system, but it provides less strength per unit mass (and per unit volume) than steel and it consumes available interior volume or mandates greater total displacement of a floating ONP. Further, loads borne by concrete structures in a floating structure must typically be communicated secondarily to steel structures in order to be communicated to that portion of the structure's hull in contact with the surrounding water. As such, a concrete plinth would tend to be additional to, rather than alternative to, steel supportive structures. Herein. "steel" refers broadly to any metallic substance used for structural purposes in an ONP.

In embodiments, this disclosure refers to various marine environments, including offshore marine environments (such as where a nuclear unit or platform is mounted or moored to an ocean floor, sea floor, or the like), coastal marine environments (such as where a unit or platform is mounted or moored on or near a coast or other interface of a body or water with land, such as in a natural or man-made bay, port, harbor, inlet, or the like), river marine environments (such as where a unit or platform is floated up river and mounted or moored on a river floor or near a river that serves as a water source for the unit or platform), lake marine environments and the like. Except where context indicates otherwise, references to any one of these marine environments should be understood to encompass similar embodiments for the other marine environments described throughout this disclosure. For example, a reference to an ONP, or offshore platform, should be understood to encompass not only ocean embodiments, but also embodiments where a platform is in or near a river environment, such as having been floated up river and positioned in or near the river, except where context specifically requires a more specific marine environment.

In various cases, this disclosure refers to a nuclear power platform, a nuclear platform, a nuclear power plant unit, a platform, and the like. Such references should be understood to be used interchangeably except where context indicates otherwise.

The inventors have identified a need for a system and method of arranging, interconnecting, assembling, and operating the essential components of a nuclear power plant in an offshore nuclear power plant, where such a system and method should include methods for the support of massive components while making little or no use of heavy concrete plinths or supports. In particular, for an ONP that is assembled in a shipyard from prefabricated sub-units and floated to a site where the ONP will produce power, the inventors have identified a need that exists for reactor containment-vessel support structures that are lighter, less voluminous, and easier to shape in a manufacturing facility and assemble in a shipyard than the concrete structures typically used for containment support in terrestrial nuclear power plants.

Herein, a "Unit" is an individual ONP, that is, a structure containing a nuclear power plant preferably assembled in a dry-dock or other berths at a shipyard and capable of being deployed to and operating in a marine environment. The Unit typically contains one or more nuclear reactors, a turbine generator set, supporting auxiliary systems, and accessory systems for adapting the ONP unit to the environment it is deployed in, such as for navigation, cooling, control, safety, power transmission, crew maintenance, and other functions. As shall be clarified with references to Figures herein, units may be deployed in a variety of arrangements. e.g., as solitary units or in clusters. Units operate in complex environments having physical, economic, regulatory, political, military, and other facets that dictate required system capabilities and constrain the operations of units. It can be shown that embodiments of the disclosure enable the provision of ONP capabilities within various constraints in a more economical manner than what was provided by the prior art.

Modularization of an ONP

Embodiments of the present disclosure include modularization of an ONP system across a range of material and functional levels in a manner that facilitates design, manufacture, and maintenance of the ONP as well as various interactions of the ONP system with its environment, both material (ocean, grid, etc.) and non-material (legal, financial, etc.). Such modularization will be clarified with reference to Figures hereinbelow. Herein, an "ONP system" may include a single ONP unit or a multiplicity of such units, and typically includes provisions for interaction of the system's one or more ONPs with their environment. Such provision will be clarified with reference to Figures herein. Herein, reference is often made to a single ONP for simplicity, but such reference does not exclude many embodiments including multiple ONPs FIG. 1 depicts illustrative constituent systems of an offshore nuclear plant (ONP), also herein termed a unit as defined herein, and illustrative associated systems that interact with the unit and each other. A unit deployment 100 can include a unit configuration 102 and the associated systems with which the Unit Configuration directly interacts via material and non-material environment. In the illustrative Unit Deployment 100 of FIG. 1, the associated systems with which the Unit Deployment 100 interacts can be the Ownership 104, the Implementation 106, the Consumers 108, and the Environment 110. Overlap of the boundaries of associated systems 104, 106, 108, 110 with the Unit Configuration is shown to indicate that the Configuration 102 and its associated systems 104, 106, 108, 110 overlap in practice, and cannot be meaningfully considered in isolation from one another. The Unit Configuration 102 can include the Unit Integral Plant 112, the primary constituent physical systems of the ONP, and accessory interfacing systems: the Unit Integral Plant 112 supports the operation of the ONP unit regardless of the particulars of the Unit Deployment 100. The Unit Configuration 102 can incorporate the Unit Integral Plant into a form factor suitable for a given Unit Deployment scenario 100. The Unit Integral Plant 112 can be designed, built, assembled, and maintained as a structure of discrete physical modules, where the sense of "module" shall be detailed with reference to the Figures herein. The Unit Integral Plant 112, in turn, can include nuclear power plant systems 114, which produce energy from nuclear fuel and manage nuclear materials such as fuel and waste: power conversion plant systems 116, by which energy from the nuclear power plant systems 114 is, typically, converted to electricity: auxiliary plant systems 118, which support the operation of the individual ONP unit; and marine systems 120, which enable the ONP to subsist and function in a marine environment.

The associated systems 104, 106, 108, 110 can interact with the Unit Configuration via Interface Systems 122, 124, 126, 128. In embodiments, the terms "interface." "interface system." and "interfacing system" may be understood to encompass, except where context indicates otherwise, one or more systems, services, components, processes, or the like that facilitate interaction or interconnection of systems within an ONP or between one or more systems of the ONP with a system that is external to the ONP, or between the ONP and associated systems, or between systems associated with an ONP. Interface Systems may include software interfaces (including user interfaces for humans and machine interfaces, such as application programming interfaces (APIs), data interfaces, network interfaces (including ports, gateways, connectors, bridges, switches, routers, access points, and the like), communications interfaces, fluid interfaces (such as valves, pipes, conduits, hoses and the like), thermal interfaces (such as for enabling movement of heat by radiation, convection or the like), electrical interfaces (such as wires, switches, plugs, connectors and many others), structural interfaces (such as connectors, fasteners, inter-locks, and many others), or legal and fiscal interfaces (contracts, loans, deeds, and many others). Thus. Interface Systems may include both material and non-material systems and methods. For example, the Interface System 122 for interfacing the Unit Configuration 102 with Ownership 104 can include legal arrangements (e.g., deeds, contracts): the Interface system 128 for interfacing the Unit Configuration 102 with the Environment 110 can material arrangements (e.g., tethers, tenders, sensor and warning systems, buoyancy systems).

The Ownership system 104 can include Owners 130 and Interface Systems 122; the Implementation system 106 can include Implementers 132 (e.g., builders, defenders, maintainers) and Interface Systems 124; the Consumer's system can include Consumers 134 and Interface Systems 126; and the Environment system can include the natural Physical Environment 136 and Interface Systems 128. The physical environment for an ONP may be characterized by various relevant aspects, including topography (such as of the ocean floor or a coastline), seafloor depth, wave height (typical and extraordinary), tides, atmospheric conditions, climate, weather (typical and extraordinary), geology (including seismic and thermal activity and seafloor characteristics), marine conditions (such as marine life, water temperatures, salinity, and the like), and many other characteristics. Associated systems not depicted in FIG. 1 may also be included by a Unit Deployment: stakeholders informing the design, manufacture, and operation of an ONP unit may include power consumers, owners, financiers, insurers, regulators, operators, manufacturers, maintainers (such as those providing supplies and logistics), de-commissioners, defense forces (public, private, military, etc.), and others. Moreover, the systems 104, 106, 108, 110 can interact with each other through one or more additional Interface Systems 138.

Figure 2:
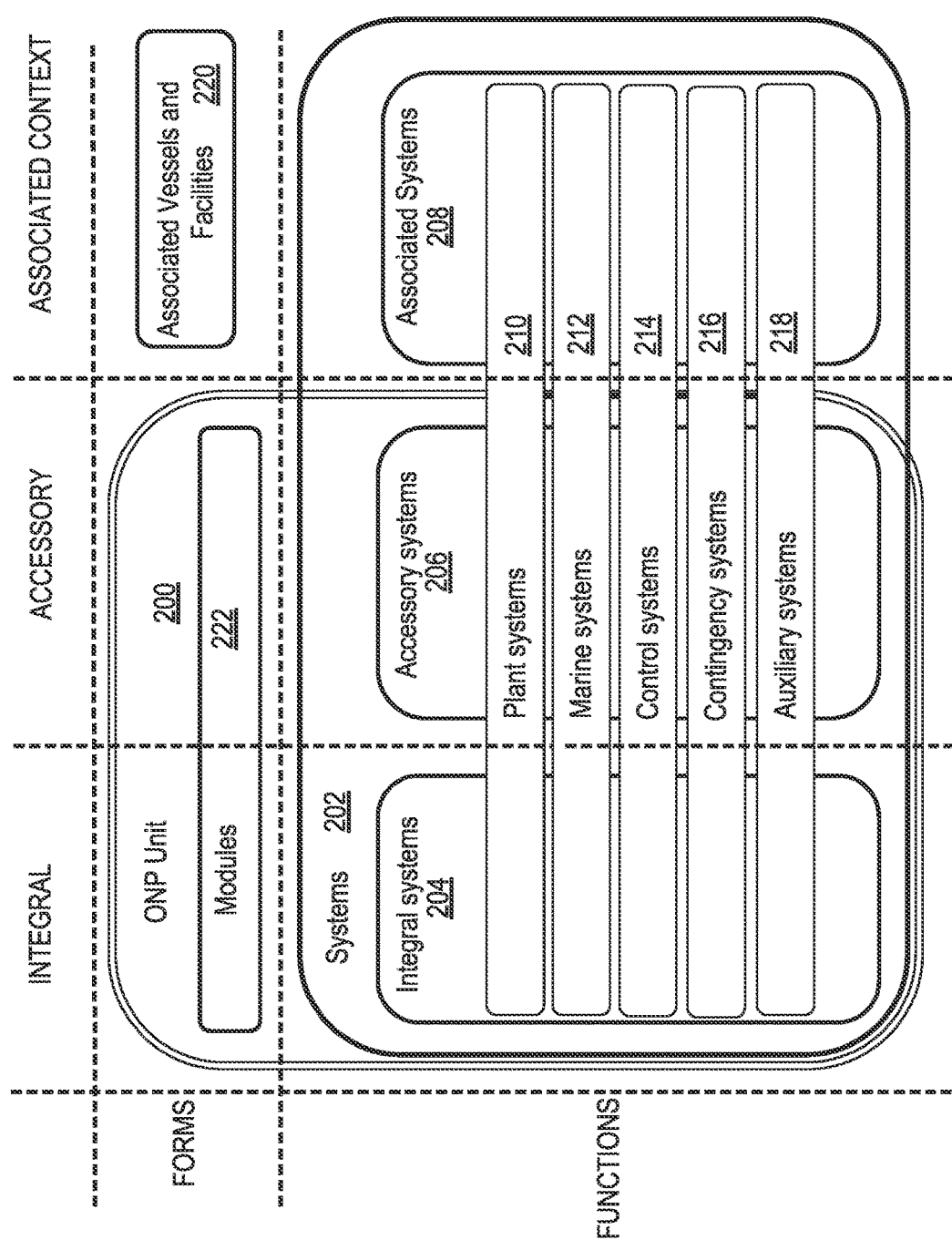
FIG. 2 is a diagrammatic view and depiction of a manner in which Forms and Functions of an ONP can be categorized and operate in accordance with the present disclosure.

FIG. 2 depicts exemplary Functions of an ONP that can in various embodiments be assigned to physical Forms, and depicts the relationships of the Functions and Forms so assigned to Integral. Accessory, and Associated categories. In various embodiments, an ONP Unit 200 (depicted with a double line) can include one or more functional Systems 202, which may include one or more Integral Systems 204. Accessory Systems 206, and Associated Systems ("systems associated with ONP unit fleet") 208. In general. Integral and Accessory Systems can be physically include the ONP Unit 200, while Associated Systems are not. In embodiments, the term "Accessory System" may be understood to encompass, except where context indicates otherwise, a system that adapts Unit function to its deployments.

The Systems 202 may include one or more Plant Systems 210. In embodiments, the terms "plant system." or "nuclear plant system." and "power conversion plant system" may be understood to encompass, except where context indicates otherwise, systems involved in the operation of a nuclear reactor, the transport of heat, the conversion and transmission of power.

In embodiments. ONP Systems 202 may include one or more Marine Systems 212. In embodiments, the term "marine system" may be understood to encompass, except where context indicates otherwise, a system associated with the function of the unit as a marine vessel, including navigation, stability, structural integrity, and accommodation of crew.

In embodiments. ONP Systems 202 may include one or more Control Systems 214. In embodiments, the term "control system" may be understood to encompass, except where context indicates otherwise, a system of devices or set of devices (including enabled by various hardware, software, electrical, data and communications systems, that manages, commands, directs or regulates the behavior of other device (s) or system(s) to achieve desired results. Control systems may include various combinations of local and remote control systems, human-operated control systems, machine-based control systems, feedback-based control systems, feed-forward control systems, autonomous control systems, and others.

In embodiments. ONP Systems 202 may include one or more Contingency Systems 216. In embodiments, the terms "contingency system" or "emergency system" may be understood to encompass, except where context indicates otherwise, a system on or interfacing with an ONP that can prevent, mitigate, or assist in recovery from accidents, which may include design-basis accidents (i.e., accidents that may occur within the normal operating activities of the ONP) and beyond-design-basis accidents and events, including both human initiated events (e.g.: terrorism or attacks), significant failure of ONP facilities, environmental events (e.g.: weather, seismic activity, and the like) and "acts of God."

In embodiments. ONP Systems 202 may include one or more Accessory Systems 206. In embodiments, the term "accessory system" may be understood to encompass, except where context indicates otherwise, a system which, when included in or interfacing with an ONP unit, can tailor the unit to operating in different deployment scenarios and/or that can provide or enable an accessory function for the ONP (such as a function that can occur episodically like maintenance, refueling or repair that may involve moving items around the ONP). Accessories may be related to the plant functions, marine functions, and contingency functions, among others. For example, an accessory marine system could improve the stability of the foundation of a seafloor mounted ONP or can act as a breakwater depending on local wave conditions. An accessory plant system could provide an interface for transport of power/utility products or might use process heat to manufacture value-added industrial products local to the unit. An accessory system like a crane might be used to move units around during refueling or maintenance operations. These and many other accessory systems are encompassed in the present disclosure.

In embodiments, an ONP Unit Deployment may include one or more Associated Systems 208. In embodiments, the term "Associated system" may be understood to encompass, except where context indicates otherwise, a system interfacing with a single unit or a fleet of ONP units which performs a function related to the design, configuration, awareness, defense, operation, manufacturing, assembly, decommissioning of ONP units, and other associated contexts. In embodiments, this may include a system that performs a function that is not necessarily core to the operation of the ONP but that may involve interaction with an ONP, such as a weather prediction system, a tsunami or extreme-wave warning system, a smart grid system, an agricultural or industrial production system that uses power from the ONP, a desalination system, and many others.

In embodiments, an ONP Unit Deployment may include one or more Auxiliary Systems 218.

In embodiments, an ONP Unit Deployment may also include Associated Vessels and Facilities 220 that can be associated with the system but are not inextricable physical portions of it. e.g., tenders, crew transports, fuel transports, vehicles of defensive forces, supply depots, on-shore grid substations, manufacturing facilities and many more.

As also indicated in FIG. 2, both the Integral and Accessory components of an ONP Unit 200, and the portions of various Systems that physically include an ONP Unit 200, can be, in various embodiments, designed, constructed, and assembled as "modules" 222, also herein termed "structural modules." Herein, a module is a standardized, discrete part, component, or structural unit that can be used to construct a more complex structure, with assembly typically occurring in a shipyard. Modules that can include various embodiments can be derived from categories used in shipbuilding, and include, among other units. Skids. Panels. Blocks, and Megablocks. These terms shall be clarified with reference to Figures hereinbelow. Systems (e.g., Marine Systems 212) may be substantially confined to single modules, or distributed across multiple modules: the terms "system" and "module" are thus not interchangeable. As such, mega-blocks are defined broadly as a module or block consisting of other modular blocks that are integrated or assembled together.

Figure 3:
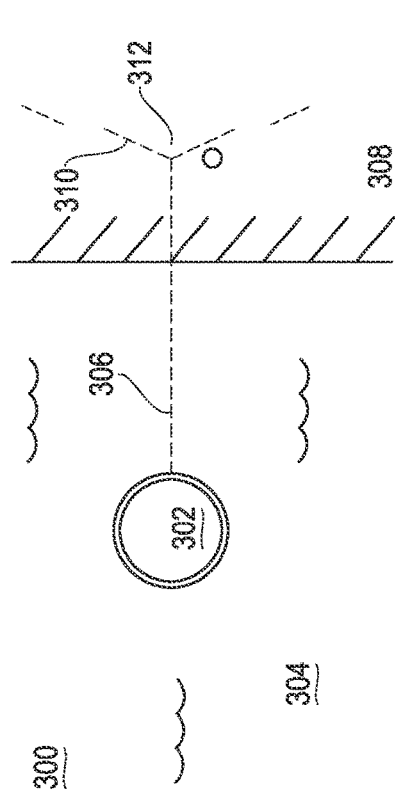
FIG. 3 is a schematic view of portions of an illustrative ONP system including a single ONP in accordance with the present disclosure.

FIG. 3 depicts portions of an illustrative ONP or Unit 300 that can include embodiments of the present disclosure. A single ONP unit 302 can be located in a body of water 304 (e.g., ocean, lake, artificial harbor). In FIG. 3, a power transmission line 306 can conduct electricity and/or thermal energy to and from a body of land 308 (e.g., island, mainland) or, in some cases, a vessel, platform, or other artificial body. In FIG. 3, the land body 308 can support an electrical grid 310 to which the line 306 can connect at a connection facility 312. All ONPs depicted herein include at least one nuclear reactor with equipment for producing heat and/or electricity therefrom. Also herein, a "power transmission line" may include provisions for the transmission of electrical power, or thermal energy, or both.

Figure 4:
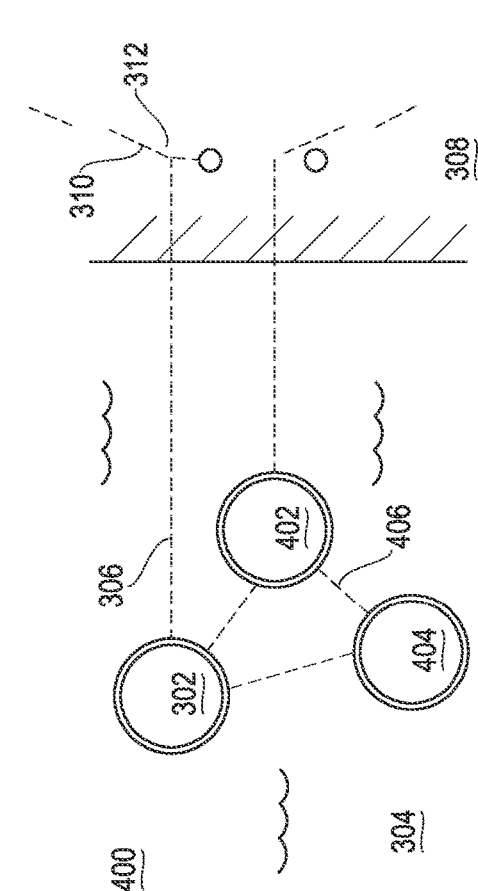
FIG. 4 is a schematic view of portions of an illustrative ONP system including multiple ONPs in accordance with the present disclosure.

FIG. 4 depicts portions of an illustrative ONP system arrangement 400 that can comprise a multiplicity of ONPs 302, 402, 404 that can exchange power with a land body 308 or other power-consuming location via a multiplicity of power transmission lines (e.g., line 306). The ONPs 302, 402, 404 can also exchange power with each other via one or more local power transmission lines (e.g., line 406) for the purposes of startup, shutdown, cooling, energy storage, etc. The transmission lines (e.g., 306) can interface with a grid at a number of connection facilities (e.g., facility 312). In the cluster-style arrangement of FIG. 4, the power lines interconnecting the ONPs, and the multiple power lines connecting the ONPs to the mainland grid 310, can be shown to reduce relative to the single-unit configuration of FIG. 3 the probability that any ONP will be subject to a loss of external power or that the grid 310 will lose access to power from the ONPs. Any of the ONPs of FIGS. 3 and 4 or similar arrangements may be of any of the basic types depicted herein with reference to other Figures, or of other ONP types not depicted herein.

Figure 5A:
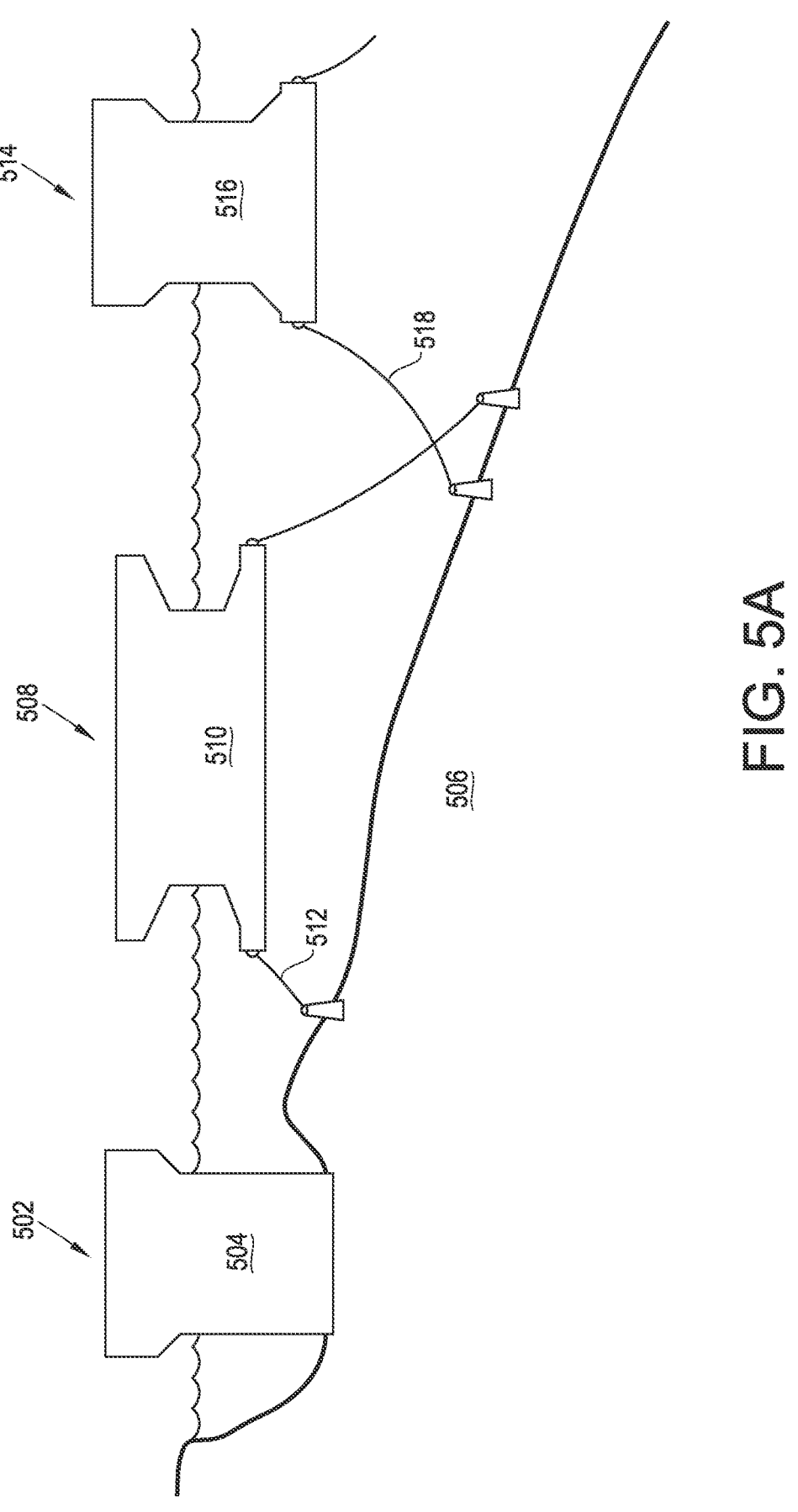
FIG. 5A is a schematic view of three Unit Configurations and Deployment scenarios in accordance with the present disclosure.
Figure 5B:
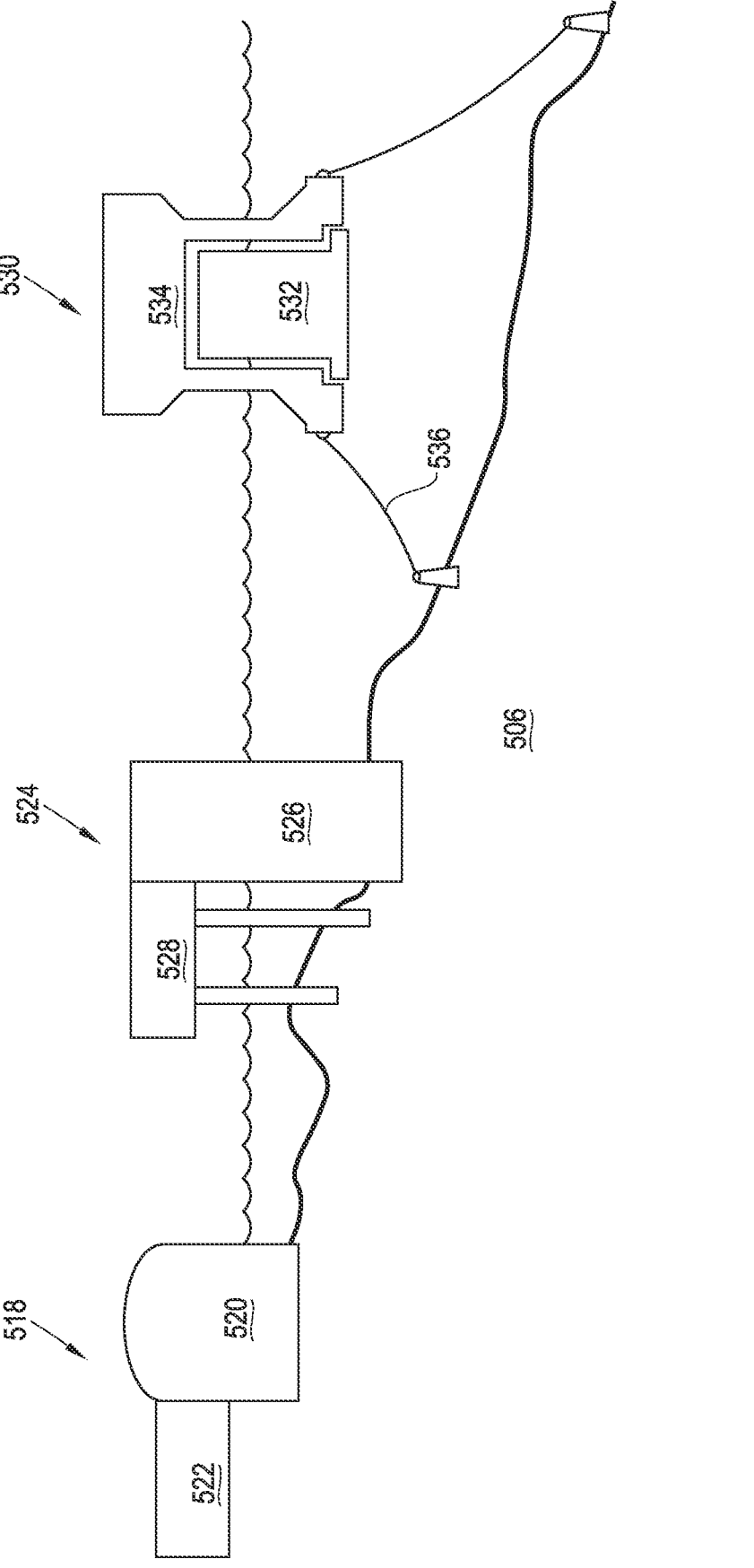
FIG. 5B is a schematic view of three further Unit Configurations and Deployment scenarios in accordance with the present disclosure.

FIGS. 5A and 5B depict aspects of illustrative Unit Configurations in illustrative Unit Deployment scenarios, in accordance with the many embodiments of the present disclosure. FIG. 5A depicts three illustrative simplex configurations, that is, configurations where the ONP Unit can be deployed substantially as a single relocatable unit assembled in a modular manner in a shipyard and floated to its service location. A first simplex configuration 502 is herein denoted the "ONP-B" configuration, where an ONP 504 is grounded on the seafloor 506. e.g., by filling its ballast tanks with water after towing the unit 504 to the site. The ONP-B configuration 502 can be typically suitable for relatively shallow water (for example, approximately 10-30 meters depth). A second simplex configuration 508 is herein denoted the "ONP-E" configuration, where a floating ONP 510 having a relatively flat, wide, barge-like form factor is anchored to the seafloor 506 at its service site by tethers, e.g., tether 512. The ONP-E configuration 508 can be typically suitable for water of moderate depth (for example, approximately 20-60 meters depth). A third simplex configuration 514 is herein denoted the "ONP-C" configuration, where a floating ONP 516 having a relatively cylindrical form factor can be anchored at its service site by tethers. e.g., tether 518. The ONP-C configuration 514 can be typically suitable for water of greater depth (for example, 60+ meters depth).

FIG. 5B depicts three illustrative compound configurations, that is, configurations where the ONP Unit can be deployed substantially as two units, at least one of which can be a relocatable unit assembled in a modular manner in a shipyard and can be floated to its service location. In the three compound configurations of FIG. 5B, a nuclear module can be combined with an accessory module to realize various advantages (e.g., submersion of a nuclear reactor to realize protection from aircraft or surface-vessel impacts; or, capability of swapping out the nuclear module in order to prevent long down-times during refueling or other maintenance or repairs of nuclear systems). A first compound configuration 518 is herein denoted the "ONP-D" configuration, where a nuclear module 520 can be grounded on the seafloor 506 at a shoreline. e.g., by filling the ballast tanks of the nuclear module 520 with water after towing the module 520 to the site. The nuclear module 520 can be interfaced with an accessory unit 522, also preferably manufactured in a modular manner at a shipyard, towed to the service location, and hauled ashore. The ONP-D configuration 518 can be typically suitable for relatively shallow water (for example, approximately 0-10 meters depth).

A second compound configuration 524 is herein denoted the "ONP-M" configuration, where a nuclear module 526 can be grounded on the seafloor 526 and interfaced with an accessory unit 528, also preferably manufactured in a modular manner at a shipyard and towed to the service location. The ONP-M configuration 524 is typically suitable for water of moderate depth (for example, approximately 20-40 meters depth). A third compound configuration 530 is herein denoted the "ONP-S" configuration, where a floating nuclear module 532 can be interfaced with a floating accessory unit 534, also preferably manufactured in a modular manner at a shipyard and towed to the service location. The floating accessory unit 534 can be anchored to the seafloor 506 at its service site by tethers, e.g., tether 536. The ONP-S configuration 530 can be typically suitable for water of greater depth (for example, 60+ meters depth).

It will be clear that the categories of "simplex" and "compound" ONP configurations, and the particular examples shown herein, are illustrative only, and not restrictive of the range of ONP configurations in various embodiments.

Figure 6:
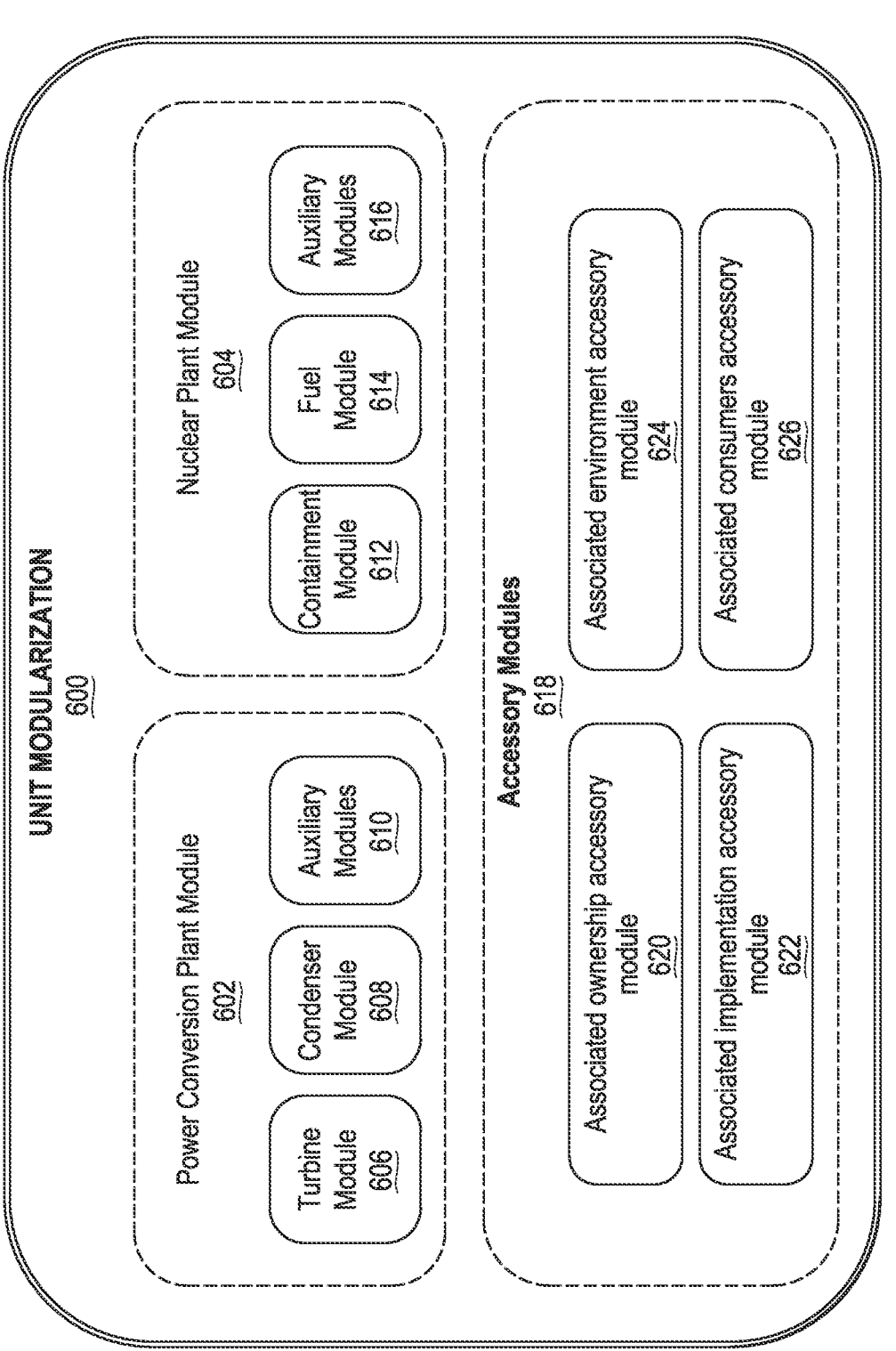
FIG. 6 is a diagrammatic view of ONP Unit modularization in accordance with the present disclosure.

FIG. 6 depicts an illustrative Unit Modularization 600, that is, a high-level schema for the modularization of an ONP. In embodiments. Systems that include an ONP can be classified as (1) integral. (2) accessory, or (3) associated. (1) Integral systems are always a part of the ONP, regardless of configuration or deployment scenario. The two integral systems can be assigned in this illustrative modularization to corresponding modules. i.e., the Power Conversion Plant Module 602 and the Nuclear Plant Module 604. The Power Conversion Plant Module, in turn, can include a Turbine Module 606 that can employ high-pressure steam from the Nuclear Plant Module 604 to turn one or more turbines and generators, a Condenser Module that condenses steam from the Turbine Module 606 for return to the Nuclear Plant Module 604, and some number of Auxiliary Modules 610. (2) Accessory systems are systems that can be included with or directly interface with an ONP unit contingently upon the particular configuration and deployment of the ONP: for example, seafloor tether systems can be accessory because they may be omitted from some embodiments where the ONP is grounded on the seafloor. (3) Associated systems can be those that interface with one or more Units and are part of the greater context in which an ONP Unit is deployed, such as power transmission systems conveying power between an ONP and an on-land grid perform an associated function. Thus, associated systems can have corresponding accessory modules but need not themselves modularized.

Also herein, primary systems can be those performing functions definitive of the purpose of the ONP. e.g., generating steam from nuclear heat or generating electrical power from steam. Primary systems are closely aligned with integral systems. Auxiliary systems (typically instantiated in corresponding Auxiliary Modules 610), can be those that support the reliable operation of primary systems. e.g., by cooling, lubricating, powering, controlling, and monitoring primary systems.

The Nuclear Plant Module 604 can include a Containment Module 612 that can contain the nuclear reactor, a Fuel Module 614 that can perform fuel handling and spent-fuel storage functions, and one or more Auxiliary Modules 616.

Accessory Modules 618 can also include the Unit Modularization 600; these can include modularized systems for handling aspects of interaction with associated systems of ownership 620, implementation 622, physical environment 624, and consumers 626.

Unit Modularization can be responsive to at least two sets of criteria or constraints, which can be in aspects peculiar to the marine situation of an ONP and which may occasionally be in tension: (1) internal constraints on form and organization (e.g., it may be inherently advantageous to locate turbines and generators close together, or the Containment Module 612 and the Fuel Module 614), and (2) external constraints derived from the ONP's environment (e.g., physical, electrical fiscal). In various embodiments, the particular Modularization meets the foregoing criteria and others while maximizing shipyard manufacturability and minimizing cost.

Of note, modules and systems are not synonymous. Although in many cases a single system can be implemented in a single module, a system may extend across multiple modules or a single module may comprise more than one system, in whole or part. Moreover, modules can be combinable and nestable.

Figure 7:
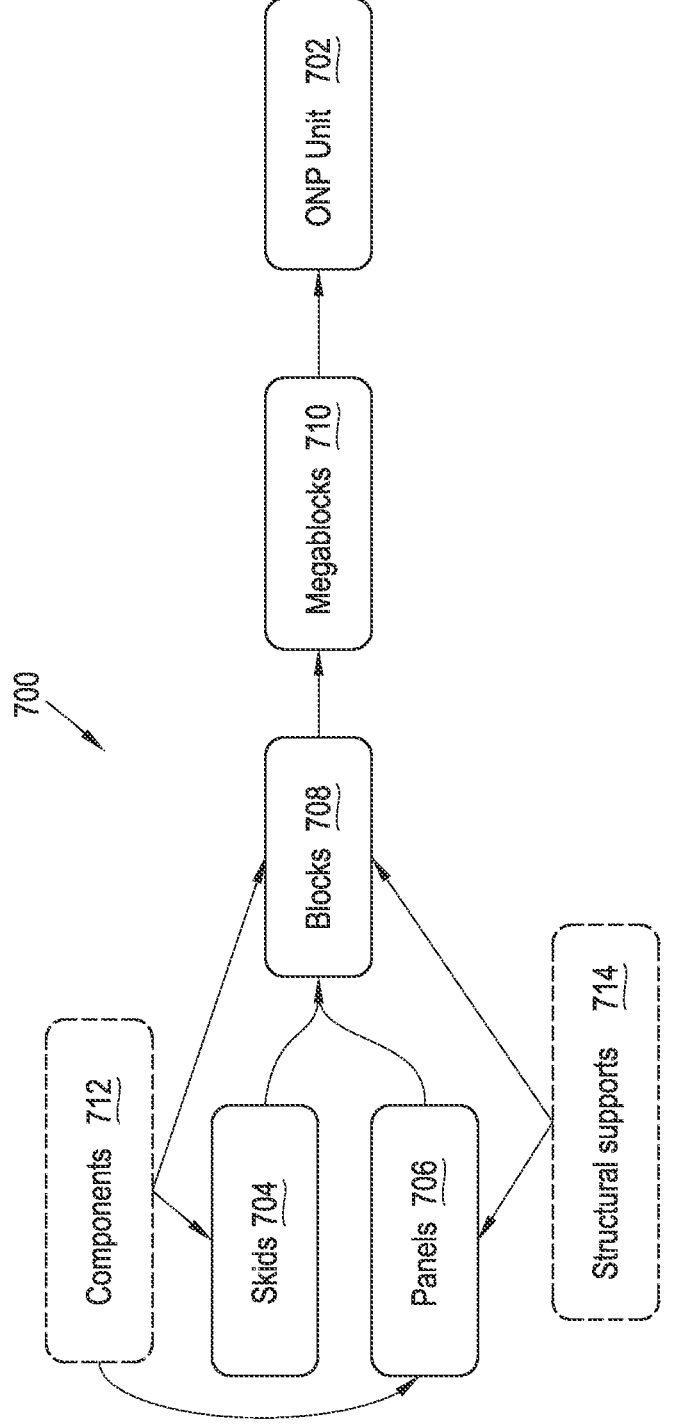
FIG. 7 is a schematic view of a modular ONP manufacturing flow in accordance with the present disclosure.

FIG. 7 depicts an illustrative schema of modular manufacturing flow 700 whereby a modularized ONP can be assembled at the shipyard. Categories of module and their roles in an illustrative manufacturing process according to various embodiments of the present disclosure are here defined with reference to FIG. 7.

Modules of various types may be assembled, preferably but not necessarily or exclusively in a shipyard, to form an ONP unit 702 (with many possible variations as disclosed throughout). These module types can include skid modules (also referred to as Skids) 704, panel modules (also referred to as Panels) 706, block modules (also referred to as Blocks) 708. Megablock modules (also referred to as Megablocks) 710, and others. Modules can be assembled from other modules and from various categories of parts and materials: two notable part categories are components 712 and structural supports 714. Components 712 can be discrete units of machinery or structure that are typically produced by a particular manufacturer and delivered to the shipyard for incorporation into the ONP unit 702: a few exemplary components are vessels, pumps, sensors, computers, transformers, turbines, and generators. Structural supports 714 may be understood to encompass, except where context indicates otherwise, objects, systems or materials that can support a module, component, panel, skid, block, megablock, or other structural element, as by transferring load forces between one of the foregoing and the superstructure, hull, or frame of an ONP unit 702. In embodiments, modules may support other modules structurally; alternatively, or additionally, structural supports perform an independent structural function. The latter case is indicated by the arrow connecting structural supports 714 directly to blocks 708. i.e., structural supports may be incorporated in blocks without first being incorporated into an intermediate module. Similarly, components 712 may be incorporated in blocks without first being incorporated in an intermediate module. For simplicity, the fact that components and structural supports may be added directly to blocks or megablocks 710 or the ONP unit itself 702 is not explicitly indicated in FIG. 7.

For simplicity, feedstocks such as sheet metal, steel plates, bar stock, coatings, and the like are not depicted in FIG. 7, but the necessity for a variety of such materials, as well as methods for their incorporation, will be clear to persons versed in naval architecture and civil engineering.

In embodiments, an ONP 702 may include one or more skids 704. In embodiments, the term "skid" may be understood to encompass, except where context indicates otherwise, an open structural form on which one or more components 712 can be mounted and provided interface. The structure of the form can enable the transportation, handling, installing, and operating of the components. In embodiments, skid modules may be built at factories and transported to a shipyard for assembly into blocks or large components/equipment may be built into a skid at the shipyard.

In embodiments, an ONP 702 may include one or more panels 706. In embodiments, the term "panel module." may be understood to encompass, except where context indicates otherwise, an open structural form consisting of flat or shaped metal panels onto which reinforcing supports, doors, walls, and fluid and utility routing can be installed. Panel modules are built at factories in shipyards called panel shops. A panel module may also be used for an externally facing section of the hull: such as a bottom panel, shell panel, deck panel, or bulkhead panel. In embodiments, the term "bulkhead panel" may be understood to encompass, except where context indicates otherwise, a panel that forms a gas impermeable and/or fluid-tight barrier.

In embodiments, an ONP 702 may include one or more Blocks 708. In embodiments, the term "Block module." may be understood to encompass, except where context indicates otherwise, a closed structural form assembled from Panel modules. Skid modules, structural supports, and components in a factory at a shipyard and then relocated to a drydock for further assembly into the final ONP Unit. The Block module may or may not have one or more of its edges acting as the hull of a unit.

In embodiments, an ONP 702 may include one or more Megablocks 710. In embodiments, the term "mega-block module" may be understood to encompass, except where context indicates otherwise, a closed structural form assembled from multiple Block modules, such as joined in a dry-dock. Megablock modules may be suitable for transport between shipyards; which may help distribute the construction work, such as between a variety of shipyards. In embodiments. Megablocks may be skidded or floated in and out of drydock.

In a typical modular manufacturing flow, according to embodiments of the present disclosure, modules of lesser size can be lifted by cranes or otherwise approximated by shipyard facilities to enable them to be joined into large modules. Ultimately, the joining of Megablocks (and, potentially, modules of lesser scope) can produce a finished ONP Unit 702. The Blocks 708 and Megablocks 710 that can be handled by routine shipyard facilities can greatly exceed in size any prefabricated units that can be economically moved overland. e.g., in the construction of a terrestrial nuclear power plant: thus, the modularization of ONP manufacturing flow in a manner that enables assembly to occur at an existing or dedicated shipyard facility can enable the realization of advantages over the prior art. One notable advantage is standardization of modules and of methods for their creation and assembly into larger modules: with shipyard techniques, modules can be relatively large and therefore few in both type (e.g., the four sub-ONP module types depicted in FIG. 7) and absolute number.

Figure 8:
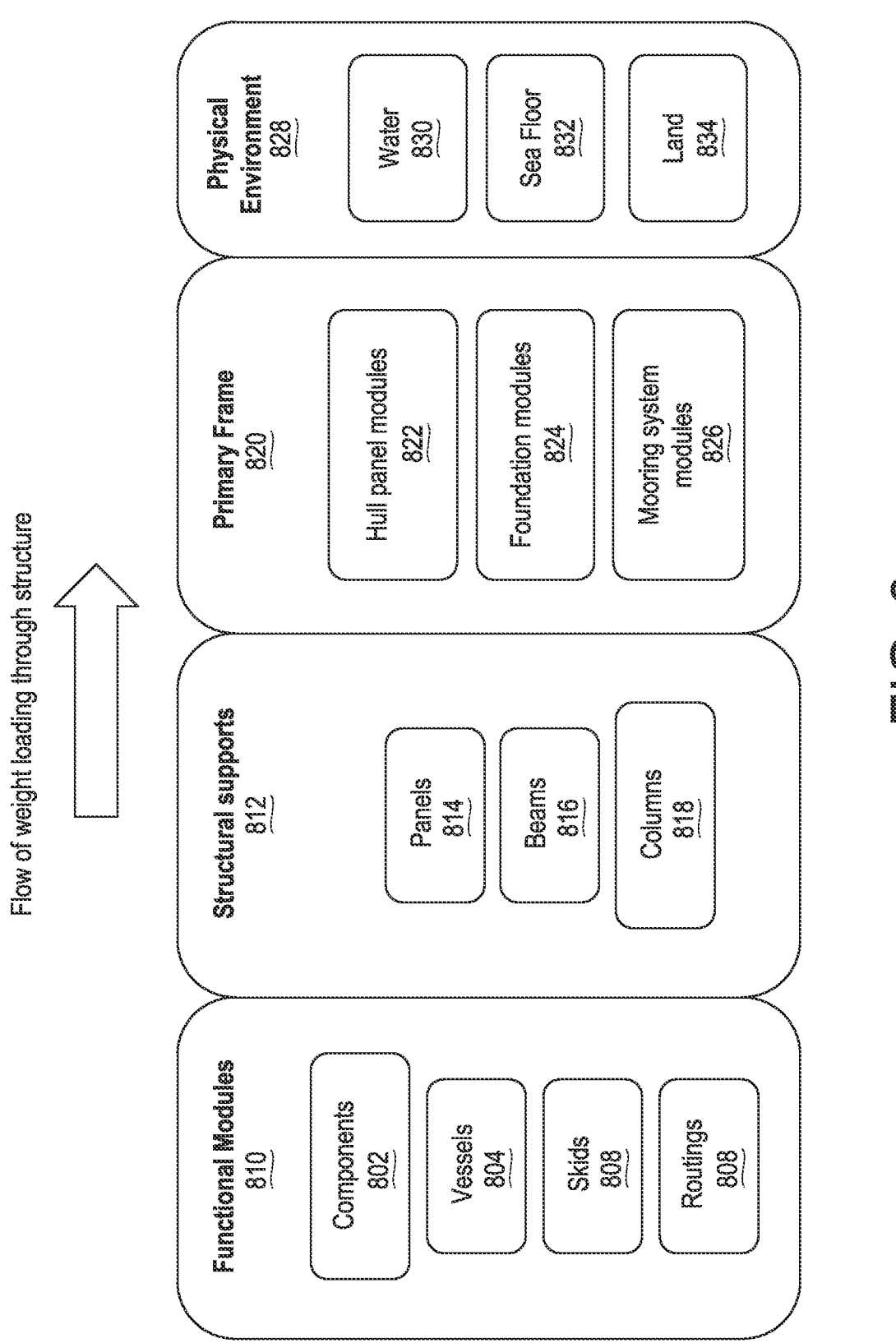
FIG. 8 is a diagrammatic view of how weight loads are transferred through portions of an illustrative ONP to the ONP's environment in accordance with the present disclosure.

FIG. 8 depicts the manner in which weight loads can be transferred through portions of an illustrative ONP to the physical environment. The hierarchy of assembly of FIG. 7 can correspond, typically and approximately, to the hierarchy of support of FIG. 8. Thus, loads originating with components 802 (including vessels 804, a particularly important class of often-massive components). Skids 806, and routings 808 such as wires and pipes, can be transferred first into functional modules 810. In an example, a module at this level of the load hierarchy can be a Skid bearing vessels, routings, and other components. A skid can be analogous to a two-dimensional beam in that it bears load primarily by resisting bending and transferring the load to the points at which the Skid is supported. Modules at the first level of the support hierarchy can typically transfer their loads to structural supports 812: that is, objects or materials capable of bearing, distributing, and transferring loads both horizontally and vertically, including but not limited to panels 814, beams 816, and columns 818. Modules at the second level of the support hierarchy can typically transfer their loads to the primary frame 820 of the ONP unit. Herein, the primary frame 820 of an ONP is that structure of load-bearing members and materials, including the hull, that can define the overall form of the ONP and can transfer load from the interior of the ONP to the environment outside of the ONP. The primary frame 820 can include hull Panel modules 822, a foundation module 824 (if the ONP is in contact with the ground), and mooring system modules 826 (if the ONP is floating and requires lateral restraint). At the final level of the load hierarchy, load can be transferred from the primary frame 820 to the physical environment 828, primarily a sustaining body of water 830 but also including, in embodiments, the sea floor 832 or dry land 834. The environment 828 can be the ultimate sink of all loads but can also be a source of loads. e.g., from water pressure, winds, and waves.

Figure 9:
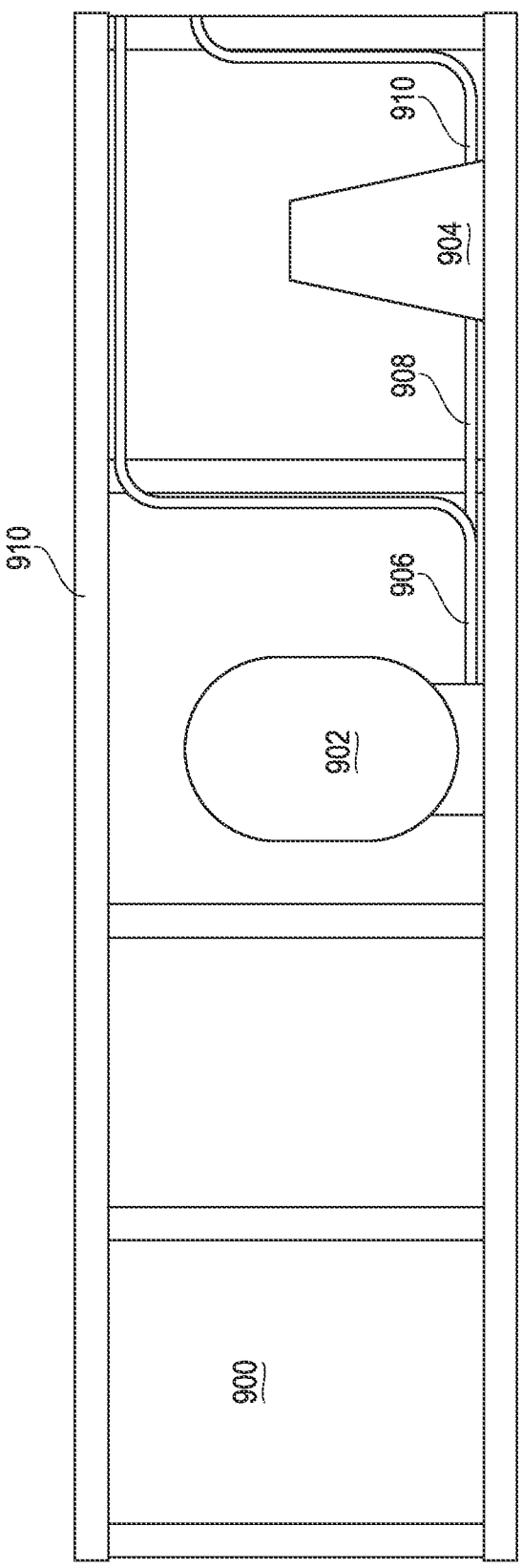
FIG. 9 is a simplified cross-sectional view of an illustrative Skid module in accordance with the present disclosure.

FIG. 9 depicts an illustrative Skid module 900 that includes an illustrative process of modular hierarchical manufacture of an ONP according to the many embodiments of the present disclosure. The Skid 900 can include components (e.g., a vessel 902, a pump 904), routings 906, 908, 910 (e.g., hydraulic, electrical, or telecommunicative lines), and a frame 910. Skids are typically planar in overall form.

Figure 10:
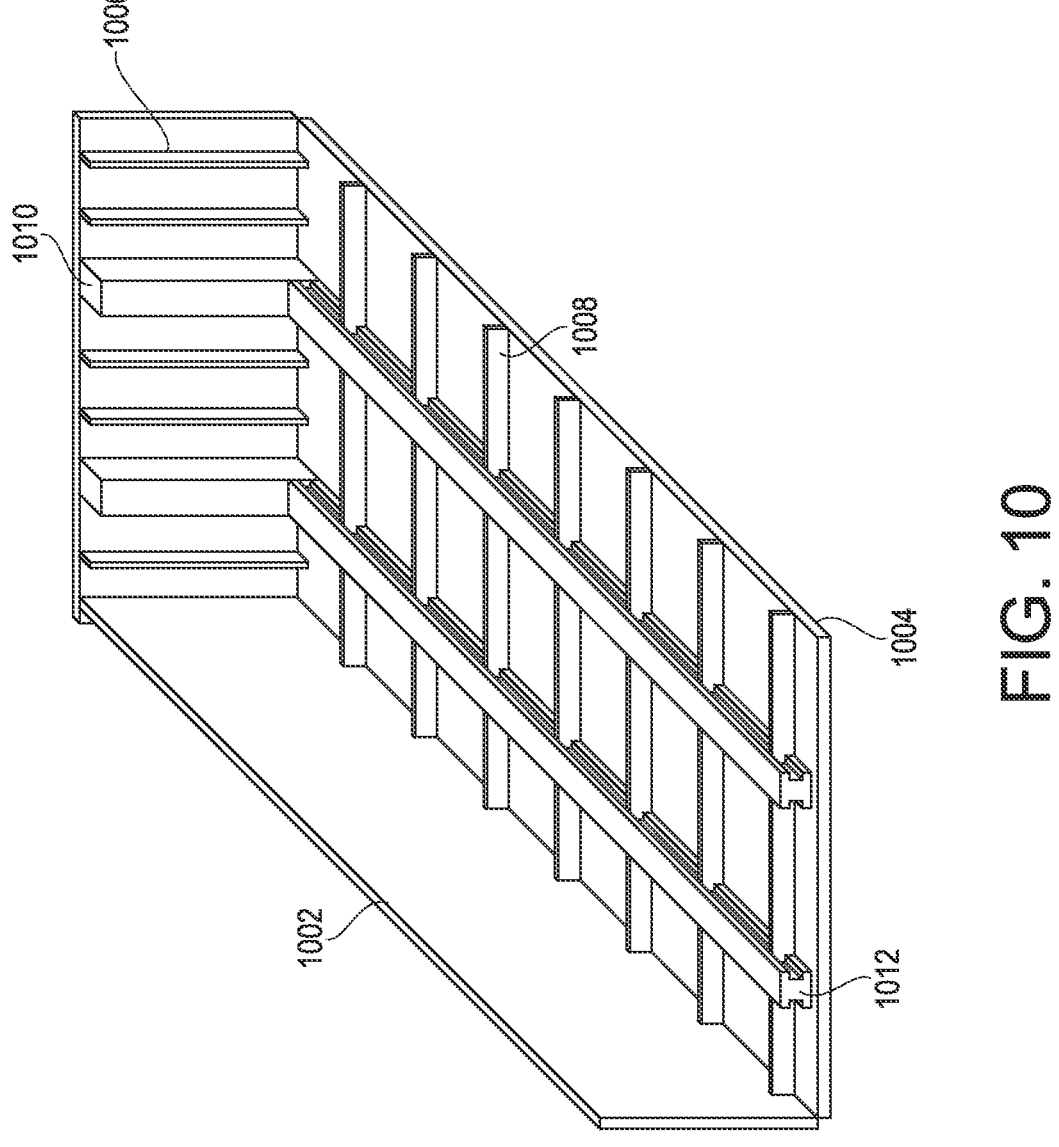
FIG. 10 is a simplified perspective view of structural supports in accordance with the present disclosure.

FIG. 10 depicts types of illustrative structural supports incorporated into levels of an illustrative process of modular manufacture of an ONP. Vertical panels (e.g., vertical panel 1002) and horizontal panels (e.g., horizontal panel 1004) can act as volume-defining barriers and may also contribute to structural integrity. Beams (e.g., beams 1006, 1008) can be typically rectilinear members, affixed to panels, that can prevent panels from deforming. Columns (e.g., column 1010) can be typically rectilinear vertical members that transmit weight loads (e.g., from beams, panels, other columns), eventually to the hull and/or foundation of the ONP and ultimately to the ONP's environment. Girders (e.g., girder 1012) can be typically rectilinear horizontal members, typically heavier than beams, that can transmit or distribute loads horizontally from beams and panels to columns. Although only rectilinear members are depicted in FIG. 10 and other Figures herein, and only horizontal and vertical orientations of members are discussed, it will be appreciated in light of the disclosure that members of other shapes and orientations are included in many embodiments of the present teachings.

Figure 11:
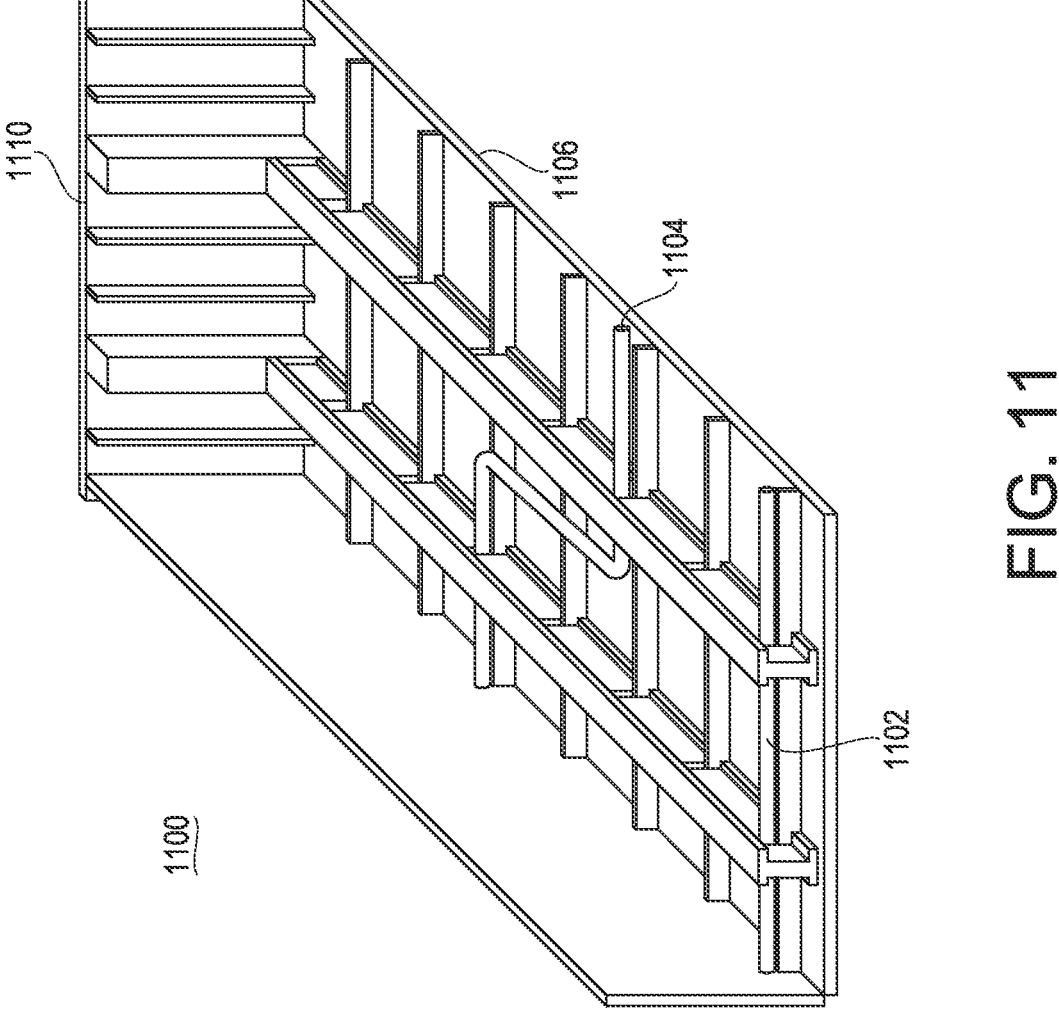
FIG. 11 is a simplified perspective view depicting a stage of an illustrative modular ONP manufacturing process in accordance with the present disclosure.

FIG. 11 depicts an illustrative unit 1100 of modular hierarchical manufacture of an ONP according to many embodiments of the present disclosure. At level 1100, routings 1102, 1104 can be mounted to a horizontal panel 1106 to which, in the Figure, other structural supports have been attached. Routings can also be mounted to the structural framework of a vertical panel (e.g., panel 1110). Typically, during manufacture the upper (depicted) side of the Panel 1106 can be that side which will, in the finished ONP, become the nether side of the panel: manufacture can be simplified by working on the skid in an upside-down position so that gravity tends to hold parts in place during assembly and welds can be performed facing downwards, saving significant manufacturing effort. Vessels and other components (not depicted in FIG. 11) can also be typically affixed to the Panel 1004 after it has had its routings installed and been flipped over.

Figure 12:
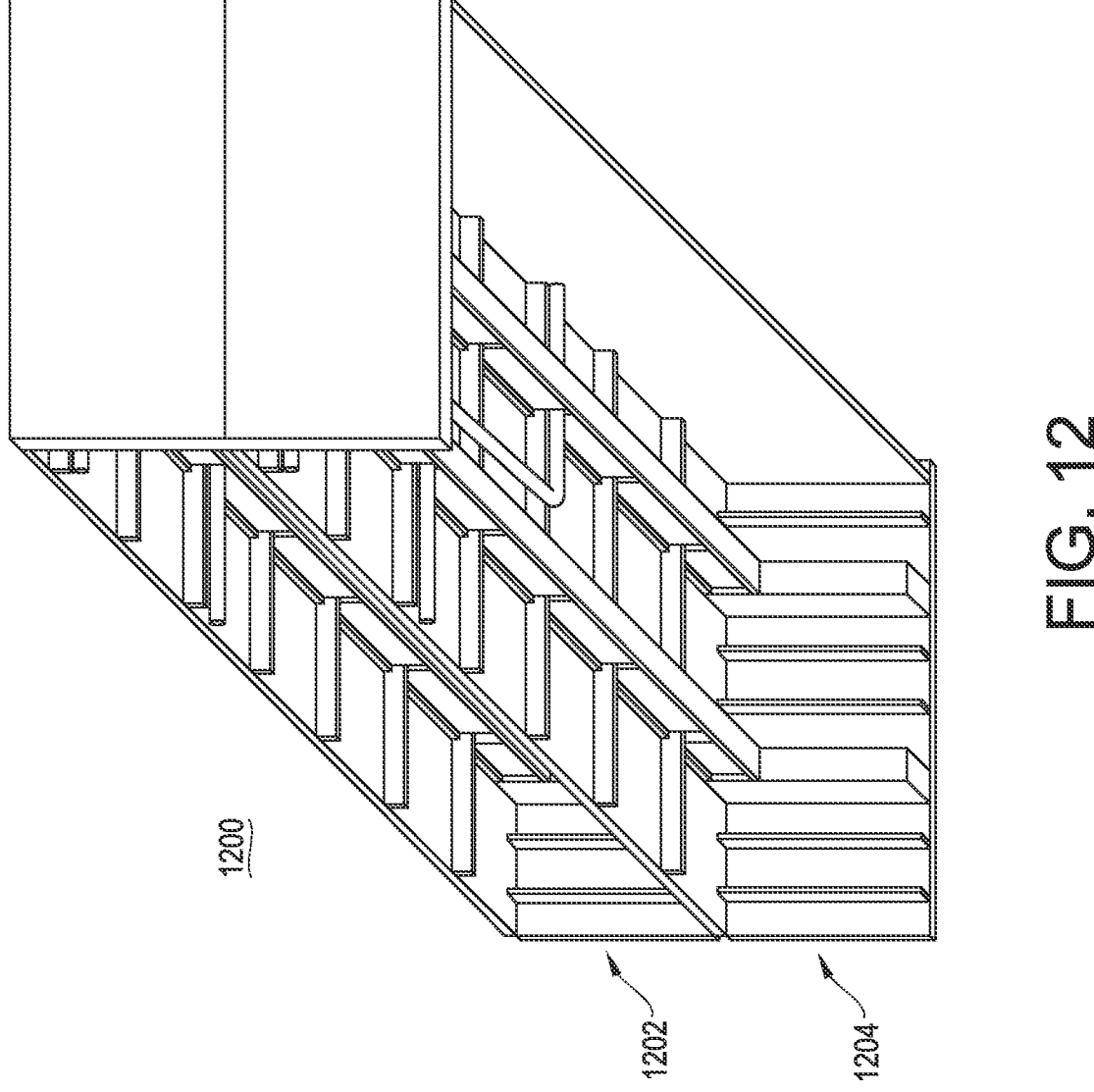
FIG. 12 is a simplified perspective view depicting an illustrative Block module in accordance with the present disclosure.

FIG. 12 depicts an illustrative Block module 1200 that can include an illustrative process of modular hierarchical manufacture of an ONP according to many embodiments of the present disclosure. Block 1200 can be produced in part by inverting two panel modules 1202, 1204 similar to panel module 1100 of FIG. 11 and affixing one of the panel modules atop the other. Some connections between routings may be made during assembly of a Block 1200. Blocks can be typically of a size amenable to handling by shipyard cranes. i.e., can be relatively easy to move in factory settings.

Figure 13:
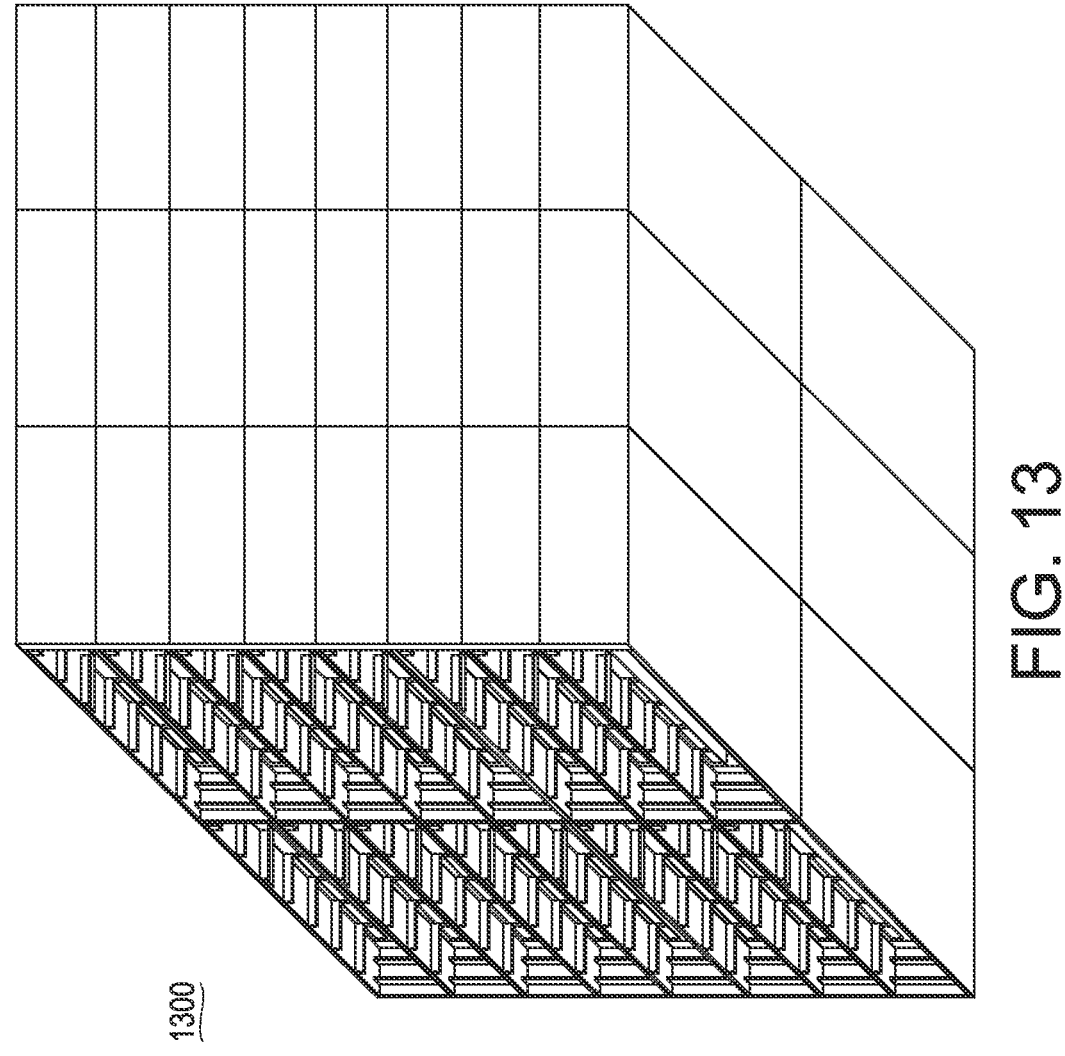
FIG. 13 is a simplified perspective view depicting a megablock module in accordance with the present disclosure.

FIG. 13 depicts an illustrative Megablock module 1300 that can include an illustrative process of modular hierarchical manufacture of an ONP according to many embodiments of the present disclosure. Megablock 1300 can be produced in part by stacking 24 blocks similar to block 1200 of FIG. 12 and affixing them to one another. Connections between routings can be typically made during assembly of a Megablock 1300. Panels can be added to the bottom of Megablock 1300 in order to floor the unit. Megablocks can be typically too large to be handled by shipyard cranes. i.e., can be relatively difficult to move. Megablock movement can be therefore preferably minimized during ONP manufacture. Megablocks can typically be moved by contrivances for rolling short distances (often termed "skids." not to be confused with Skids such as Skid 900 of FIG. 9) or by customized jacking arrangements. Megablocks can in some cases also be moved by floating and towing. e.g., from one shipyard drydock to another.

Typically, two or more Blocks and Megablocks can be joined to form a completed ONP, often with the addition of some lower-level modules, components, and materials as well.

Figure 14:
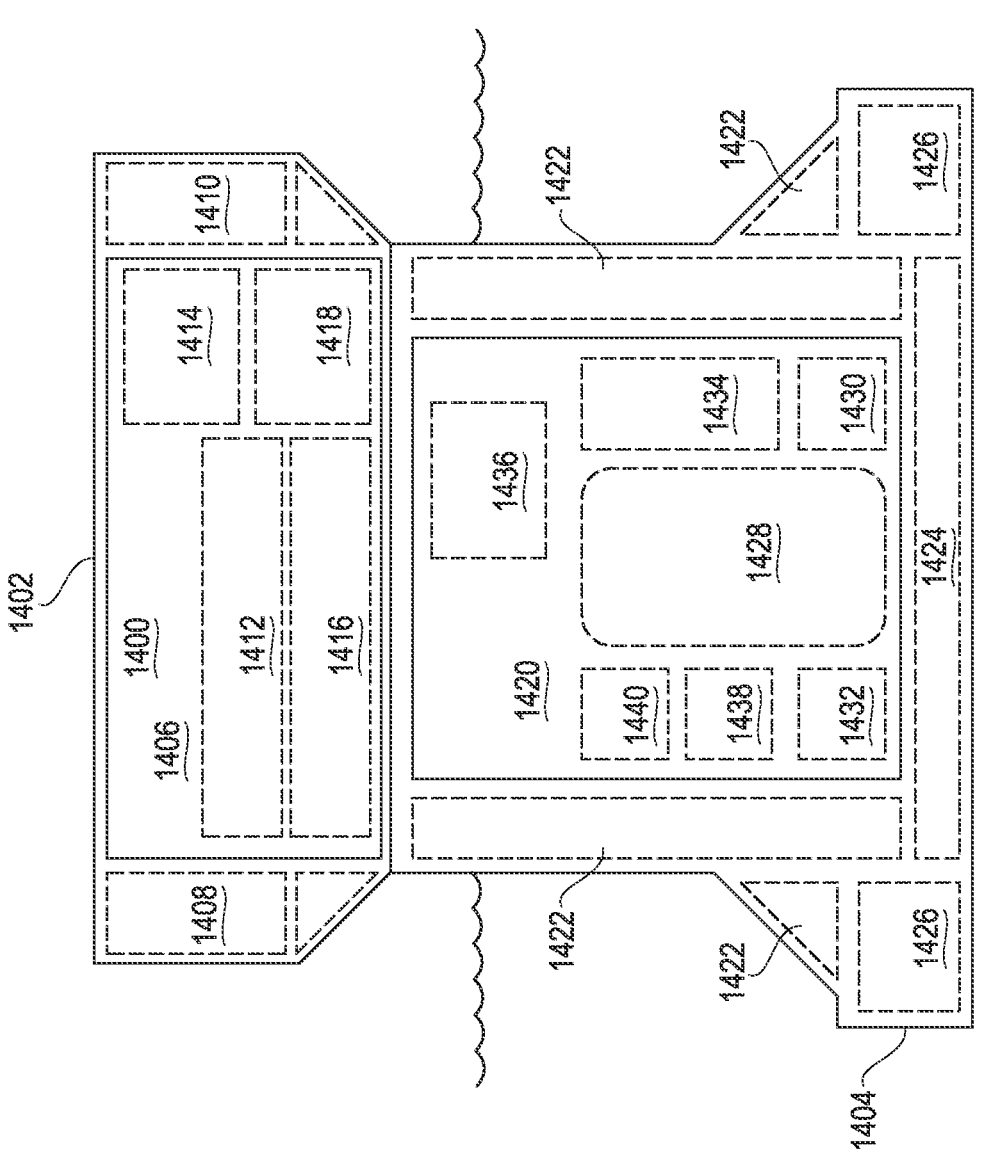
FIG. 14 is a schematic cross-sectional view depicting of modules constituting an exemplary ONP in accordance with the present disclosure.

FIG. 14 depicts the Block and Megablock modules that can constitute an illustrative ONP Unit 1400 of a floating cylindrical type. Toroidal Blocks can appear as symmetrically positioned shapes marked with a common indicator number. In FIG. 14. Block boundaries are denoted by dashed lines and Megablock boundaries by solid lines. The ONP 1400 can include an Upper Hull Megablock 1402 and Lower Hull Megablock 1404. The Upper Hull Megablock 1402 include a Power Conversion System Megablock 1406, a Crew Accommodation Block 1408, an External Access and Security Block 1410, a Turbine Generator Set Block 1412, a Turbine Generator Set Auxiliary Block 1414, a Condenser Block 1416, and Condenser Auxiliary Block 1418. The Lower Hull Megablock 1404 can include a Nuclear Island Megablock 1420, a Ballast Tank Block 1422, a Base Plate
Block 1424, a Stability Skirt Block 1426. The Nuclear Island
Megablock 1420 can include a Reactor Containment Block
1428, two Water Storage Blocks 1430. 1432, an Emergency
Electrical Block 1434, a Nuclear Fuel Block 1436, a Chemi-
cal Volume Control System Block 1438, and a Cooling
System Block 1440.

Figure 15:
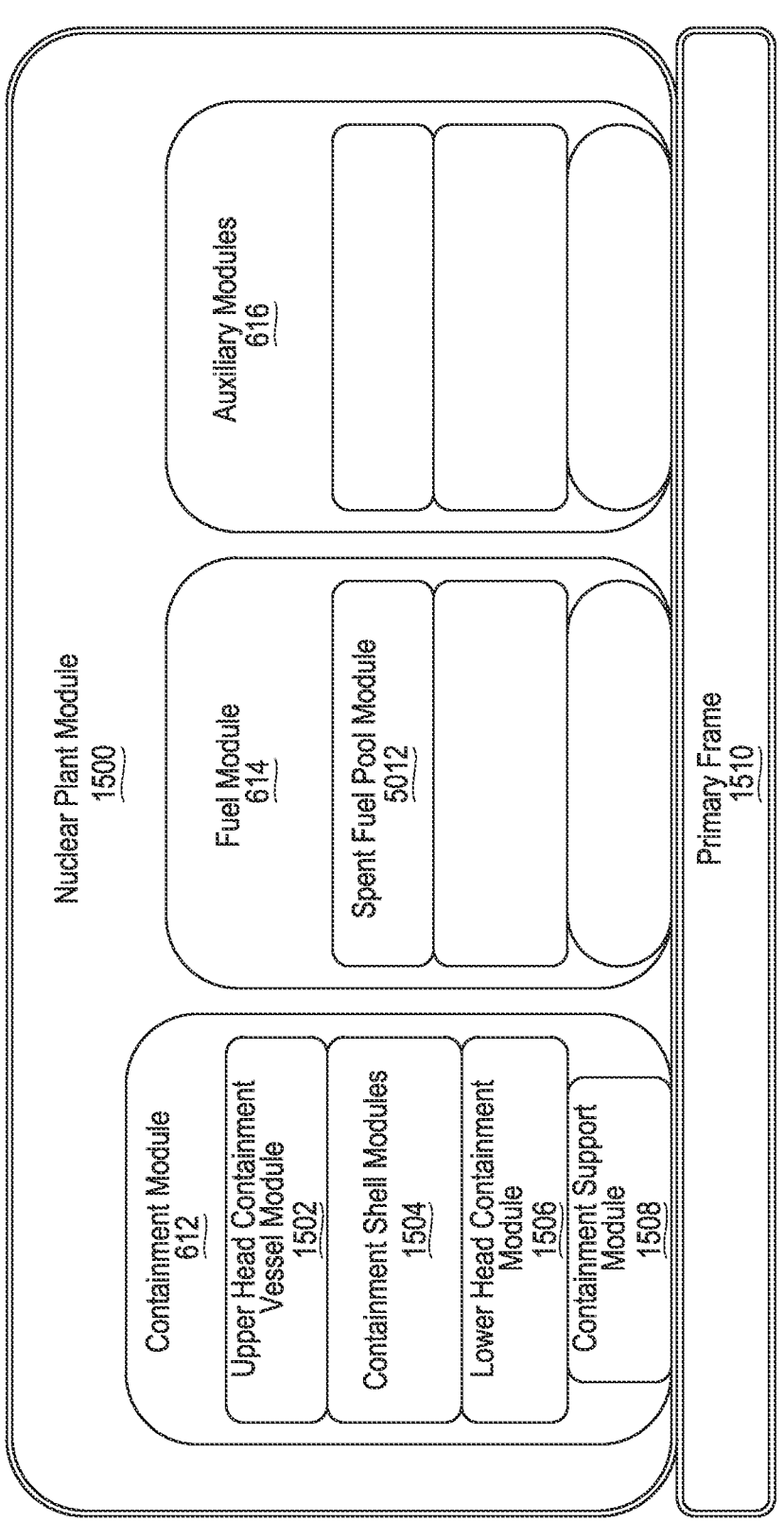
FIG. 15 is a schematic view depicting relationships of modules pertaining to a Nuclear Plant Module in accordance with the present disclosure.

FIG. 15 depicts the relationships of modules pertaining to
a Nuclear Plant Module 1500 according to many embodi-
ments of the present disclosure. The Nuclear Plant Module
1500 can include a Containment Module 612, a Fuel Module
614, and Auxiliary Modules 616 (where Modules 612, 614,
and 616 are also shown in FIG. 6). The Containment Module
612 can include an Upper Head Containment Vessel Module
1502, a Containment Shell Module 1504, a Lower Head
Containment Module 1506, and a Containment Support
Module 1508. The Containment Support Module 1508 can
enable the weight load of the Containment Module to be
interfaced, directly or indirectly, with the Primary Frame
1510 of the ONP Unit. The provision of the Containment
Support Module 1508, also herein termed a Containment
Vessel (CV) support, shall be clarified with reference to
FIGS. 16-20 in accordance with the many embodiments of
the present teachings. The Fuel Module 614 can include a
Spent Fuel Pool Module 5012 and other modules. The
weight loads of the Fuel Module 614 and Auxiliary Modules
616 can be, like that of the Containment Module 612,
connected to the Primary Frame 1510.

Support of a Nuclear Containment Vessel

In embodiments, an ONP unit may include a containment
vessel (CV) for containing a nuclear reactor. The CV may be
a pressure-vessel-type containment vessel that contains the
reactor under pressure that exceeds atmospheric pressure
during a contingency, such as the breach of a pressurized
system within the containment.

Pressure vessel-type containment vessels of various
shapes (e.g., spherical, cylindrical, cylinder capped with
hemispheres) may be used in an ONP unit. In embodiments,
there are certain advantages of spherical containment ves-
sels, including that spherical containment vessels minimize
containment mass and volume for a given design pressure,
that spherical containment vessels have been used in
licensed nuclear power plants, and that spherical contain-
ment vessels have favorable dimensions for reducing the
overall volume of the Nuclear Systems Block (Block 114 in
FIG. 1) within an ONP, which is an important consideration
in ONP designs, as the volume of the nuclear systems block
is an important factor driving the overall dimensions of the
ONP unit. Spherical CVs are depicted in the Figures, but it
will be understood that this does not restrict the shapes of
CVs that are contemplated and within the scope of the
present disclosure.

The many embodiments of the present disclosure include
transferring the weight of a CV or of another massive vessel
to the primary frame of an ONP and thence to the ONP's
environment in a manner that can be appropriate to a marine
structure. Systems and methods for CV support in an ONP
should entail minimal mass, volume, and cost. Because
constraints on mass and volume apply in the marine archi-
tectural context that do not apply in to terrestrial nuclear
power plants, acceptable direct cost of CV support may be
higher for an ONP than a terrestrial nuclear power plant.
Direct costs, if higher for a CV of given size, can be more
than offset by the advantages enabled by other aspects of an
appropriate CV support system.

Figures 16A, 16B, 16C:
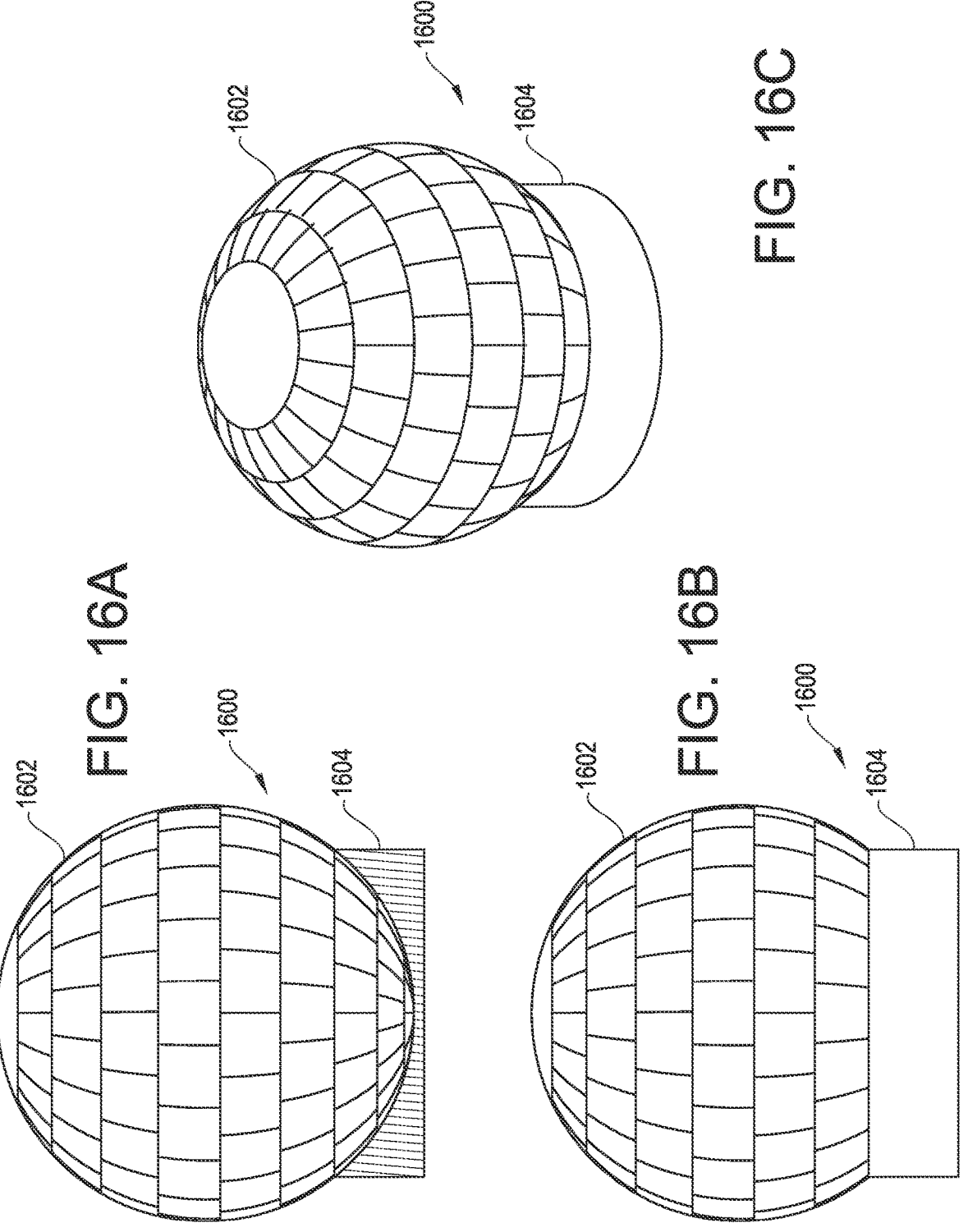
FIGS. 16A, 16B and 16C are side and perspective views of exemplary systems for support of a containment vessel in accordance with the present disclosure.

FIG. 16A. FIG. 16B, and FIG. 16C show portions of a first
illustrative system 1600 for supporting a CV 1602 in an ONP. The system 1600 can include a shaped support struc-
ture or bed 1604 of concrete, metal foam, or other approxi-
mately homogeneous material of high compressive strength.
A concavity in the bed 1604 can be complementary to the
shape of the CV 1602, and can enable the weight of the CV
1602 to be borne by the bed 1604 in a distributed manner.
An advantage of the system 1600 is that the load upon any
given point of the CV 1602 can be equal to or less than the
corresponding load for any other possible support system
that can impinge upon an equal nether area of the CV 1602.
Force load on all supported points of the CV1602 can be
shown to be minimized when the bed 1604 makes contact
with the entire nether hemisphere of the CV 1602. In various
embodiments, the bed 1604 can be constituted primarily by
a non-homogeneous material (e.g., reinforced concrete); can
be constructed as a single unit; can be assembled from a
number of sub-units: can include layers or other dispositions
of more than one material; or can otherwise differ from the
homogeneous bed 1604 of FIG. 16. Also in various embodi-
ments. CV beds can have non-vertical sides, rather than the
vertical sides depicted in FIG. 16: e.g., the lateral surface of
the CV bed can have the form of a truncated cone.

Figure 17:
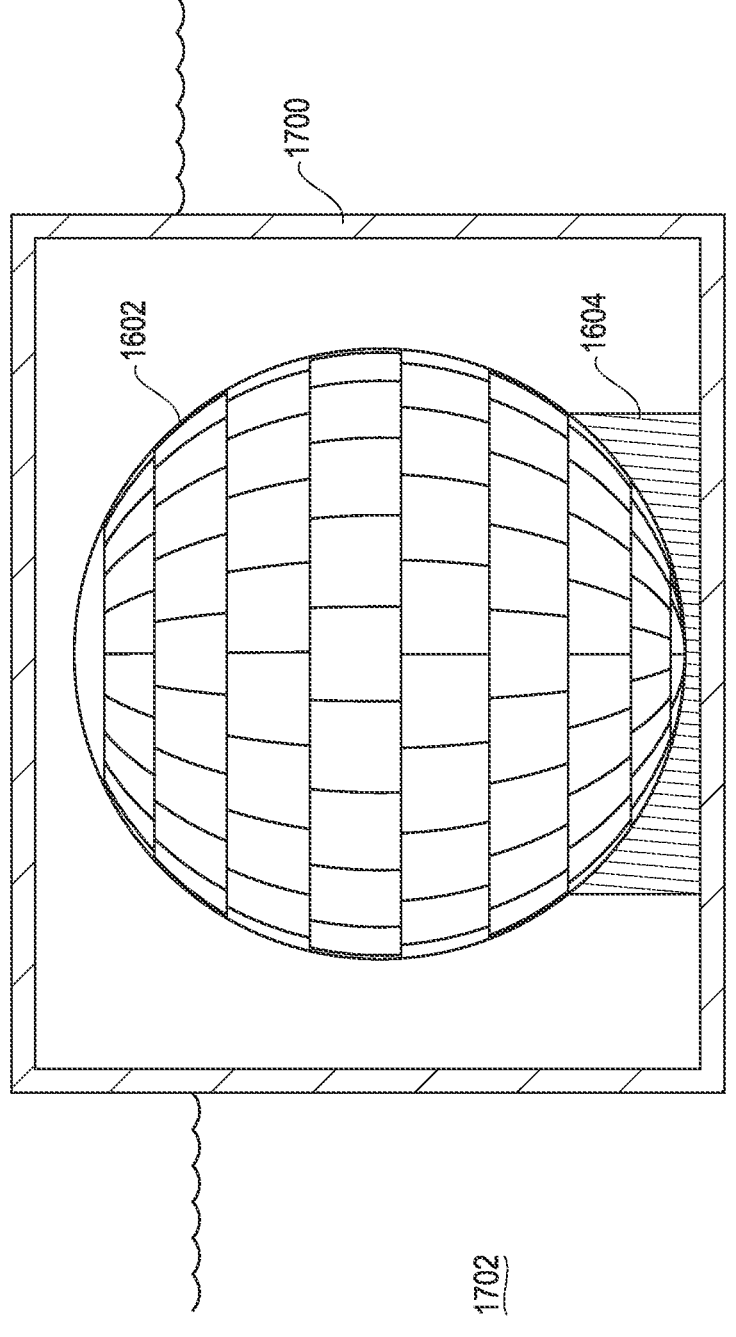
FIG. 17 shows the containment vessel support system of FIG. 16A in the context of an ONP's primary frame in accordance with the present disclosure.

FIG. 17 shows the CV support system 1600 of FIG. 16 in
the context of an illustrative ONP primary frame 1700.
Weight load can be transferred from the CV 1602 to the bed
1604, thence to the primary frame 1700, and finally to the
environment (e.g., ocean 1702). Other CV support systems
can be depicted herein to also mediate the transfer of weight
from the CV itself to interior portions of the ONP and thence
to the environment, although the details of such load transfer
can vary widely among embodiments.

Figures 18A, 18B, 18C:
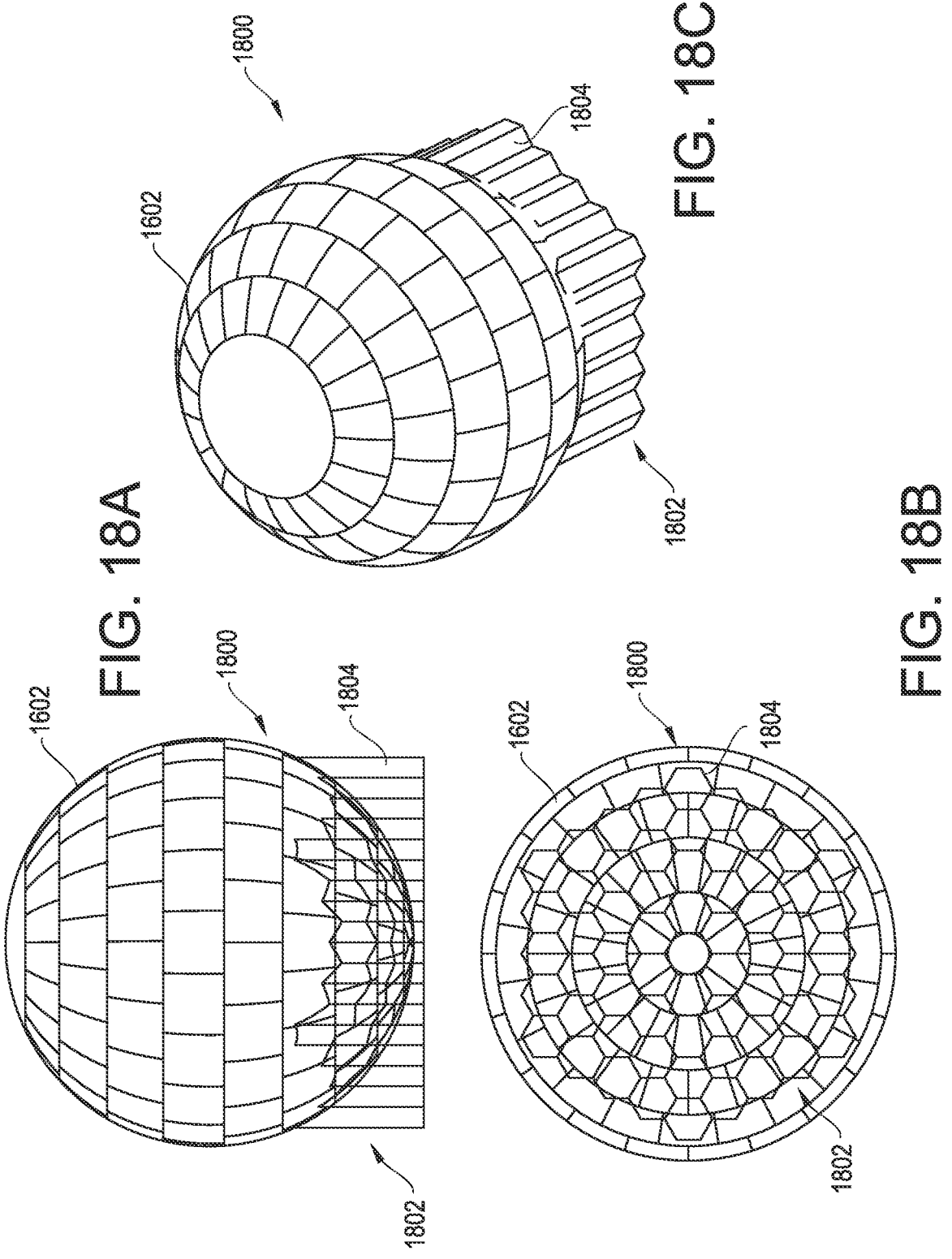
FIGS. 18A, 18B and 18C are side and perspective views of additional exemplary systems for support of a containment vessel in accordance with the present disclosure.

FIG. 18A. FIG. 18B, and FIG. 18C show portions of
another illustrative CV support system 1800 for supporting
a CV in an ONP. The support system 1800 can include a
lattice 1802 of approximately rectangular steel sheets (e.g.,
sheet 1804) bent and/or combined by welding so as to form
a vertically oriented lattice of hexagonal forms. The upper
edge of each sheet (depicted with dashed lines in FIG. 18A)
can meet a portion of the nether surface of the CV 1602 and
can bear a portion of the weight of the CV 1602: the lower
edge of each sheet can transfer a portion of the weight of the
CV 1602 to a Skid or other structural component of the ONP.

In embodiments, a cellular lattice (e.g., lattice 1802) may
be welded, such as from a series of metal (e.g., steel) plates.
Welding may be accomplished by a special purpose welding
robot that is configured to be disposed within a cell of the
cellular lattice and configured with one or more robotic arms
or similar facilities for undertaking welds on the interior
angles of the cells. For example, a robot with six robotic
arms, each having a welding tool, may be configured to be
disposed in the interior of a hexagonal cellular lattice to
support rapid assembly of the support lattice.

FIG. 19A. FIG. 19B. FIG. 19C. FIG. 19D, and FIG. 19E
depict illustrative and exemplary lattice types. In embodi-
ments, a lattice structure 1900 may be used, such as a
triangular lattice 1902 (FIG. 19A), a rectangular lattice 1904
(FIG. 19B), various hexagonal lattices 1906 (FIG. 19C).
1908 (FIG. 19D). 1910 (FIG. 19E), and the like, where the
interface of the lattice structure 1900 with the spherical
containment vessel can be shaped to correspond to the
spherical curvature of the containment vessel. A supporting
lattice may include regular lattice structures or irregular
lattice structures, such as ones that include smaller and
larger elements of various geometric shapes. Also, a lattice
may include one or more of sheets, rods, cylinders, solid
volumes of material, and other forms, without restriction.

Figures 20A, 20B:
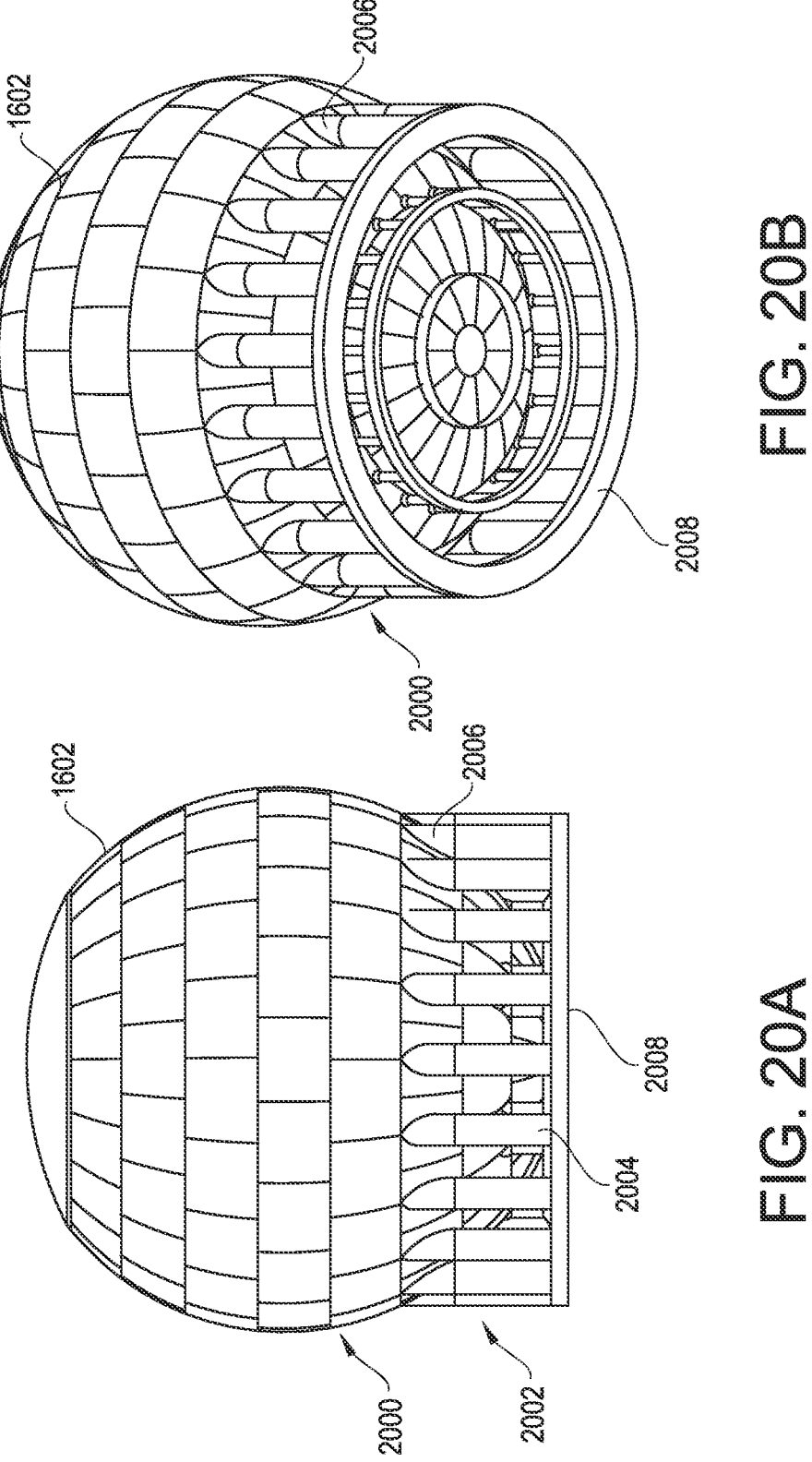
FIG. 20A is a side view of an additional exemplary system for support of a containment vessel in accordance with the present disclosure.
FIG. 20B is a perspective view of the system for support of the containment vessel of FIG. 20A.

FIG. 20A and FIG. 20B show portions of another illustrative system 2000 for supporting a CV in an ONP. In embodiments, a columnar CV support structure 2002 may include one or more vertical columns (e.g., column 2004). The columns of system 2000 can be approximately cylindrical, but various embodiments can include columns of other forms, such as rectangular columns, cylindrical columns, or the like. Columns of various sizes and forms can include various embodiments. The vertical columns may have end elements to interface with the spherical shape of the CV (e.g., end element 2006). The columns may also interface with one or more support structures (e.g., ring-shaped structure 2008) that mediate transfer of weight loads to other portions of the ONP.

In FIG. 18A through FIG. 20B. CV support systems are depicted as vertical in orientation. Such orientation can minimize the footprint of the support system and may thus be advantageous in the context of an ONP. In various other embodiments, the lattice of FIG. 18A. FIG. 18B, or FIG. 18C or another lattice (e.g., the lattice structures 1900 of FIG. 19A through FIG. 19E), or the columnar supports of FIG. 20A and FIG. 20B, can be formed or oriented so that the support system's component sheets, columns, rods, or other weight-bearing parts can encounter the surface of the CV 1602 at an angle normal to that surface, or across a range of encounter angles that deviates less on average from the normal than the range of encounter angles entailed by an array of strictly vertical supports. Such embodiments can support a given CV 1602 using less material than a purely vertical structure, but may have larger footprints and be more complex to manufacture.

Portions of CV support systems of FIG. 18A through FIG. 20B, and of other embodiments not explicitly shown, can in various embodiments be combined: in an example, a central nether portion of a CV can be supported by a bed system, while a circumferential nether portion of the CV can be supported by columns or a lattice.

The present disclosure further provides that nuclear power has been shown to be the most rapidly deployable and reliable clean energy source available to humankind. New plants can accelerate decarbonization of the electric power grid, drive economic growth, deliver new jobs, and provide a vital opportunity for industrial exports. However, significant delays and increased costs have arisen from stagnant approaches to project management, construction methods and decommissioning. To pioneer industry innovation and elevate economic opportunities in nuclear fission, we can revitalize and improve these processes. This collaborative project proposes a disruptive, cross-industry approach to achieve major cost reductions, improve asset integrity, and develop the UK supply chain for new capabilities.

The present disclosure includes applying shipyard manufacturing methods to nuclear plant construction. By fabricating code-compliant nuclear plant components and combining them into modules in a controlled factory setting, vast improvements in scheduling, cost reduction, asset integrity and quality control can be produced. In addition, it can be shown that there are significant benefits for decommissioning that arise from utilizing a float-out NPP design, which allows for the possibility of dismantling and recycling at the end of life. Successful execution can stimulate cross-industry knowledge transfer, develop the supply chain, and open new revenue opportunities.

The approach aims to utilize shipyard construction to build a NPP as a complete float-out unit in a specially equipped shipyard and tow it to customer sites for onshore or shallow water installation. This can allow a single build site to deliver to any customer site with proximity to seas or waterways. Applying shipyard manufacturing to nuclear construction can have the potential to transform the value proposition for nuclear power. Shipyards can achieve world-class productivity through block construction, where modules can be manufactured and outfitted in assembly-line production. The blocks can then be assembled in a dry-dock to produce the final vessel. Fabricating nuclear components into modules in a controlled factory setting can be shown to allow for improvements in scheduling, cost, asset integrity, and quality control. Specialized techniques and equipment, which can be expensive or impractical for field use, can be made possible by outfitting a shipyard facility specifically for nuclear builds. Examples of the present disclosure include robotic manipulation, automated welding, coating, testing, and advanced joining such as laser or electron beam welding. The present disclosure envisions a high quality standardized plant design that can be enabled by single site build methodology. Benefits can also arise for decommissioning by enabling dismantling and recycling by towing the retired plant to a breaking yard equipped for this purpose. The NPP can be designed with this in mind to ensure that dismantling can be performed in a cost-effective manner. This is in contrast to existing NPPs which must be demolished in-place at end of life and where design for dismantling is not a high priority.

Aspects of the present disclosure include deployment of existing technology and leveraging advanced manufacturing capabilities to ensure maximum competitiveness in a global market. Examples include a reactor plant design optimized for the shipyard constructed power plant, a set of fabrication process, a quality assurance program satisfying regulatory requirements, and a demonstrator build to prove these developments in practice. In the many examples, one focus of this project is >1000 MWe light water reactors (LWR), but can also be applicable to advanced and small modular reactors (SMRs). The present disclosure includes viable methods of reducing the build cost of new nuclear plants to an extent that can create a step change in the ability to deliver electrical power and process heat to a significant fraction of the globe.

Figure 21:
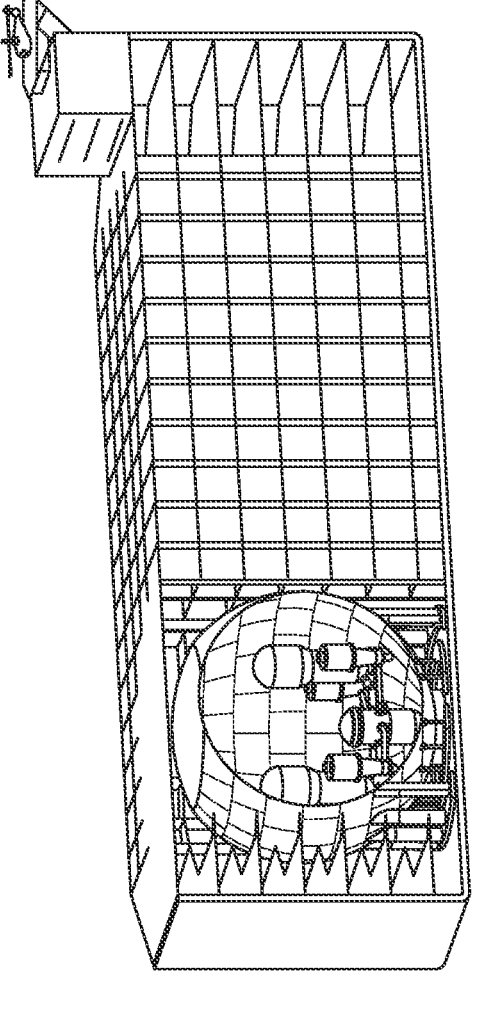
FIG. 21 is a diagrammatic cross-sectional view depicting of modules constituting an exemplary ONP having areas applicable to nuclear codes and areas applicable to shipbuilding codes in accordance with the present disclosure.
Figure 22:
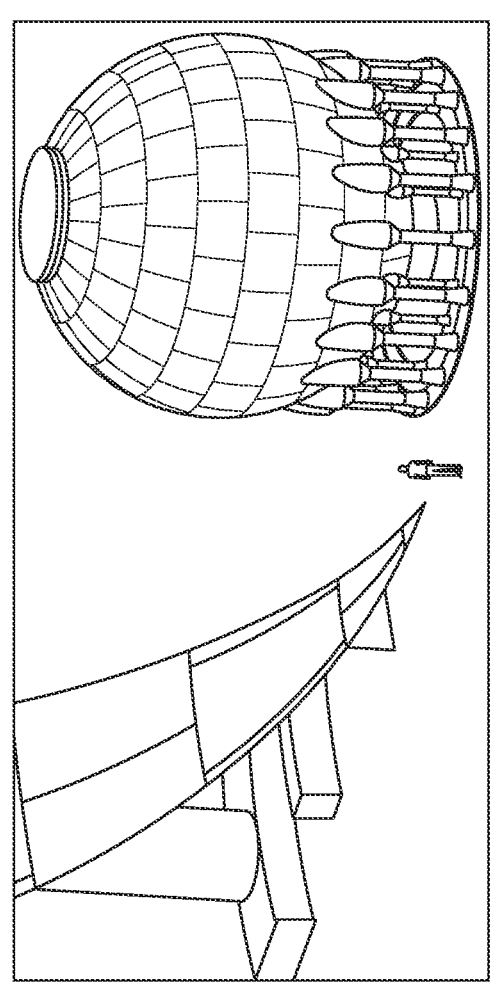
FIG. 22 is a diagrammatic view depicting additional exemplary system for support of a spherical containment vessel in accordance with the present disclosure.
Figure 23:
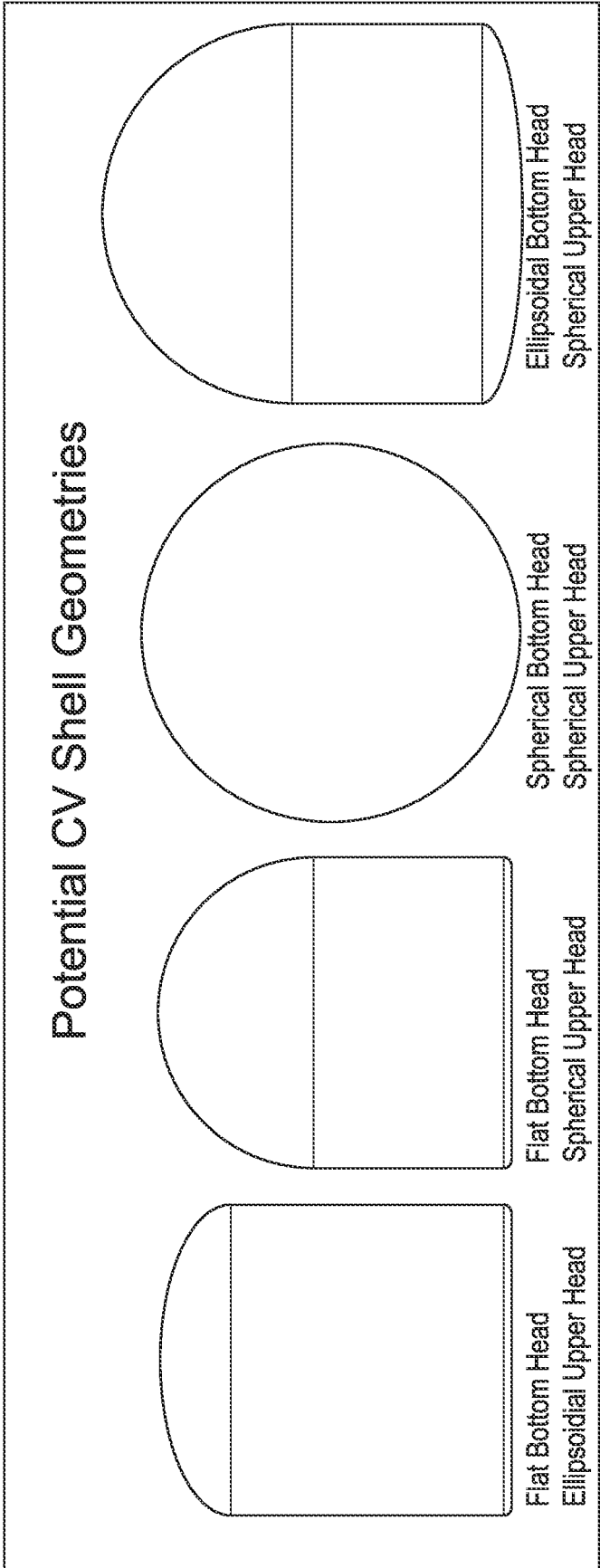
FIG. 23 is a diagrammatic view depicting additional exemplary containment vessel shell geometries including a flat bottom head with an ellipsoidal upper head, a flat bottom head with a spherical upper head, a spherical bottom head with a spherical upper head, and an ellipsoidal bottom head with a spherical upper head in accordance with the present disclosure.
Figure 24:
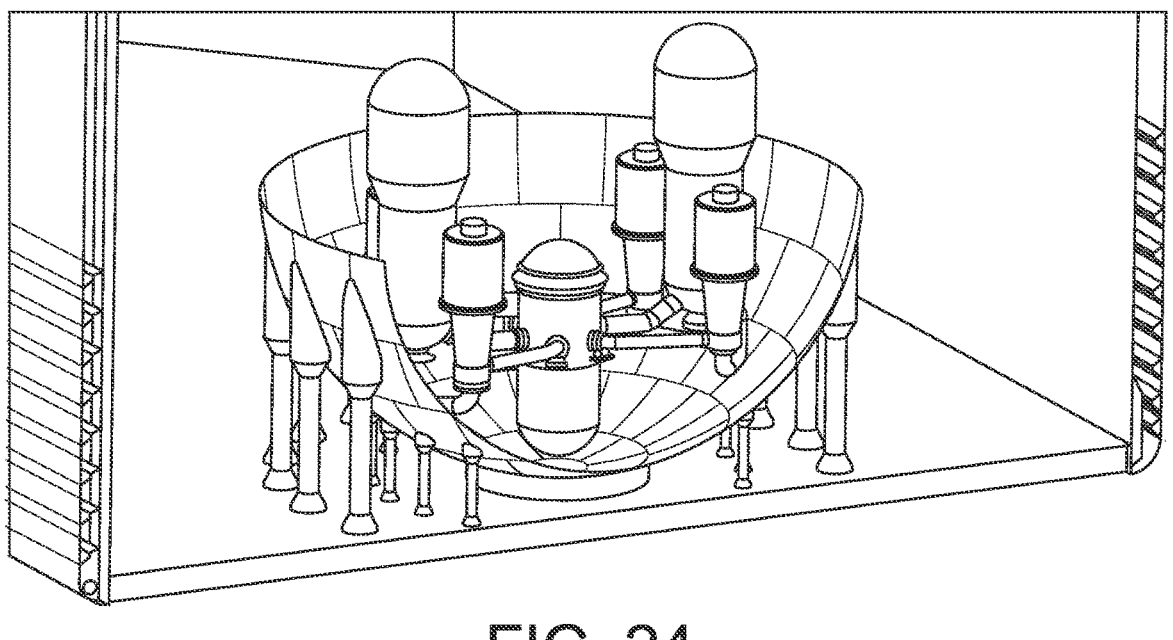
FIG. 24 is a diagrammatic view depicting an exemplary system for support of a spherical containment vessel having multiple turbines in accordance with the present disclosure.
Figure 25:
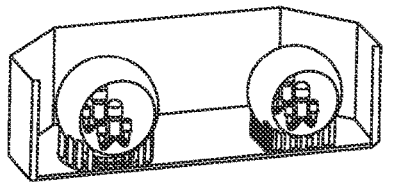
FIGS. 25, 26 and 27 are diagrammatic views depicting exemplary systems for support of spherical containment vessels in accordance with the present disclosure.
Figure 26:
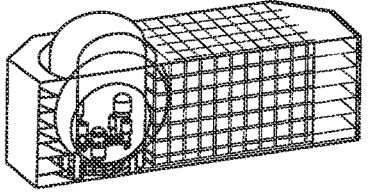
Figure 27:
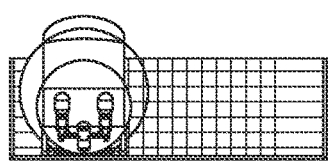

The design of the containment vessel (CV) can require expertise in marine engineering, pressure vessel engineering, and nuclear engineering. The CV can be designed in parallel with the reactor plant and ship structure to produce an optimal design. Categories of design codes and areas of applicability are illustrated in FIG. 21. Possible configurations of the weldment are shown in FIG. 22. Potential geometries for the CV shell are illustrated in the FIG. 23. FIG. 24, FIG. 25, FIG. 26, and FIG. 27 depict additional configurations of the CV shell and construction in accordance with the many aspects of the present disclosure.

In many aspects of the present disclosure, the Containment Vessel (CV) can include the following attractive attributes: CVs are required for all LWR designs including Boiling and Pressurized water reactors. The size and amount of erected steel involved can make it a useful demonstration of shipyard fabrication and erection.

A CV is a large pressure vessel built to nuclear design codes and as such it is an inherently multidisciplinary project. The skills and techniques required to build it will be applicable for constructing much of the rest of the project.

CV re-design as a barge-deliverable structure can be shown to represent a ready opportunity for a design for manufacture exercise. The size and form factor of the CV can be a significant driver of the size and height of the overall offshore nuclear plant structure which can make it an attractive item for design optimization with significant cost implications beyond the item itself.

In many examples, the outputs of this project can be shown to be at least a reactor plant design optimized for the shipyard constructed power plant, a set of fabrication process, a quality assurance program satisfying regulatory requirements, and a demonstrator build to prove these developments in practice. In one example, the focus of this project can be a >1000 MWe light water reactors (LWR). One results can be shown to include a viable method of reducing the build cost of new nuclear plants to an extent which will create a step change in the ability to deliver electrical power and process heat to a significant fraction of the globe.

In embodiments, the present methods and systems include a large boiling water reactor (BWR) based unit. The present methods and systems include a deployment model for the shipyard manufacture and marine delivery of nuclear power plants to significantly increase the attractiveness of nuclear project investment. The deployment model can be shown to reduce costs, speed delivery, reduce key project risks, enhance passive safety, and expand siting options for large-scale and small modular reactors (SMRs) based nuclear power plants.

Figure 28:
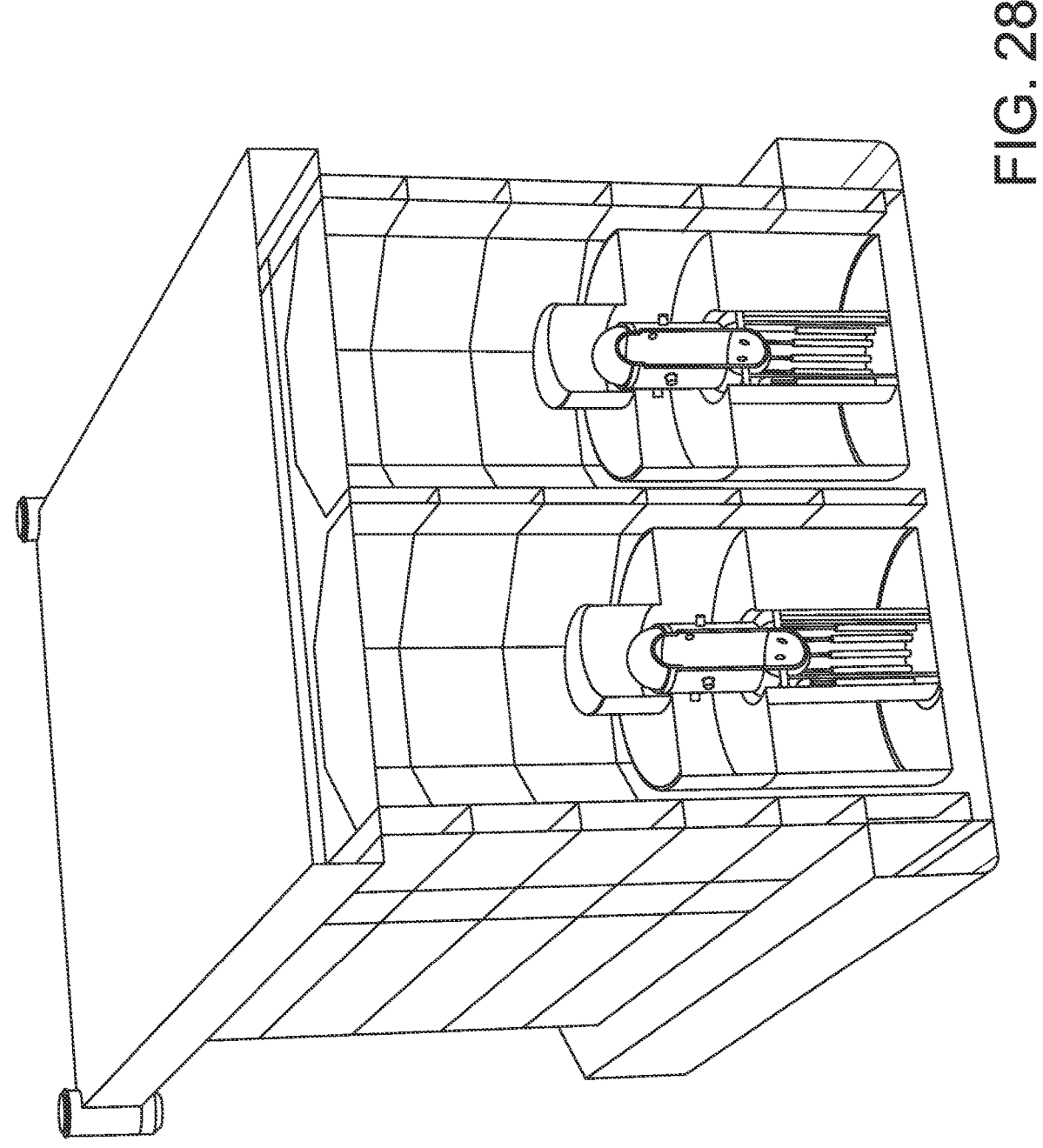
FIG. 28 and FIG. 29 are diagrammatic views depicting exemplary ABWR systems integrated into a shipyard manufactured, fully assembled unit for float-out delivery to a harbor-based installation in accordance with the present disclosure.
Figure 29:
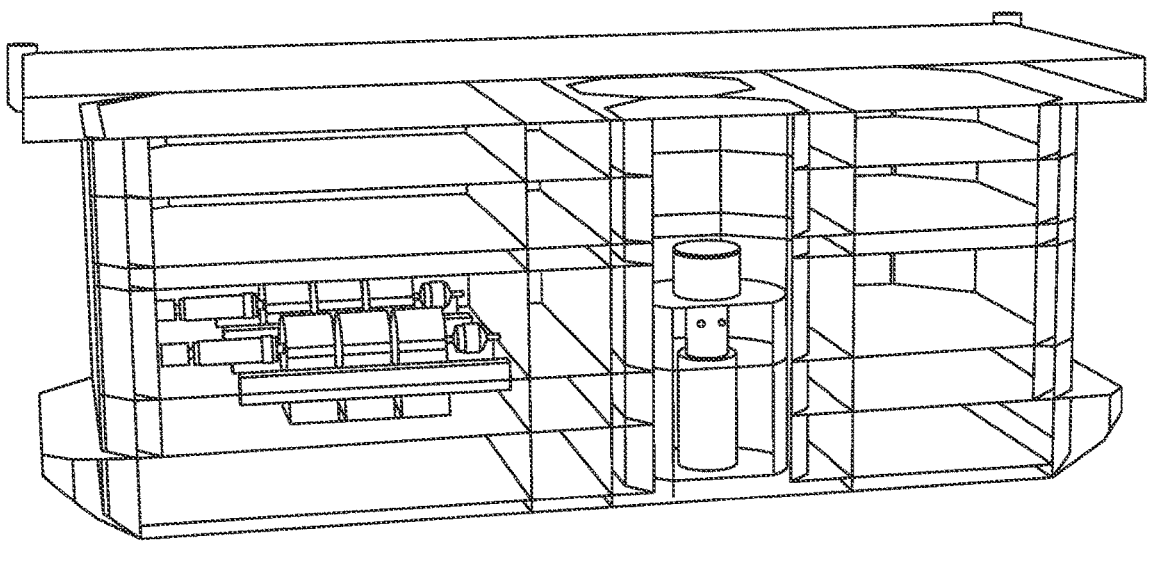

In embodiments and with reference to FIG. 28 and FIG. 29, two Hitachi ABWR plants are shown integrated into a shipyard manufactured, fully assembled unit for float-out delivery to a harbor-based installation. In embodiments, the unit may be bottom mounted with seismic isolation. The cross-section shows dual NSSS and dual turbines arranged with space for supporting auxiliary systems. In embodiments, the unit may have dimensions that can be a width of 80 meters, a length of 200 meters, and a height of 75 meters.

In embodiments, it can be shown that the deployment model may attack the fundamental drivers of nuclear costs and schedule overruns. These drivers include shipyards use block construction, a method involving the assembly of prefabricated sections: parallel production of modules to greatly reduce schedule risk: higher productivity and elimination of concrete radically reduces cost: shipyard production processes enable high levels of quality and inspection with much lower cost and impact on schedule; and large modules, weighing several thousand tonnes, can be manufactured at different shipyards, fully outfitted, and transported to the completion shipyard for final assembly.

In embodiments, there is adequate deep water access for delivery of the barge to one of the currently designated sites. In embodiments, barge design may be more compact than existing ABWR designs enabling siting flexibility within the permitted site envelope. In embodiments, barge delivery of the nuclear plants largely eliminates construction impact at the site It will be appreciated in light of the disclosure that shipyard-based construction enables the possibility to streamline the regulatory oversight process over time. As such, regulators may see the same shipyard, same team, same process, same products, etc. This, in turn, may lead to easier regulatory approvals from one country to the next: reduces, regulatory cost over time; enables use of much more modern technology in regulatory review.

In embodiments, the methods and systems disclosed herein can enable vastly more opportunities to site plants. Importantly, there is no need to purchase the rights from an existing owner or spend the same amount of upfront capital to secure site control. The methods and systems may enable potentially the ability to leverage coastal transmission connections from existing or retired power plants (inclusive of nuclear, coal, gas, and wind). In embodiments, there is potential to co-locate with offshore wind project and leverage their transmission capacity. It will be appreciated in light of the disclosure that shipyard-based construction enables far better control of scheduling and cost risks. To that end, there can be faster overall delivery as factories and shipyards are designed to operate around tight schedules and make every effort to avoid delays that would lower overall throughput. Compared with stick-built construction, there can be much earlier detection of defects and faults. There may be tight tracking of parts and status with infrared barcodes throughout facility and possibly the broader supply chain. There may be substantially greater opportunity to reduce sequential delay linkages (delay will be longest individual delay instead of the sum of all individual delays). In embodiments, there can be a reduction in the risk of schedule exceedance directly translates to reduction in the risk of budget exceedance (which, can dramatically reducing interest payments). This deployment can be shown to avoid the quagmire of concurrent engineering and construction. It dramatically reduces the possibility of change orders and thereby the associated engineering and vendor expenses.

In embodiments, various system and methods can be configured to cause very little public disturbance. Beyond a few kilometers, it will be difficult to see the plant. In embodiments, there may be little site remediation required, especially relative to a terrestrial plant.

In embodiments, various system and methods can be configured to be one generation decisions such that the ability to provide clean energy for a pre-determined and relatively short timeframe changes the dimension of the decision for local populations.

In embodiments, various system and methods can be configured so spent fuel can be transported away from site and decommissioned in a nuclear qualified shipyard, much like nuclear-powered submarine or aircraft carrier. Decommissioning may be performed in the original shipyard or a dedicated, in-country shipyard, depending on host preference. In embodiments, various system and methods can be configured to require decommissioning and it is dramatically lower in cost as no materials have the potential to absorb radioactive materials.

In embodiments, various system and methods can be configured to reduces costs, speed delivery, reduce key project risks, enhance passive safety, and expand siting options for large-scale and SMR based nuclear power plants. It can be shown that such project costs may be reduced by 50% and dramatically speed deployment.

In embodiments, various system and methods can be configured for shipyard manufacturing, marine delivery of SMR plants for customer such as into the Great Lake such as Lake Huron and coastal plant locations elsewhere in the world. These plants may be bottom mounted, offshore sited, and GW-scale plants.

In embodiments, various system and methods can be configured so that all units will be transported to location via tugs or heavy lift ships. The vessels that prepare the deployment location are also within the scope of the product family. All units must be sufficiently protected against local environmental conditions. Breakwaters will mitigate tsunami, rogue wave, and ship collisions for near shore mounted units while mooring systems and floating barriers will protect units further out to sea.

Figure 30:
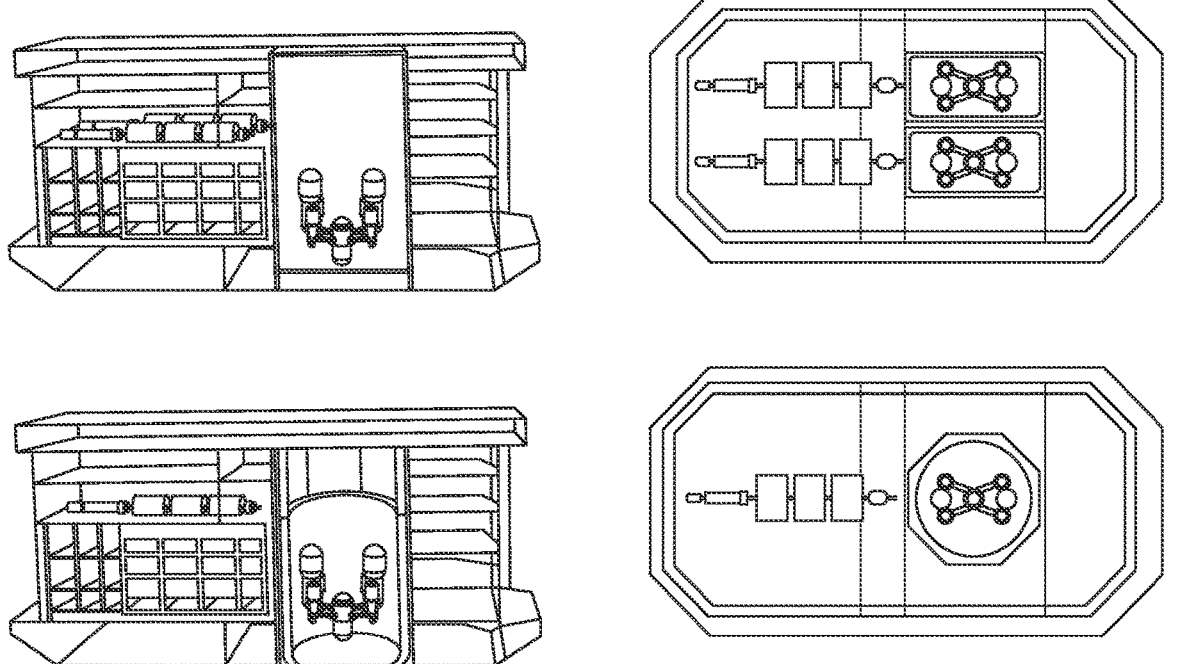
FIG. 30 is a diagrammatic view depicting an exemplary system of bottom mounted or bottom standing units which are floated to the deployment site in an unfueled state and are then fueled and started after they are ballasted down and mounted in accordance with the present disclosure.

In embodiments and with reference to FIG. 30, examples of bottom mounted or bottom standing units which are floated to the deployment site in an unfueled state and are then fueled and started after they are ballasted down and mounted. These units are not necessarily permanently fixed in place, but would be shut-down and de-fueled in the event that they required re-deployment to a new location. In embodiments, the reactor plant will not support power operation while floating.

In embodiments, piping and equipment layout can be configured to support re-packaging of terrestrial plant footprint into offshore structure. Total building volume will be approximately similar, but overall shape will change. Elevations of Vessels and Piping will be kept as similar as possible to prevent unnecessary re-design of pumps, piping, and instrumentation.

In embodiments, various system and methods can be configured to include generally any reactor type can be modified to support the requirements for this product type, the following reactors are considered to be the most likely candidates due to their current market availability and licensed or license in-progress status: Mitsubishi Heavy Industries APWR. 4 loop PWR. 1; 700MWe net: Korea Electric Power Corporation APR-1400, 2 loop PWR. 1; 400MWe net: Korea Electric Power Corporation APR+. 2 loop PWR. 1; 500MWe net: Toshiba/Westinghouse AP1000, 2 loop PWR. 1; 100MWe net; General Electric/Hitachi ABWR. BWR. 10 Internal Pumps. 1; 350MWe net; General Electric/Hitachi ESWR. BWR. Natural Circulation. 1:500MWe net.

It will be appreciated in light of the disclosure that some of these designs offer advantages relative to their peers for an offshore deployment, especially the designs such as AP1000 and ESBWR which utilize "passive" cooling of the core. This allows for relative independence from offsite electrical power during an accident scenario. Additionally, the reduced number of pumps and safety related systems required for these plants would simplify maintenance and construction costs. That said, the importance of availability of design and engineering support from the nuclear vendor outweighs the relative engineering merits of each plant type and all designs are considered feasible and acceptable for this product type. For the initial product deployments, units incorporating a single or twin reactor plants may be produced depending on customer requirements. Twin units may be deployed as duplicate plants being housed in a single offshore structure, or each reactor unit may be delivered to site independently, sharing support services as practical.

In embodiments, this family of products includes free floating or tethered units which allow deployment to sites with deeper waters or areas where other hazards such as seismic or tsunami considerations make a bottom mounted unit impractical. In this deployment scenario, some wave motion will be transmitted to the plant and additional design work must be performed to support this. Refueling is a particular area where these motions may require development and modifications of fuel In embodiments, various system and methods can be configured so that requirements for the nuclear and power generation system will be defined on the basis of an existing reactor design modified for installation in the hull structure. Design data from the nuclear plant which will influence the design of the hull structure includes equipment masses, centers of gravity, required structural stiffness, containment geometry, spent fuel storage requirements, cooling water for normal operation, cooling water for accident or faulted operation, export power cable characteristics, control rooms, personnel accommodation, and protection from external aircraft or ship impact.

Additional requirements for the hull structure are defined in terms of its life cycle phases, including construction, float-out to site, installation on seabed or connection to anchors, operation, removal and decommissioning. In each phase, the structure must support the payload with displacements and accelerations consistent with the requirements of the nuclear and power generation systems, resist seismic, tsunami, wind, wave, current and gravity loads. Adequate allowances for corrosion and fatigue loads will be made to achieve desired equipment life spans in the marine environment.

In embodiments, various system and methods can be configured so the structures may be designed with modular construction in mind, minimizing, to the extent practical, service (communications equipment, power, piping) connections across likely block boundaries. The structure may be characterized for marine analysis in term of its mass and mass distribution, external geometry and structural stiffness at the seabed interface if bottom founded. Maximum lateral and rotational motion requirements will be defined by the nuclear and power system designers.

In embodiments, various system and methods can be configured so the platforms can be built at shipyard(s) with high level offshore experience, using state of the art offshore fabrication methods such as modular construction. Higher quality and reduced construction time can be achieved compared to conventional on site fabrication. In embodiments, small steel blocks (up to about 250 tons) will be fabricated in special steel workshops. In embodiments, painting will be done in controlled painting workshops. In embodiments, the small blocks will be assembled to large sections (500) to 2500 tons) and as far as possible outfitted with equipment and systems (pumps, piping, etc.). In embodiments, the majority of work may be done in highly controlled and efficient workshop conditions. Large blocks will be placed in the dry dock, at four building locations, making four mega blocks (weight from 10:000 up to 40:000 tons). In embodiments, the work may be spread around four locations, permitting more manhours in less time, avoiding clashing work and inspection and creating flexibility to man up individual activities. Upon completion, the four megablocks may be married into one complete platform. In embodiments, the completed platform can float out of building dock to completion quay for final completion commissioning and testing.

Figure 31:
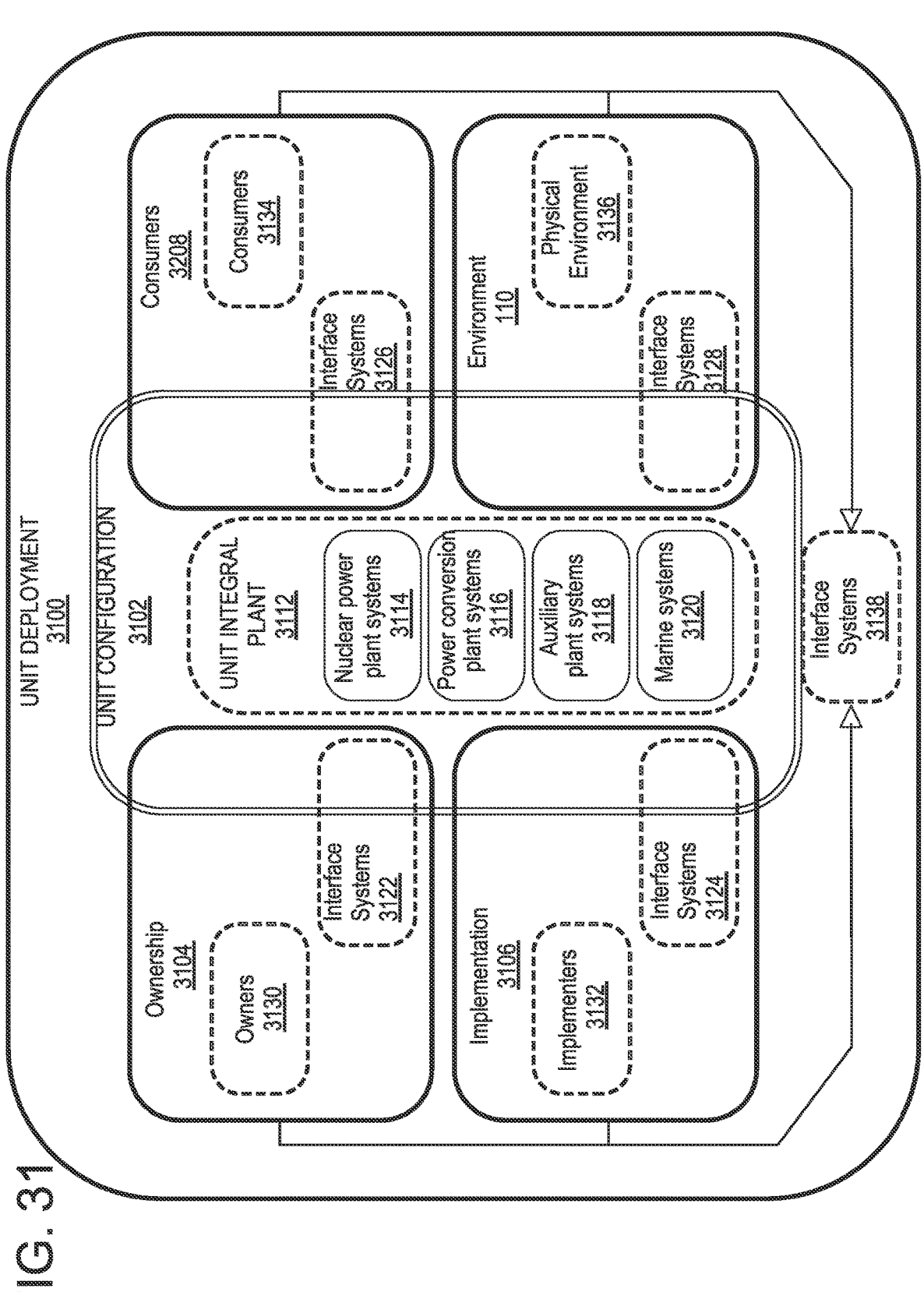
FIG. 31 is a relational block diagram depicting illustrative constituent systems of an offshore nuclear plant (MNP) in accordance with the present disclosure.

FIG. 31 is a relational block diagram depicting illustrative constituent systems of an offshore nuclear plant (MNP), also herein termed a Unit, and illustrative associated systems that interact with the Unit and each other. A Unit Deployment 3100 comprises a Unit Configuration 3102 and the associated systems with which the Unit Configuration directly interacts via material and non-material means. In the illustrative Unit Deployment 3100 of FIG. 31, the associated systems with which the Unit Deployment 3100 interacts are Ownership 3104. Implementation 3106. Consumers 3108, and Environment (3110). Overlap of the boundaries of associated systems 3104, 3106, 3108, 3110 with the Unit Configuration is shown to indicate that the Configuration 3102 and its associated systems 3104, 3106, 3108, 3110 overlap in practice, and cannot be meaningfully considered in isolation from one another. Herein, a Unit Deployment 3100 may comprise a single nuclear installation or unit, or a plurality of such installations or units. The Unit Configuration 3102 comprises Unit Integral Plant 3112, the primary constituent physical systems of the MNP: the Unit Integral Plant 3112 is a supports the operation of the MNP unit regardless of the particulars of the Unit Deployment 3100. The Unit Configuration 3102 incorporates the Unit Integral Plant 3112 into a form factor suitable for a given Unit Deployment scenario 3100; preferably, the Unit Integral Plant 3112 is designed, built, assembled, and maintained as a structure of discrete physical modules, where the sense of "module" shall be clarified with reference to Figures herein. The Unit Integral Plant, in turn, comprises nuclear power plant systems 3114, which produce energy from nuclear fuel and manage nuclear materials such as fuel and waste; power conversion plant systems 3116, by which energy from the nuclear power plant systems 3114 is, typically, converted to electricity: auxiliary plant systems 3118, which support the operation of the individual MNP unit; and marine systems 3120, which enable the MNP to subsist and function in a marine environment.

The associated systems 3104, 3106, 3108, 3110 interact with the Unit Configuration via Interface Systems 3122, 3124, 3126, 3128. In embodiments, the terms "interface." "interface system." and "interfacing system" may be understood to encompass, except where context indicates otherwise, one or more systems, services, components, processes, or the like that facilitate interaction or interconnection of systems within an MNP or between one or more systems of the MNP with a system that is external to the MNP, or between the MNP and associated systems, or between systems associated with an MNP. Interface Systems may include software interfaces (including user interfaces for humans and machine interfaces, such as application programming interfaces (APIs), data interfaces, network interfaces (including ports, gateways, connectors, bridges, switches, routers, access points, and the like), communications interfaces, fluid interfaces (such as valves, pipes, conduits, hoses and the like), thermal interfaces (such as for enabling movement of heat by radiation, convection or the like), electrical interfaces (such as wires, switches, plugs, connectors and many others), structural interfaces (such as connectors, fasteners, inter-locks, and many others), or legal and fiscal interfaces (contracts, loans, deeds, and many others). Thus. Interface Systems may comprise both material and non-material systems and methods. For example, the Interface System 3122 for interfacing the Unit Configuration 3102 with Ownership 3104 will comprise legal arrangements (e.g., deeds, contracts): the Interface system 3128 for interfacing the Unit Configuration 3102 with the Environment 3110 will comprise material arrangements (e.g., tethers, tenders, sensor and warning systems, buoyancy systems).

The Ownership system 3104 comprises Owners 3130 and Interface Systems 3122: the Implementation system 3106 comprises Implementers (e.g., builders, defenders, maintainers) and Interface Systems 3124: the Consumers system comprises Consumers 3134 and Interface Systems 3126; and the Environment system comprises the natural Physical Environment 3136 and Interface Systems 3128. The physical environment for an MNP may be characterized by various relevant aspects, including topography (such as of the ocean floor or a coastline), seafloor depth, wave height (typical and extraordinary), tides, atmospheric conditions, climate, weather (typical and extraordinary), geology (including seismic and thermal activity and seafloor characteristics), marine conditions (such as marine life, water temperatures, salinity and the like), and many other characteristics. Associated systems not depicted in FIG. 31 may also be comprised by a Unit Deployment: stakeholders informing the design, manufacture, and operation of an MNP unit may include power consumers, owners, financiers, insurers, regulators, operators, manufacturers, maintainers (such as those providing supplies and logistics), de-commissioners, defense forces (public, private, military, etc.), and others. Moreover, the systems 3104, 3106, 3108, 3110 interact with each other through one or more additional Interface Systems 3138.

Figure 32A:
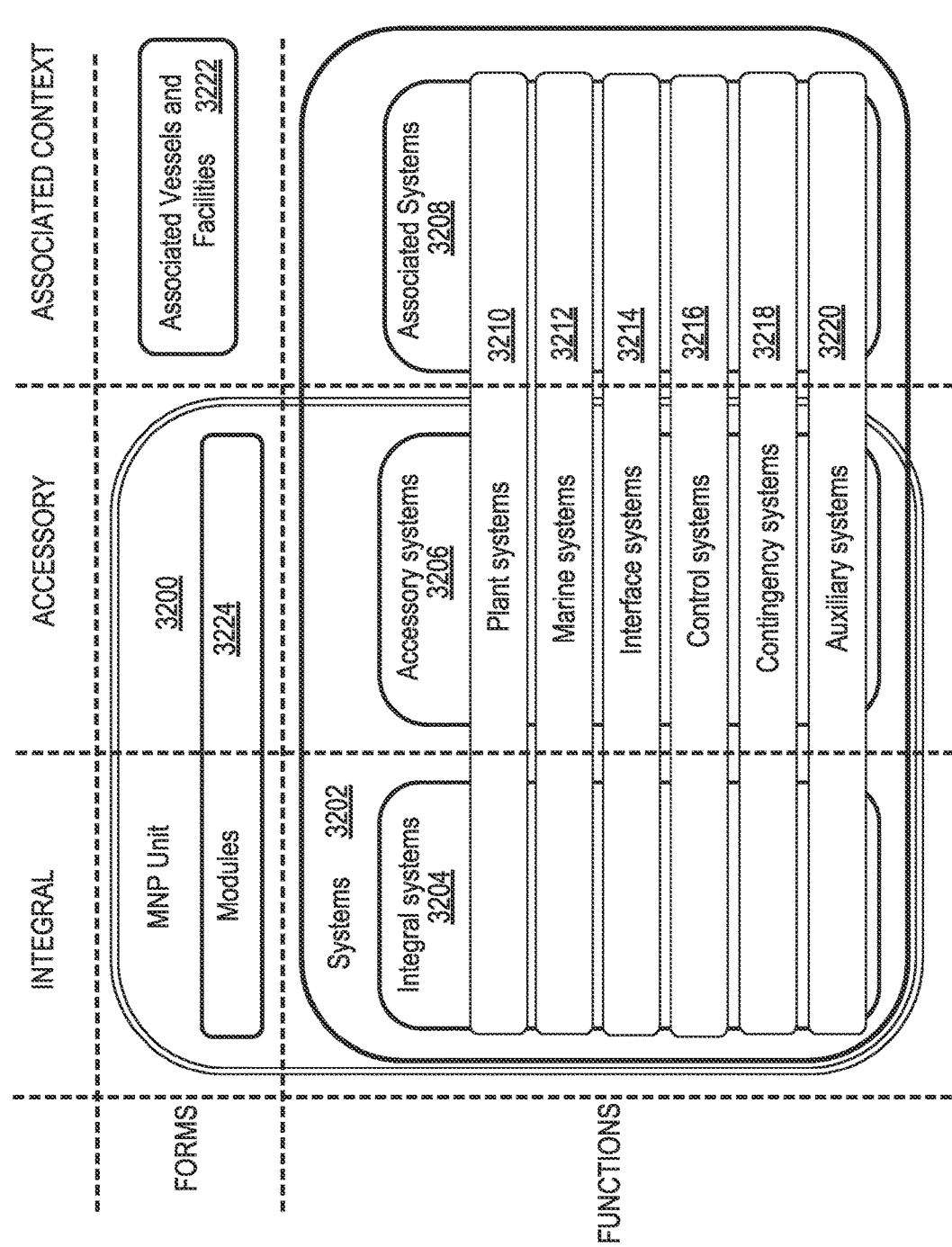
FIGS. 32A and 32B are diagrammatic views that depict some of the functions of an MNP that may be assigned to integral, accessory, and associated categories in accordance with the present disclosure.

FIG. 32A is a conceptual schematic depiction of an illustrative manner in which some of the Functions of an MNP can in various embodiments be assigned to physical Forms, and of the relationships of the Functions and Forms so assigned to Integral. Accessory, and Associated categories. In various embodiments, an MNP Unit 3200 (double outline) comprises one or more functional Systems 3202, which may include one or more Integral Systems 3204. Accessory Systems 3206, and Associated Systems ("systems associated with MNP unit fleet") 3208. The terms "integral." "accessory." and "associated" will be further clarified with reference to FIG. 32B: in general. Integral and Accessory Systems are physically comprised by the MNP Unit 3200, while Associated Systems are not. In embodiments, the term "Accessory System" may be understood to encompass, except where context indicates otherwise, a secondary, supplementary or supporting system to help facilitate a function.

The Systems 3202 may include one or more Plant Systems 3210. In embodiments, the terms "plant system" or "nuclear plant system" may be understood to encompass, except where context indicates otherwise, a system involved in the operation of a nuclear reactor, the transport of heat, the conversion and transmission of power, and the support of the normal operations of the aforementioned.

In embodiments. MNP Systems 3202 may include one or more Marine Systems 3212. In embodiments, the term "marine system" may be understood to encompass, except where context indicates otherwise, a system associated with the function of the unit as a marine vessel, including navigation, stability, structural integrity, and accommodation of crew.

In embodiments. MNP Systems 3202 may include one or more Interface Systems 3214. Interface systems 3214 may include software interfaces (including user interfaces for humans and machine interfaces, such as application programming interfaces, data interfaces, network interfaces (including ports, gateways, connectors, bridges, switches, routers, access points, and the like), communications interfaces, fluid interfaces (such as valves, pipes, conduits, hoses and the like), thermal interfaces (such as for enabling movement of heat by radiation, convection or the like), electrical interfaces (such as wires, switches, plugs, connectors and many others), structural interfaces (such as connectors, fasteners, inter-locks, and many others), and others.

In embodiments. MNP Systems 3202 may include one or more Control Systems 3216. In embodiments, the term "control system" may be understood to encompass, except where context indicates otherwise, a system of devices or set of devices (including enabled by various hardware, software, electrical, data, and communications systems, that manages, commands, directs or regulates the behavior of other device(s) or system(s) to achieve desired results. Control systems may include various combinations of local and remote control systems, human-operated control systems, machine-based control systems, feedback-based control systems, feed-forward control systems, autonomous control systems, and others.

In embodiments. MNP Systems 3202 may include one or more Contingency Systems 3218. In embodiments, the terms "contingency system" or "emergency system" may be understood to encompass, except where context indicates otherwise, a system on or interfacing with an MNP that prevents, mitigates, or assists in recovery from accidents, which may include design-basis accidents (accidents that may occur within the normal operating activities of the MNP) and beyond-design-basis accidents and events, including both human initiated events (terrorism or attacks), significant failure of MNP facilities, environmental events (weather, seismic activity, and the like) and "acts of God."

In embodiments. MNP Systems 3202 may include one or more Auxiliary Systems 3220. In embodiments, the term "accessory system" may be understood to encompass, except where context indicates otherwise, a system which, when included in or interfacing with an MNP unit, tailors the unit to operating in different deployment scenarios and/or that provides or enables an accessory function for the MNP (such as a function occurring episodically like maintenance, refueling or repair that may involve moving items around the MNP). Accessories may be related to the plant functions, marine functions, and contingency functions, among others. For example, an accessory marine system could improve the stability of the foundation of a seafloor mounted MNP or act as a breakwater depending on local wave conditions. An accessory plant system could provide an interface for transport of power/utility products or might use process heat to manufacture value-added industrial products local to the unit. An accessory system like a crane might be used to move units around during refueling or maintenance operations. These and many other accessory systems are encompassed herein.

In embodiments, an MNP system may include one or more Associated Systems 3208. In embodiments, the term "associated system" may be understood to encompass, except where context indicates otherwise, a system interfacing with a single unit or a fleet of MNP units which performs a function related to the design, configuration, awareness, defense, operation, manufacturing, assembly, and/or decommissioning of MNP units. In embodiments, this may include a system that performs a function that is not necessarily core to the operation of the MNP but that may involve interaction with an MNP, such as a weather prediction system, a tsunami or extreme-wave warning system, a smart grid system, an agricultural or industrial production system that uses power from the MNP, a desalination system, and many others.

In embodiments, an MNP system may also comprise Associated Vessels and Facilities 3222 that are associated with the system but are not inextricable physical portions of it. e.g., tenders, crew transports, fuel transports, vehicles of defensive forces, supply depots, on-shore grid substations, and many more.

As also indicated in FIG. 32A, both the Integral and Accessory components of an MNP Unit 3200, and the portions of various Systems physically comprised by an MNP Unit 3200, are, in various embodiments, designed, constructed, and assembled as "Modules" 3224, also herein termed "structural modules." Herein, a module is a standardized, discrete part, component, or structural unit that can be used to construct a more complex structure, with assembly typically occurring in a shipyard. Modules comprised by various embodiments are derived from categories used in shipbuilding, and include, among other units. Skids. Panels. Blocks, and Megablocks. These terms shall be clarified with reference to Figures herein below. Systems (e.g., Marine Systems 3212) may be substantially confined to single modules, or distributed across multiple modules: the terms "system" and "module" are thus not interchangeable.

Figure 32B:
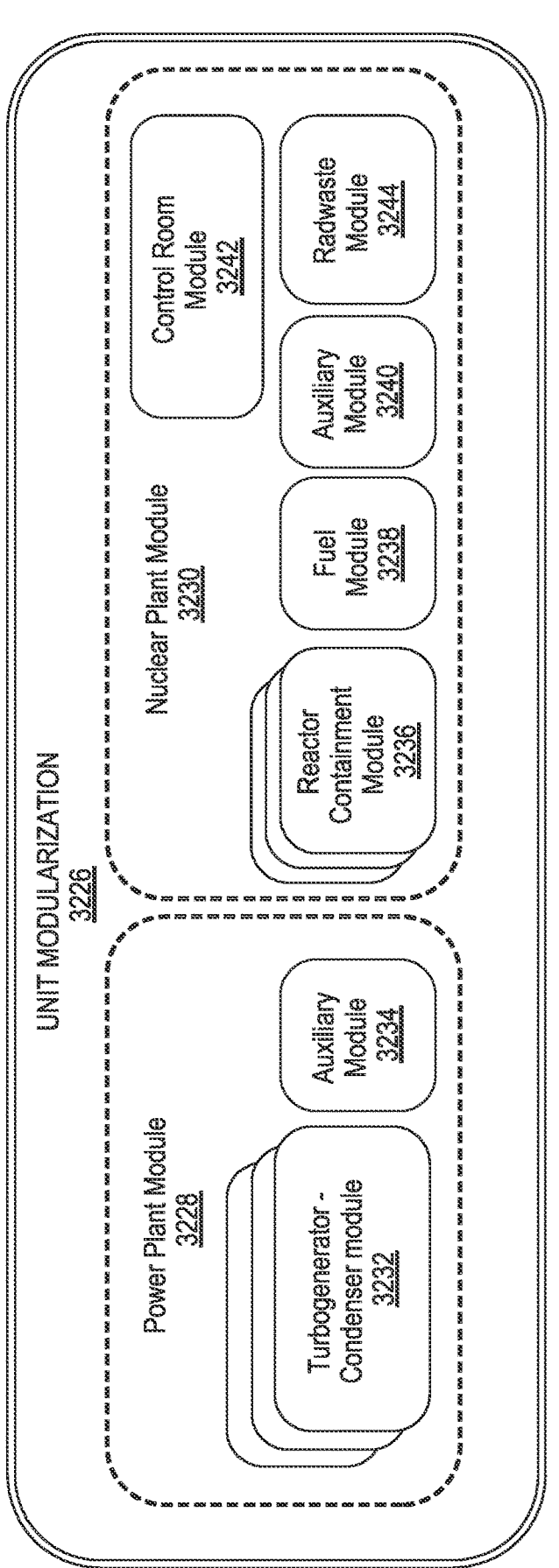

FIG. 32B is a conceptual schematic depiction of an illustrative Unit Modularization 3226, that is, a high-level schema for the modularization of an MNP. Systems comprised by an MNP are, in embodiments, classified as (1) integral. (2) accessory, or (3) associated. (1) Integral systems are typically part of the MNP, regardless of configuration or deployment scenario. The two integral systems are assigned in this illustrative modularization to corresponding modules. i.e., the Power Plant Module 3228 and the Nuclear Plant Module 3230. The Power Plant Module, in turn, comprises at least one Turbogenerator-Condenser Module 3232, which employs high-pressure steam from the Nuclear Plant Module 3230 to turn one or more turbines and generators, as well as some number of Auxiliary Modules. e.g., Auxiliary Module 3234. (2) Accessory systems are systems that are typically included with or that directly interface with an MNP unit depending upon the particular configuration and deployment of the MNP: for example, seafloor tether systems are accessory because they may be omitted from some embodiments where the MNP is grounded on the seafloor. (3) Associated systems are those that typically interface with one or more Units and are part of the greater context in which an MNP Unit is deployed. For example, power transmission systems conveying power between an MNP and an on-land grid perform an associated function.

Also herein, primary systems are those performing functions definitive of the purpose of the MNP. e.g., generating steam from nuclear heat or generating electrical power from steam; primary systems are closely aligned with integral systems. Auxiliary systems (typically instantiated in one or more corresponding Auxiliary Modules. e.g., Auxiliary Module 3234) are those that typically support the reliable operation of primary systems. e.g., by cooling, lubricating, powering, controlling, and monitoring primary systems, and the like.

The Nuclear Plant Module 3230 comprises at least one Reactor Containment Module 3236, each of which contains a nuclear reactor, a Fuel Module 3238 that performs fuel handling functions, at least one Auxiliary Module 3240, a Control Room Module 3242, and a Radwaste Module 3244 that handles spent nuclear fuel and other radioactive waste. Typically, the number of Reactor Containment Modules 3236 is equal to the number of Turbogenerator-Condenser Modules 3232.

Unit Modularization is preferably responsive to at least two sets of criteria requirements, or constraints (collectively referred to simply as "constraints"), which are in aspects peculiar to the marine situation of an MNP and which may occasionally be in tension: (1) internal constraints on form and organization (e.g., it may be inherently advantageous to locate turbines and generators close together, or to have a direct interface between the Reactor Containment Module 3236 and the Fuel Module 3238), and (2) external constraints, such as those derived from the MNP's environment (e.g., physical, electrical, operational, fiscal, or the like). In various embodiments, a particular Modularization may be configured to satisfy the foregoing criteria and others while taking advantage of shipyard assembly and manufacturability.

Of note. "modules" and "systems" are not synonymous. Although in many cases a single system may be implemented in a single module, a system may extend across multiple modules, or a single module may comprise more than one system, in whole or part. Moreover, in embodiments modules are combinable and nestable.

Figure 33A:
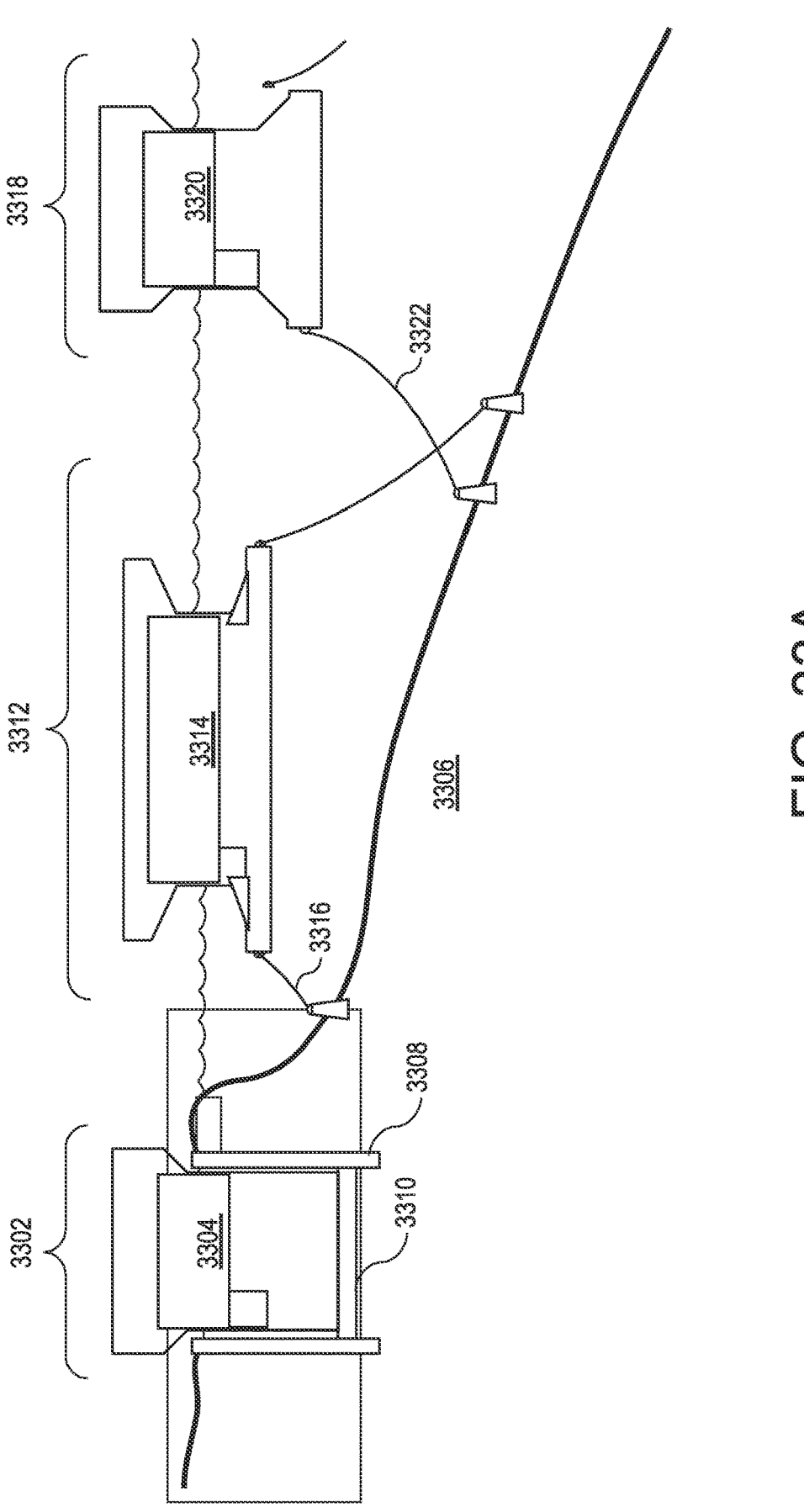
FIGS. 33A and 33B are diagrammatic views that depict aspects of unit configuration scenarios in accordance with the present disclosure.
Figure 33B:
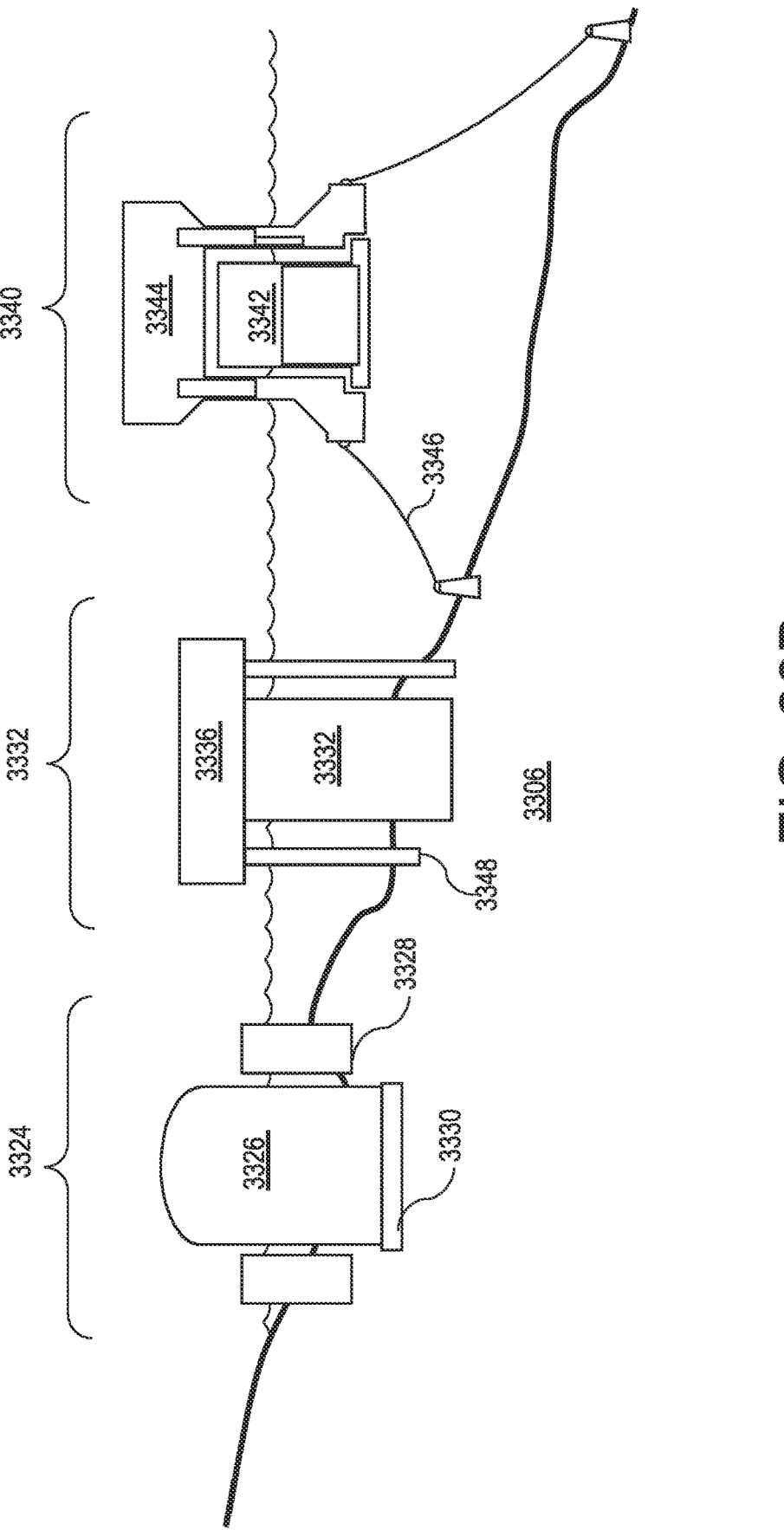

FIGS. 33A and 33B schematically depict aspects of illustrative Unit Configuration scenarios included in the many embodiments. FIG. 33A depicts three illustrative simplex configurations, that is, configurations where the MNP Unit is deployed substantially as a single relocatable unit assembled in a modular manner in a shipyard and floated to its service location. A first simplex configuration 3302 is herein denoted the "MP-B" configuration, where an MNP 3304 is grounded. e.g., by filling the MNP's ballast tanks with water after towing the unit 3304 to the site, within a basin (hence "MP-B") or channel extended by digging from the adjacent seafloor 3306. A supportive barrier 3308 (e.g., of pilings) stabilizes the channel within which the MNP 3304 resides. The MNP 3304 rests upon a prepared foundation 3310. The MP-B configuration 3302 is typically suitable for a littoral location. A second simplex configuration 3312 is herein denoted the "MP-E" configuration, where a floating MNP 3314 having a relatively flat, linearly extended (hence "MP-E"), barge-like form is anchored to the seafloor 3306 at its service site by tethers. e.g., tether 3316. The MP-E configuration 3312 is typically suitable for water of moderate depth (for example, approximately 60-100 meters depth). The extended or barge-like form of the MP-E configuration 3312 both (a) enables the unit MNP 3314 to have lower draft for a given mass, enabling flotation through relatively shallow water, and (b) enables the long axis of the MNP 3314 to be aligned with the direction from which waves primarily arrive, thus presenting minimum cross section to the waves. A third simplex configuration 3318 is herein denoted the "MP-F" configuration, where a floating (hence "MP-F") MNP 3320 preferably having an approximately radially symmetric form is anchored at its service site by tethers. e.g., tether 3322. The MP-F configuration 3318 is typically suitable for water of greater depth (for example, 100+ meters depth). The radially symmetric form of the MNP 3320 is suitable for encountering waves that may arrive, at various times, from all directions.

FIG. 33B depicts three illustrative Unit configurations, that is, configurations where the MNP Unit is deployed substantially as one or two units, at least one of which is a re-locatable unit assembled in a modular manner in a shipyard and floated to its service location. In the three compound configurations of FIG. 33B, a nuclear module is combined with an accessory module to realize various advantages (e.g., submersion of a nuclear reactor to realize protection from aircraft or surface-vessel impacts; or, capability of swapping out the nuclear module in order to prevent long down-times during refueling or other maintenance or repairs of nuclear systems). A first compound configuration 3324 is herein denoted the "MP-D" configuration, where an MNP module 3326 is grounded on the seafloor 3306 at a shoreline, e.g., by filling the ballast tanks of the MNP module 3326 with water after towing the module 3326 to the site. The nuclear module 3326 is housed within a dock 3328 (hence "MP-D") comprising, in an example, caissons towed into position and grounded. The MNP 304 rests upon a prepared foundation 3330. The MP-D configuration 3324 is typically suitable for relatively shallow water (for example, approximately 0-10 meters depth). A first compound configuration 3332 is herein denoted the "MP-M" configuration, where a nuclear module 3334 is grounded on the seafloor 3306 and interfaced with an accessory unit 3336, also preferably manufactured in a modular manner at a shipyard, towed to the service location, and mounted (hence "MP-M") atop of the MNP module 3334. Additional supports (e.g., support 3338) may stabilize the configuration 3332. The MP-M configuration 3324 is typically suitable for water of moderate depth (for example, approximately 20-60 meters depth). A second compound configuration 3340 is herein denoted the "MP-S" configuration, where a navigable, floating MNP module 3342 is interfaced with a floating accessory unit 3344, also preferably manufactured in a modular manner at a shipyard and towed to the service location. The floating accessory unit 3344 is anchored to the seafloor 3306 at its service site by tethers. e.g., tether 3346. The MNP-S configuration 3340 is typically suitable for water of greater depth (for example, 100+ meters depth) and is preferably approximately radially symmetric.

It will be clear that the categories of "simplex" and "compound" MNP configurations, and the particular examples shown herein, are illustrative only, and not restrictive of the range of MNP configurations in various embodiments.

Figure 34:
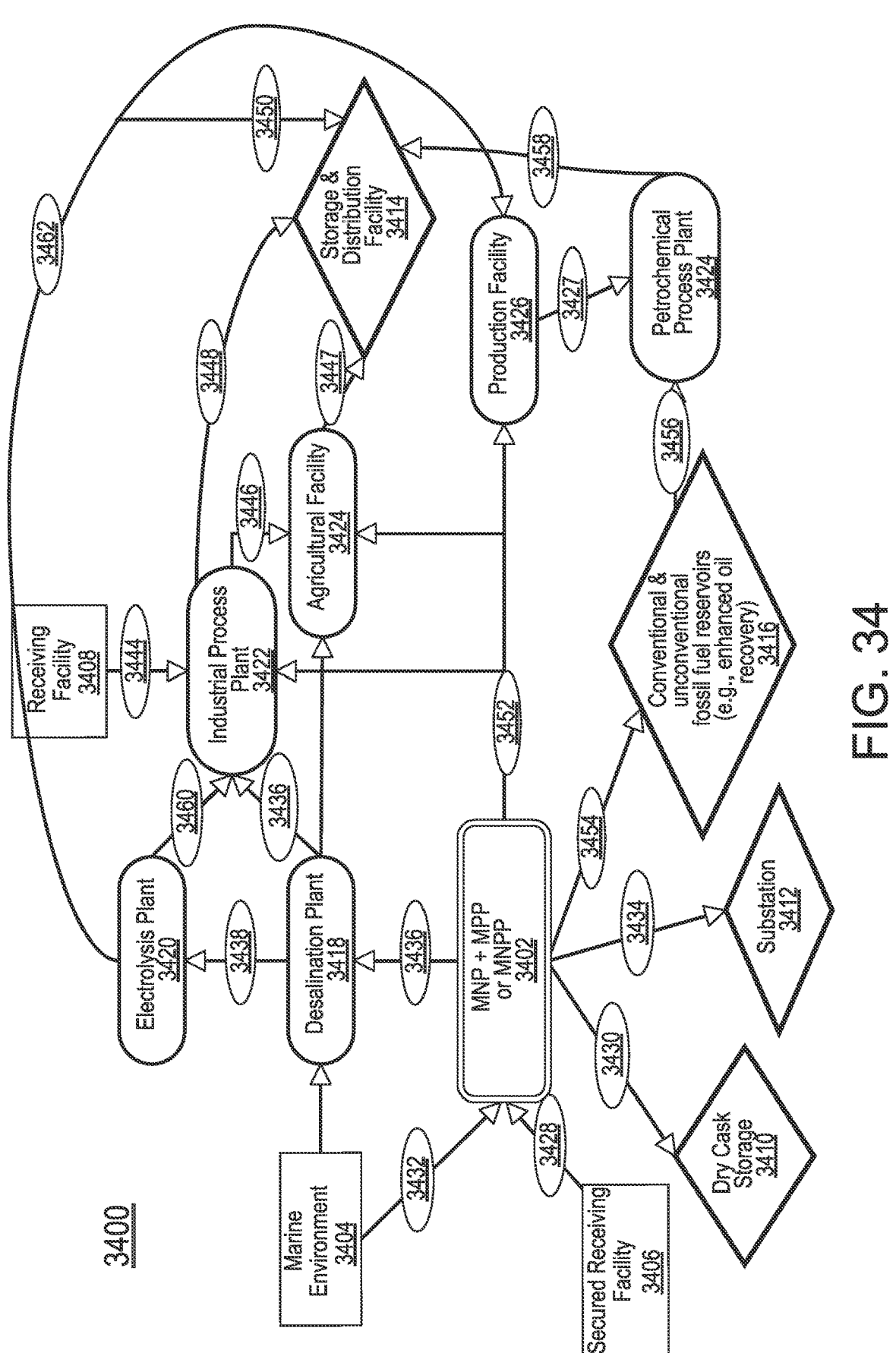
FIG. 34 is a diagrammatic view that depicts portions of material and energy flows between facilities of an exemplary manufactured plants in accordance with the present teachings.

FIG. 34 is a conceptual schematic depiction of portions of material and energy flows between facilities comprised by an illustrative MP deployment 3400. i.e., an agro-industrial complex comprising one or more MP units and including, minimally, a nuclear MP Unit. Deployment 3400 is designed to realize advantages of locating various production facilities and energy-consuming activities in the vicinity of a nuclear power plant 3402. The nuclear power plant 3402, in embodiments, comprises an MNPP (i.e., MP comprising both nuclear plant and power plant) or an MNP (i.e., MP comprising a nuclear reactor) and an MPP (i.e., manufactured MP comprising a power plant). In embodiments, the nuclear power plant 3402 produces electrical power or thermal energy or both. Other facilities depicted in FIG. 34, to be enumerated below, are (1) various manufactured plant (MP) or non-MP facilities, denoted by capsule-shaped forms, which are manufactured and delivered (preferably by flotation) to the location of deployment 3400. (2) various MP or non-MP facilities, denoted by plain rectangles, which receive, stage, or produce inputs of the deployment 3400, and (3) various MP or non-MP facilities, denoted by bold-outlined rhombuses, which receive, stage, or produce outputs of the deployment 3400. FIG. 34 does not explicitly depict systems or facilities not comprised by the configuration 3400, nor does it depict some aspects of the local environment of configuration 3400, which comprises both a landmass and a relatively large body of water. e.g., lake, river, or ocean, herein termed the "marine environment" 3404.

Some material inputs to the configuration 3400 arrive from a secured receiving facility 3406, which handles the arrival of nuclear fuel for the nuclear power plant 3402; from a marine environment 3404, which, if an ocean, is a source of water as a feedstock, water as a coolant, and compounds in solution (e.g., $CO_2$, salt); and from a raw industrial materials receiving facility 3408. Material and energy outputs of the configuration 3400 are handled, before transfer out of the configuration 3400, by a dry cask storage facility 3410, an electrical substation 3412, a products storage and distribution facility 3414, and fossil fuel reservoirs 3416. Materials are altered in form, typically in a value-adding manner, in a number of process facilities, including a desalination plant 3418, an electrolysis plant 3420 producing $H_2$ and $O_2$ from $H_2O$, an industrial process plant 3422, an agricultural facility 3424, a fuel production facility 3426, and a petrochemical process plant 3427. Some or all of the foregoing plants and facilities except inherently stationary resources (e.g., natural fossil fuel reservoirs) are, in various embodiments, produced and delivered to the deployment 3400 as MP units, realizing advantages including those enumerated hereinabove for MP units. Various embodiments omit one or more of the facilities comprised by illustrative configuration 3400 and include facilities not comprised by configuration 3400.

Materials that flow or are transferred between elements of the configuration 3400 include fresh nuclear fuel 3428:

cooled spent nuclear fuel 3430; coolant water 3432; electrical power 3434 for distribution to consumers: electrical power 3436 for use by the desalination plan 3418: desalinated water 3438 for use by the electrolysis plant 3420; desalinated water 3440) for use by the industrial process plant 3422: desalinated water 3442 for use by the agricultural facility 3424; raw industrial materials (e.g., feedstocks) 3444 for use by the industrial process plant 3422; fertilizer 3446 for use by the agricultural facility 3424: industrial products 3448 for handling by the storage and distribution facility 3414: agricultural products 3447 for handling by the storage and distribution facility 3414; desalinated water 3450 for handling by the storage and distribution facility 3414: electrical power and process heat 3452 for use by the industrial process plant 3422, agricultural facility 3424, and fuel production facility 3426: raw synthetic fuels 3427 from the production facility 3426 for processing by the petrochemical plant 3424: process heat and steam 3454 for use in extraction from the fossil fuel reservoirs 3416; raw fossil fuel 3456 for processing by the petrochemical process plant 3426, petrochemical outputs 3458 for handling by the storage and distribution facility 3414, and electrolysis gases 3460 (e.g., $H_2$, $O_2$) for use by the industrial process plant 3422, and electrolysis gases 3462 for handling by the storage and distribution facility 3414.

Of note, in embodiments the storage and distribution facility 3414 enables the export of industrial and/or agricultural products from the deployment 3400: the secured receiving facility 3406 has safeguards such as secure tracking and reporting to appropriate regulatory authorities as fuel is received, as well as a secure physical fuel-transfer connection to the power plant 3402: $H_2$ from the electrolysis plant 3420 can also be an input to the petrochemical process plant 3426 (transfer connection not depicted in FIG. 34); $O_2$ from the electrolysis plant 3420 may be an input to both the industrial process plant 3422 and the petrochemical process plant 3426 (connections not depicted); and the storage and distribution facility 3414 may include a depleted hydrocarbon reservoir for storage of bulk hydrocarbon gases (e.g., methane) produced by the petrochemical process plant 3426:

Various MP units, including the nuclear unit 3402, may be located in a littoral, near-shore, or off-shore manner realizing environmental and social advantages by minimizing disruption of landmass and coastal environments and human settlement patterns. The deployment 3400 can serve countries that have growing energy, water and transportation fuel needs, but do not wish or cannot afford to develop the massively expensive infrastructure that is required to produce them indigenously. For various embodiments, initial installation of can be rapid, as MPs are transported from shipyards to site, with minimal site preparation required compared to traditional terrestrial power and water projects. If a worldwide fleet of MPs is available, production could be initiated within months as compared to years or decades for conventional development approaches. Capacity and capabilities of the deployment 3400 or other embodiments can be modified flexibly during the lifetime of the project by adding or subtracting MPs. The customer does not have to commit to a 60-80 year project, and the host country does not need to own the infrastructure. Given a nuclear power source 3402, desalinated water and synthetic fuels production occurs with essentially zero direct $CO_2$ emissions.

Moreover, various industrial and agricultural processes can realize advantages by integration with the nuclear plant 3402 in deployment 3400, since closer proximity of facilities to the primary energy source 3402 and to each other reduces all losses and costs associated with transport of electricity, heat, water, gasses, industrial material, products, and the like. Pipelines, which tend to be expensive and vulnerable, are reduced by proximity to minimal lengths, enabling the more efficient transfer of liquids (e.g., desalinated water for agriculture and other processes) and gasses (e.g., $H_2$, notoriously difficult to contain) and the more economic exploitation of heat (the primary energetic output of a nuclear power plant) in. e.g., industrial, agricultural, production, and fuel extraction processes. Transmission losses for electrical power to points of use are also reduced, and shorter electrical transmission lines connecting the power plant 3402 to various facilities of the deployment 3400 are less costly and more reliable than long-haul lines. Security and defense are advantageously realized in deployment 3400 by tasking defensive systems (e.g., barriers, surveillance and sensor gear, oversight personnel, response teams, drones) with the security of a relatively unified and restricted area. i.e., that occupied by deployment 3400, in contrast to securing a number of disparately located facilities connected by relatively long, costly, and vulnerable pipelines, transport routes, and power lines. Environmental benefits are also realized. e.g., by decreased land consumption for pipelines, power lines, and the like; by the increased feasibility of energy-intensive, environmentally beneficial processes such as manufacture of synthetic fuel from atmospheric carbon, dissolved oceanic carbon, fossil-fuel feedstocks, and/or $H_2$ from electrolysis; by increased feasibility of carbon sequestration from industrial processes and fuel synthesis; and the like.

In an illustrative use case, a coastal industrial enterprise of foreseeably temporary nature (e.g., mining of a finite resource) can realize advantages from the deployment of MP units in an agro-industrial complex, as these can be deployed rapidly and economically un-deployed by similar means at the end of project lifetime, again with potential realization of environmental benefits. These and other advantages are realized by various embodiments. Comprising of MP units by the proposed agro-industrial complex is unique and distinctive from all prior proposals for nuclear-powered complexes, e.g., Nuclear Energy Centers: Industrial and Agro-Industrial Complexes, Oak Ridge National Laboratory ORNL-4290 November 1968, the teaching of which is incorporated herein by reference.

In an example of an energy-intensive industrial process benefiting from proximate access to the heat output of the nuclear plant 3402, magnesite ($MgCO_2$) is converted to magnesium oxide (MO) and $CO_2$ by the addition of heat, the $CO_2$ being persistently sequestered in a carbon capture-and-storage process that pumps the $CO_2$ into a saline aquifer at high enough pressure to make the $CO_2$ into a supercritical fluid that dissolves in the saline. Such sequestration will be more economically feasible where the energy inputs to magnesite conversion and sequestration are more economically obtained, as in the deployment 3400.

In another example, the Bayer processing of bauxite to produce aluminum is well-known as an electricity-intensive process and would benefit by proximity to the nuclear plant 3402.

In another example, process steam 3454 can be used to mobilize high-viscosity fossil fuels (e.g., bitumen) in an unconventional reservoir 3416 or a conventional reservoir depleted of readily extractable fossil fuel.

In another example, useful materials may be extracted from seawater as a byproduct of desalination 3418, electrolysis 3420, and additional processes. For example, carbonates can be extracted from seawater and converted to oxides for cement manufacture. Also, magnesium is present as a soluble salt in seawater (~1.3×10-3 kg/liter Mg$^{2+}$ ions, associated with chloride and sulphate ions) and can be produced as a suitable industrial compound, e.g., magnesia. Also, sea salts (primarily sodium chloride) are a marketable byproduct of desalination with appropriate quality controls.

Numerous other examples could be adduced of energy-intensive processes that would benefit by integration in a deployment 3400 or other embodiments, including oxygen liquefaction from air, electric steel and iron production, ferromanganese refinement, and more. All such processes are contemplated.

Figure 35:
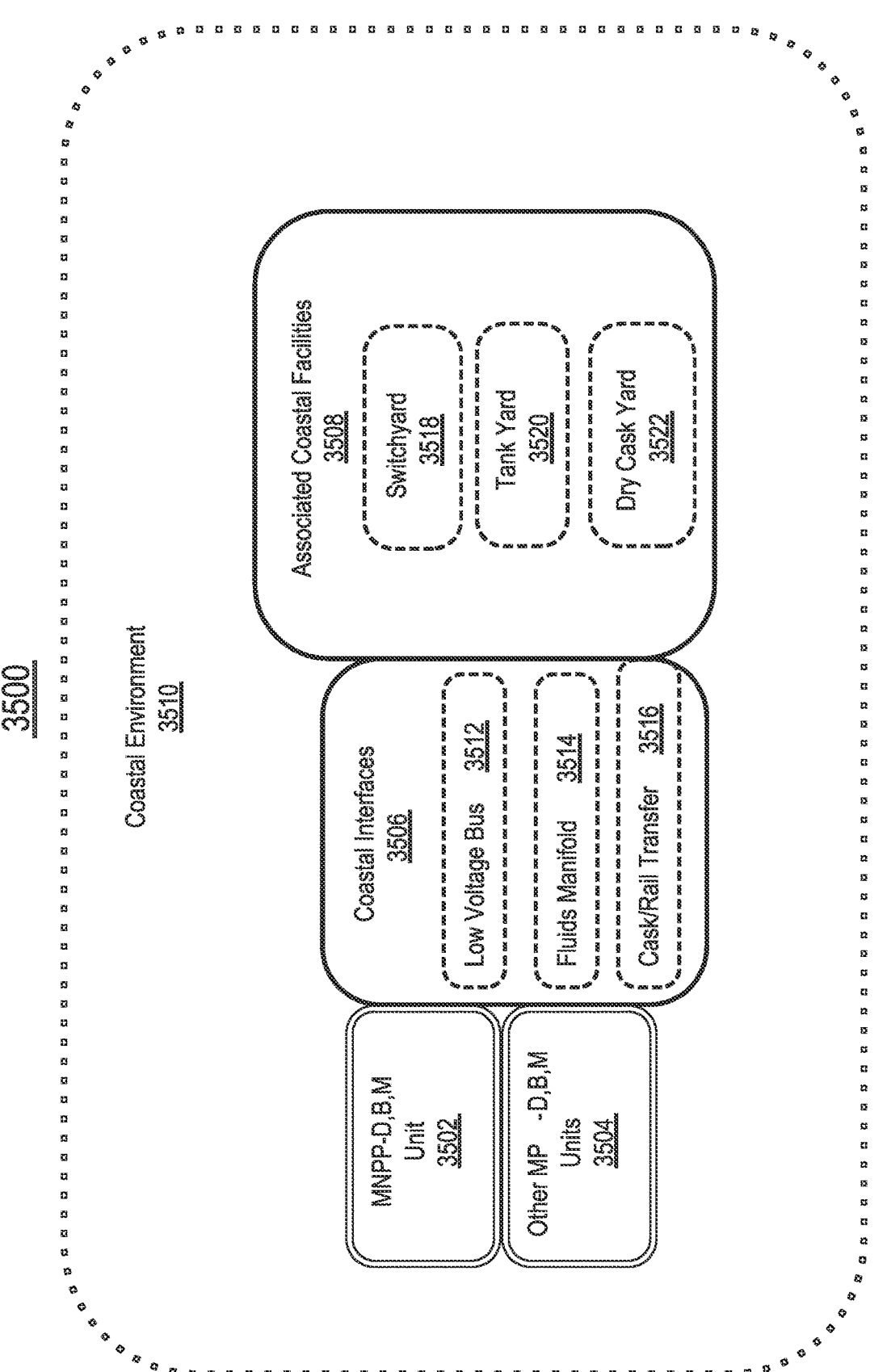
FIGS. 35, 36, 37, 38 and 39 are diagrammatic views that depict functional relationships between portions of illustrative unit configurations in accordance with the present teachings.

FIG. 35 is a conceptual depiction of functional relationships between portions of an illustrative Unit Configuration 3500 according to the many embodiments. In FIG. 35 and other Figures herein that depict functional relationships, contact between block outlines indicates physical intercommunication of systems (e.g., fluid flows, electricity, rail systems) as feasible and appropriate, although non-depiction of such contact does not necessarily indicate lack of such intercommunication. In FIG. 35 and other Figures herein, for brevity and consistency, manufactured units are denoted by acronyms beginning with "M." Further letters indicate other attributes of the depicted Manufactured unit: e.g., in FIG. 35, the Unit Configuration 3500 comprises a Manufactured Nuclear Power Plant (NPP), either Docked (D), stationed in a Basin (B), or deployed in a marine environment (hence "M." signifying relatively deep water): thus. Unit Configuration 3500 comprises MNPP-D,B,M 3502 and other Manufactured Plants. Docked. Basin-deployed, or Marine (MP-D,B,M) 3504, where a "Plant" is a mechanical unit dedicated to one or more particular purposes. The Unit Configuration 3500 also comprises a set of Coastal Interfaces 3506 and Associated Coastal Facilities 3508, all embraced by a particular Coastal Environment 3510, that is, an environment comprising the interface of a landmass with a large water body (e.g., ocean, navigable river). It is presumed that the Coastal Environment 3510 is in navigable water communication with a manufacturing facility or shipyard from which manufactured plants (e.g., MP-D,B,M 3504) can be transported by flotation to the site of the Unit Configuration 3500; herein, unless stated otherwise, all "Manufactured" plant items are preferably manufactured offsite and delivered by flotation, though delivery by overland transport is also contemplated. It is also presumed herein that the landmass adjacent to the Coastal Environment 3500 comprises one or more consumers of electricity (e.g., a grid) and potentially of other outputs of the Unit Configuration 3500. Preferably, the landmass comprised by the Coastal Environment 3510 includes means of overland transport (e.g., roads, rails) to and from the Unit Configuration 3500.

The MNPP-D,B,M Unit 3502, as its "PP" designation indicates, comprises a Power Plant as well as a nuclear source of energy: herein, a Power Plant comprises the machinery for converting at least part of the thermal output of a nuclear energy source to a different form. e.g., steam, electricity, or other. The MNPP-D,B,M Unit 3502 also comprises one or more SMRs and is preferably delivered, in partially or wholly complete form, by flotation to the Coastal Interfaces unit 3506 and is housed therein.

A basin ("B")-type Coastal Interfaces unit 3506 comprises an originally water-filled channel or slot excavated into a coastline and into which the MNPP-D,B,M Unit 3502 and/or other manufactured plant units may be delivered by barge. A dock ("D")-type Coastal Interface unit 3506 comprises a structure standing in water, though relatively close to shore, where the MNPP-D Unit and/or other manufactured plant units may be delivered by barge and housed. The stabilizing physical basis or bulk of typical dock comprises cessions that are floated into place and grounded (e.g., filled with water and/or rocky material); a dock or other Coastal Interfaces Unit also typically comprises associated subsystems such as a low-voltage bus 3512, a fluids manifold 3514, and a rail system 3516 for transfer of waste casks and other heavy objects. The nature of basins and docks will be further clarified herein with reference to several Figures. Herein, a unit denoted "D, B" may, in embodiments, be housed by either a Dock-style or Basin-style Coastal Interfaces unit.

The Associated Coastal Facilities 3508 are located on land comprise an electrical switchyard 3518, a tank yard 3520, and a dry cask yard 3522 for the storage of cool nuclear waste. Various embodiments comprise facilities for control and auxiliary and/or contingency systems (not depicted in FIG. 35), which could range from emergency backup power and control to long-term deep fuel storage.

The Coastal Interfaces unit 3506 preferably enables exchanges of energy, fluids, and rail-carried objects not only between the Manufactured Plant units 3502, 3504 and the Associated Coastal Facilities 3508 but among Manufactured Plant units 3502, 3504 and/or among portions of the Associated Coastal Facilities 3508.

Although the Unit Configuration 3500 comprises only a single Manufactured Nuclear Power Plant (MNPP), various embodiments comprise multiple MNPPs. Also, as shall be further clarified with reference to subsequent Figures herein, various embodiments comprise separately manufactured and delivered Nuclear Plants (NPs, nuclear energy-producing units) and Power Plants (PPs, energy-conversion units), in contrast to the MNPP-D, B. Unit 3502, which integrates an NP and a PP.

As will also be made clear with reference to other Figures herein, the Unit Configuration 3500 also preferably comprises a protective barrier structure (not depicted in FIG. 35) designed to mitigate impacts by aircraft or missiles.

Figure 36:
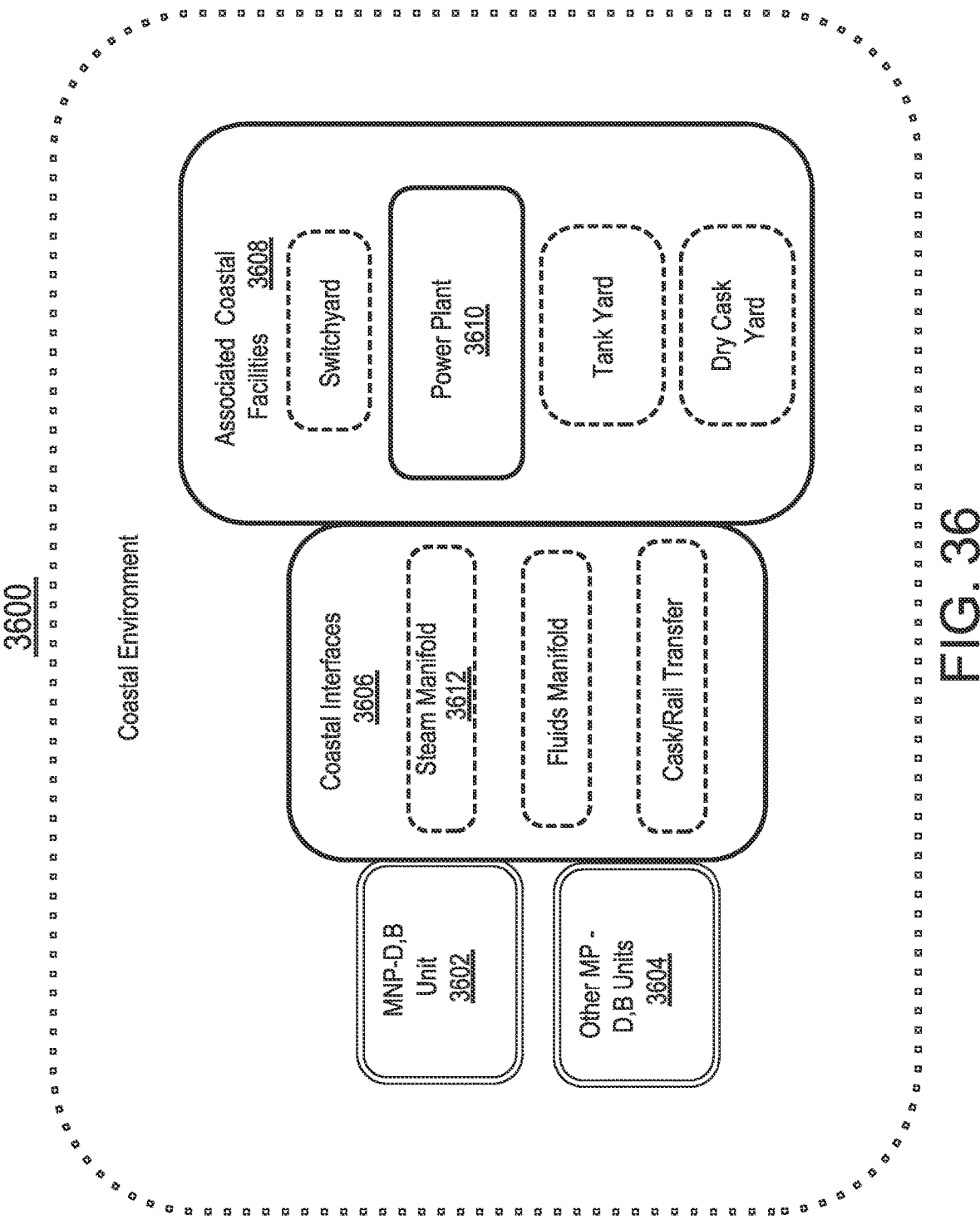

FIG. 36 is a conceptual depiction of functional relationships between portions of an illustrative Unit Configuration 3600 according to the many embodiments. FIG. 36 illustrates the separability of the energy-generation function (performed by, e.g., a nuclear reactor) from the power conversion function (performed by a Power Plant, e.g., turbine house). Unit Configuration 3600 comprises a Manufactured Nuclear Plant, either Docked or Basin-deployed (MNP-D, B) 3602, other Manufactured Plants, either Docked or Basin-deployed (MP-D, B) 3604, a set of Coastal Interfaces 3606 and Associated Coastal Facilities 3608, all embraced by a particular Coastal Environment 3610.

The Unit Configuration 3600 resembles Unit Configuration 3500 of FIG. 35 in most respects, but differs in at least three particulars: (1) Instead of an MNPP-D, B (nuclear plant plus power plant), as in FIG. 35, the Unit Configuration 3600 of FIG. 36 comprises an MNP-D, B 3602, that is, a nuclear plant producing steam rather than electricity. (2) The Associated Coastal Facilities 3608 comprise a Power Plant 3610 (and the Coastal Interfaces comprise a Steam Manifold 3612 rather than a Low Voltage Bus 3512 as in FIG. 35. (3) The Steam Manifold 3612 conveys steam from the MNP-D, B 3602 to a Power Plant 3608. The Power Plant 3608 is of a conventional type, custom-assembled onsite.

Figure 37:
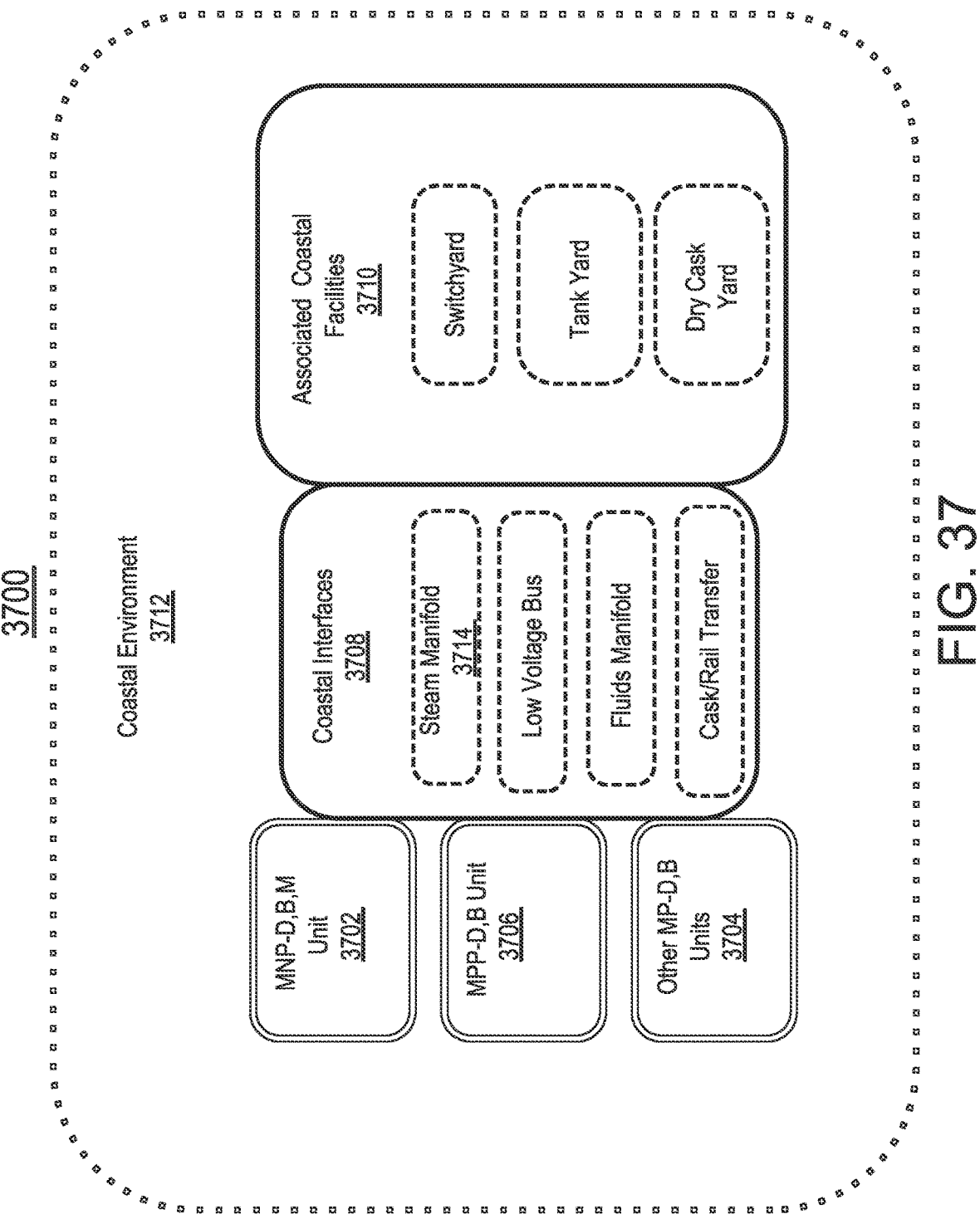

FIG. 37 is a conceptual depiction of functional relationships between portions of an illustrative Unit Configuration 3700 according to the many embodiments. FIG. 37 illustrates the combined effect of separating energy generation from power conversion and delivering the discrete Power Plant as a Manufactured Plant unit rather than custombuilding it onsite. Unit Configuration 3700 comprises an MNP-D,B,M 3702, various MP-D, B units 3704, a Manufactured Power Plant, either Docked or Basin-deployed (MPP-D, B) 3706, a set of Coastal Interfaces 3708 and Associated Coastal Facilities 3610, all embraced by a particular Coastal Environment 3712.

The Unit Configuration 3700 resembles Unit Configuration 3500 of FIG. 35 in most respects, but differs in at least three particulars: (1) The Unit Configuration 3700 of FIG. 37 comprises an MNP-D, B 3702, that is, a nuclear plant producing steam, not electricity. (2) The Unit Configuration 3700 comprises a Manufactured Power Plant, either Docked or Basin-deployed MP-D, B 3706. (3) The Coastal Interfaces 3708 comprise a Steam Manifold 3714 to convey steam from the MNP-D, B Unit 3702 to the MPP-D, B unit 3706.

Figure 38:
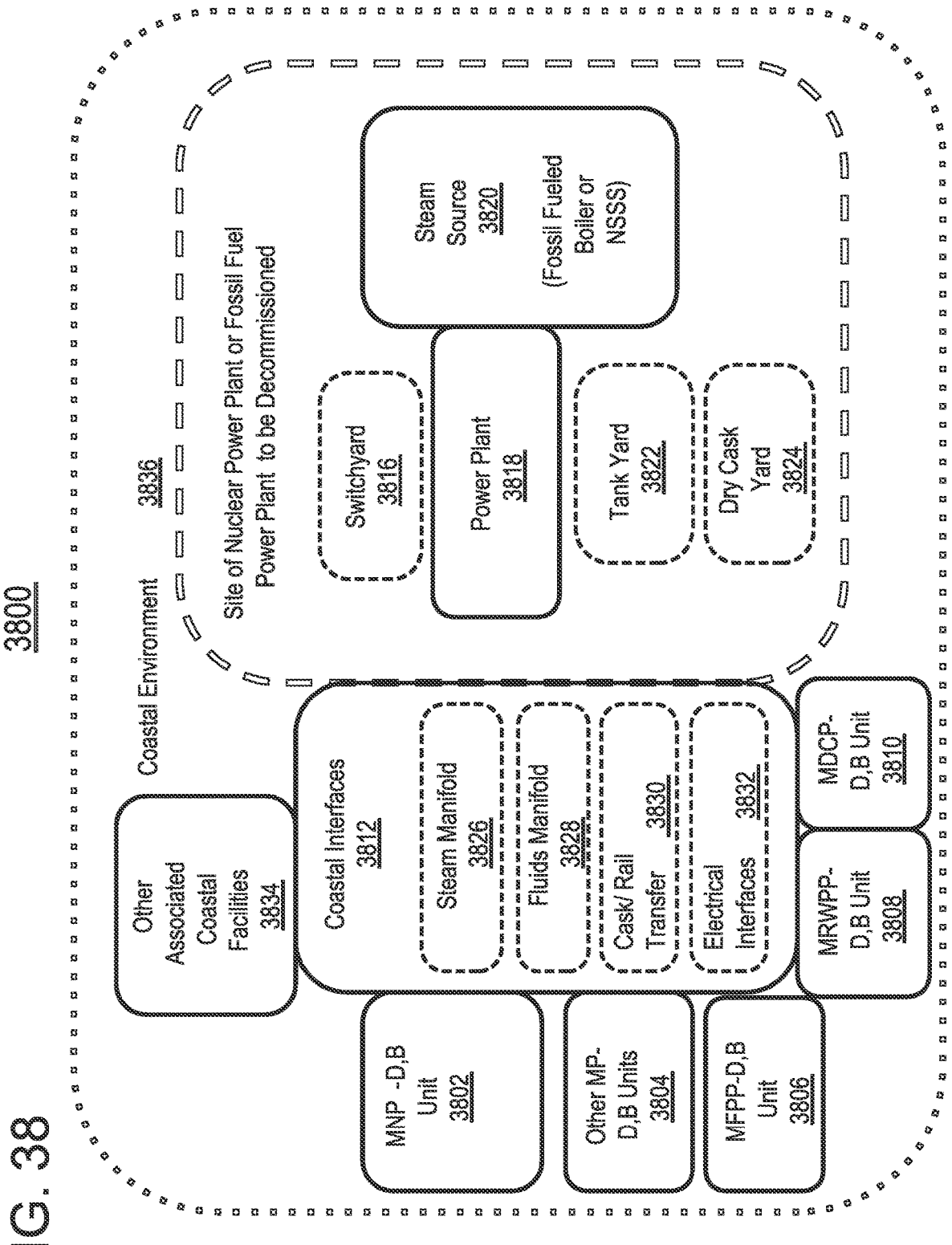

FIG. 38 is a conceptual depiction of functional relationships between portions of an illustrative Unit Configuration 3800 according to the many embodiments. FIG. 38 depicts an MNP delivered as a replacement steam supply plant for an existing coastal thermal generation plant whose original steam supply is a fossil-fueled boiler or nuclear steam supply system (NSSS). The replacement could either be permanent (e.g., replacing coal with nuclear energy) or temporary (e.g., during the decommissioning phase of a nuclear power plant). Unit Configuration 3800 comprises MNP-D, B 3802 and other Manufactured Plant MP-D, B units 3804, a Manufactured Radioactive Waste Processing Plant MRWPP-D, B Unit 3808, a Manufactured Decommissioning Plant MDCP-D, B Unit 3810. The Unit Configuration 3800 also comprises a Decommissioning Site 3814 and a set of Coastal Interfaces 3812. The Decommissioning Site 3814 comprises a switchyard 3816, a power plant 3818, and a steam source 3820. If the steam source 3820 is nuclear, the Decommissioning Site will also preferably comprise a tank yard 3822 and a dry cask yard 3824. The Coastal Interfaces 3812 comprise a steam manifold 3826, a fluids manifold 3828, a cask/rail transfer system 3830, and electrical interfaces 3832. The Unit Configuration 3800 typically also comprises other associated coastal facilities 3834. e.g., a dry cask transshipment facility. All components of the Unit Configuration 3800 are embraced by a particular Coastal Environment 3836.

In a typical sequence of operations, a Dock- or Basin-type Coastal Interfaces facility 3812 is constructed adjacent to a Decommissioning Site 3814 and an MNP-D, B unit 3802 is brought to the site with the other Units 3804, 3806, 3808, 3810 required for the decommissioning process. Preferably the MNP-D, B unit is of a type that supplies steam appropriate for the Power Plant 3818 of the Decommissioning Site 3814: for example, if the Steam Source 3820 is fossil-fueled, it will typically have produced high-temperature steam and a gas-cooled reactor would be most appropriate in the MNP-D, B Unit 3802. In another example, if the Steam Source 3820 is a boiling-water reactor, then a boiling-water reactor would be most appropriate in the MNP-D, B Unit 3802.

During an early stage of a decommissioning process, the original Steam Source 3820 is turned off and steam supply to the Power Plan 3818 from the MNP-D, B commences. If the Steam Source 3820 is fossil-fueled, it is relatively straightforward to disassemble and remove its components, if desired. If the Steam Source 3820 is nuclear, then it is necessary to deal with nuclear waste that has accumulated onsite during the plant lifetime. In the latter case, spent fuel from the Steam Source 3820 is conveyed to the MFPP-D, B 3806 by the Cask/Rail Transfer system 3830 and reprocessed, yielding usable fuel for the MNP-D, B Unit 3802 and a reduced quantity of high-level waste to be removed in dry casks to a long-term repository. The MRWPP-D, B 3808 deals with various forms of non-fuel nuclear waste produced by the original nuclear plant: e.g., it filters and dewaters liquid low-level waste, discharging the purified water portion to the environment and retaining a greatly reduced volume of concentrated waste to be removed in dry casks to a long-term repository. Although a dedicated non-manufactured radioactive-waste processing plant could be built on the Decommissioning Site 3814, the use of an MRWPP-D, B 3808 is advantageous because it can be used on multiple decommissioning projects before becoming unacceptably radioactive and requiring decommissioning itself, in contrast to a custom-built onsite plant, which can only be used once and is not practical to relocate.

The MDCP-D, B Unit 3810 is analogous to a dumpster system that can be used to collect, compact, and transport large amounts of non-liquid low-level contaminated structural material from the Decommissioning Site 3814. e.g., fill, etc. The MDCP-D, B. Unit 3810 typically comprises atmospheric control systems, multiple silos for different waste types, and various other subsystems for monitoring and controlling the waste.

Figure 39:
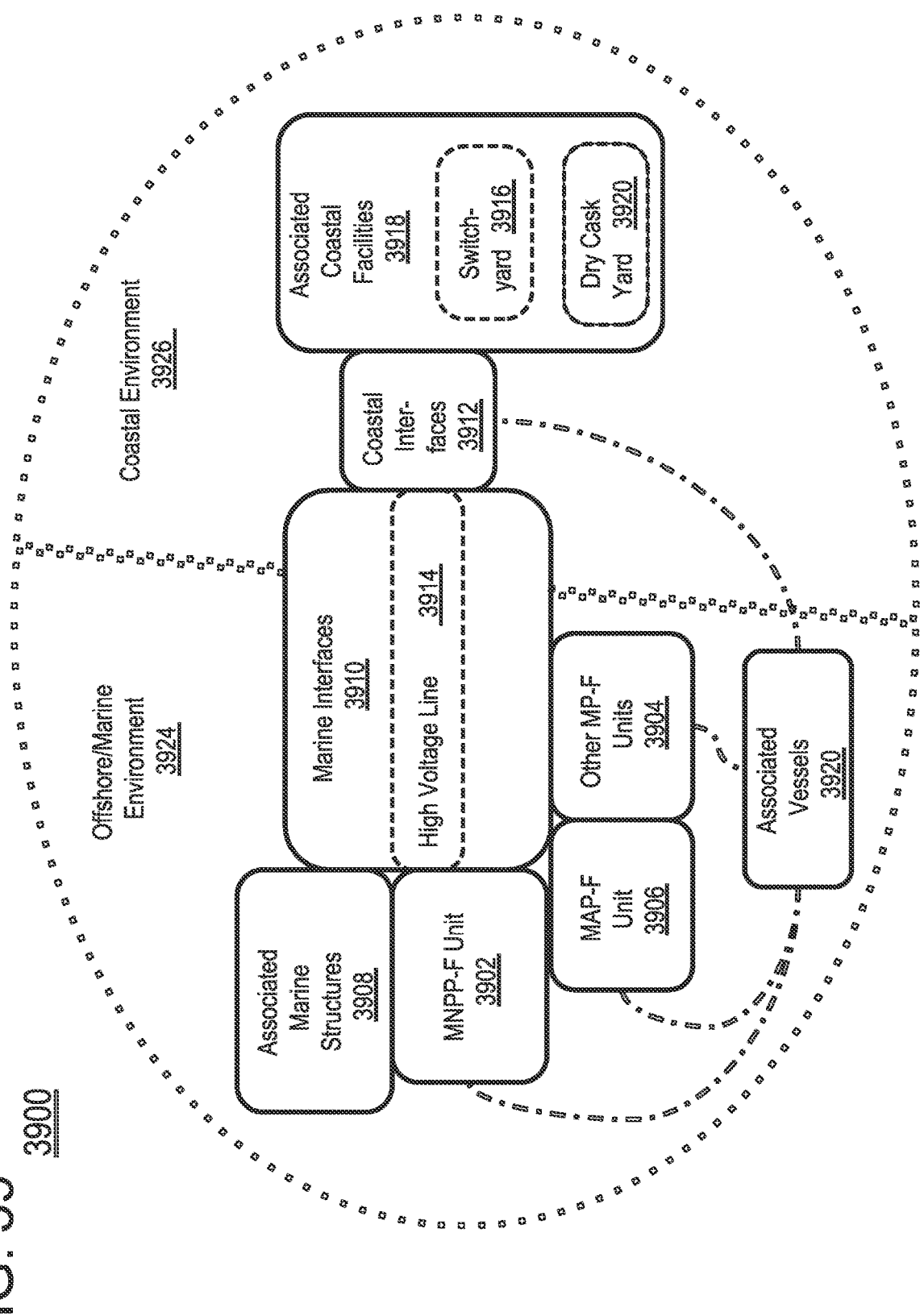

FIG. 39 is a conceptual depiction of functional relationships between portions of an illustrative Unit Configuration 3900 according to the many embodiments. FIG. 39 illustrates the association of one type of an offshore (deep water) MNP with a coastal facility. Unit Configuration 3900 comprises an Manufactured Nuclear Power Plant. Floating (MNPP-F) 3902 comprising some number of SMRs (not depicted), other Manufactured Plant. Floating (MP-F) Units 3904, a Manufactured Agricultural Plant. Floating (MAP-F) Units 3906. Associated Marine Structures 3908 (including. e.g., a defensive barge perimeter). Marine Interfaces 3910 between the deep-water units 3902, 3904, 3906, 3908 and Coastal Interfaces 3912, a high-voltage line for electrical intercommunication between the deep-water units 3902, 3904, 3906, 3908 and a switch yard 3916 comprised by a set of Associated Coastal Facilities 3918, a dry cask yard 3920, and vessels supporting operation of the deep-water units 3902, 3904, 3906, 3908 and also interacting with the Coastal Interfaces 3912, all embraced by a particular Offshore/ Marine Environment 3924 and Coastal Environment 3926. The MAP-F Unit 3902, which may be dedicated to the production of agricultural inputs (e.g., freshwater, fertilizer) from seawater, exemplifies that functions other than electricity generation are contemplated for energy ultimately sourced by SMRs in various embodiments.

Figure 40A:
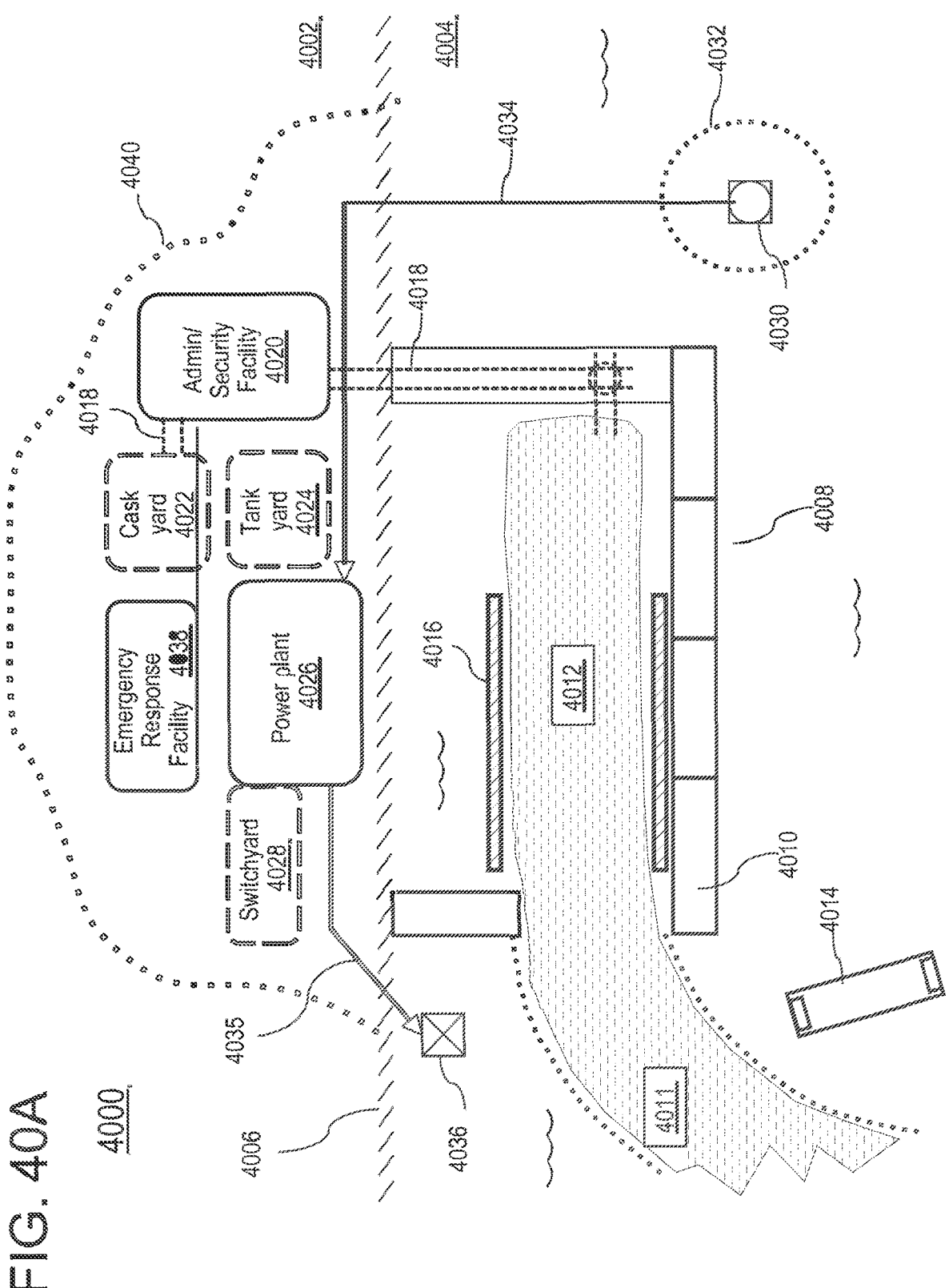
FIGS. 40A, 40B, 41A, 41B, 42, 43, 44 and 45 are diagrammatic views of portions of illustrative embodiments depicting physical layouts of the embodiments for coastal deployments in accordance with the present teachings.

FIGS. 40A-45 are schematic depictions of portions of illustrative embodiments where the physical layout of the embodiments is emphasized rather than the functional relationships between components as in FIGS. 35-40 to depict, among other things, coastal, river, and delta deployments FIG. 40A is a schematic, top-down view of portions of an illustrative coastal deployment 4000 of a manufactured nuclear plant, docked (MNP-D) comprising some number of SMRs (not depicted). FIG. 40A depicts the site prior to the arrival of the MNP-D: FIG. 40B depicts the site after installation of the MNP-D. The deployment 4000 comprises a landmass 4002, water body 4004, and shoreline 4006 (row of angled line segments) that are part of the coastal environment. The deployment 4000 also comprises a 4008. The dock 4008 comprises a number of grounded concrete cessions (e.g., caisson 4010) that define a barrier or housing that is closed on the seaward side and open on the shoreward side. Preferably, caissons are floated into place and ballasted to ground on a natural or prepared portion of the seafloor. Moreover, preferably the dock 4008 is constructed in such a way that substantial mixing or circulation of water in the dock with water in the surrounding water 4004 is prevented. A natural or dredged approach channel 4011 constitutes a marine interface for deployment 4000, being of sufficient breadth and depth to permit delivery of an MNP-D and/or other manufactured plant units by flotation to a stationing area 4012 preferably floored by a prepared foundation. A relocatable (e.g., floating or easily de-ballasted) caisson 4014 may be moved to constitute part of the dock 4008, closing off the approach channel 4011. e.g., after delivery of an MNP-D to the stationing area 4012. That portion of the stationing area 4012 which will house the nuclear-materials portion of the MNP-D and thus require protection against impacts by missiles or aircraft is overarched lengthwise by a portion 4016 of an impact shield (depicted in cross-section), this lengthwise portion 4016 of the impact shield being open at both ends. A rail transfer system 4018 connects the dock 4008 to an administration and security facility 4020 onshore and thence to a cask yard 4022, enabling controlled exchange of nuclear and other materials (e.g., dry casks of cooled spent nuclear fuel) between the on-shore facilities and the dock 4008. A tank yard 4024 houses fluids such purified water for reactor operations and low-level liquid radioactive waste. A power plant (turbine house) 4026 receives steam from the MNP-D via pipes not depicted in FIG. 40A and converts a portion of the thermal energy thus delivered to electricity that is distributed to a grid or other consumers via a switchyard 4028. Coolant water is collected from the environmental water body 4004 via a coolant intake 4030 from which debris and other harmful objects or materials are excluded by an inlet screen 4032: water from the inlet 4030 is conveyed to the power plant 4026 via inlet piping 4034. Heated coolant from the power plant 4026 is returned via outlet piping 4035 to the water body 4004 via an outlet 4036 that is preferably closer to the shore 4006 than the inlet 4030 and far enough from the inlet 4030 to prevent untoward mixing of heated outlet water with cool inlet water. An Emergency Response Facility 4038 acts as a backup control center for the MNP-D and its associated facilities. The Response Facility 4038 can assure delivery of sufficient coolant to the nuclear reactor(s) (e.g., sufficient to support passive convective cooling). The Response Facility 4038 enables lower impact protection standards for control facilities, since diversification of control points is interchangeable with heightened hardening of a single control point: either diversification or higher hardening can only be disabled by larger or multiple attacks, which are more difficult to mount and therefore less likely to be mounted.

The on-shore facilities of the deployment 4000 are sheltered by a defensive perimeter 4040 that may comprise various barriers, devices, personnel, drones, and the like to defend the deployment 4000; additional defensive measures may be comprised by the deployment 4000 to defend against aerial and marine threats. Whether or not named or depicted herein, such defensive arrangements are comprised by all embodiments discussed herein, as well as by various other embodiments.

Figure 40B:
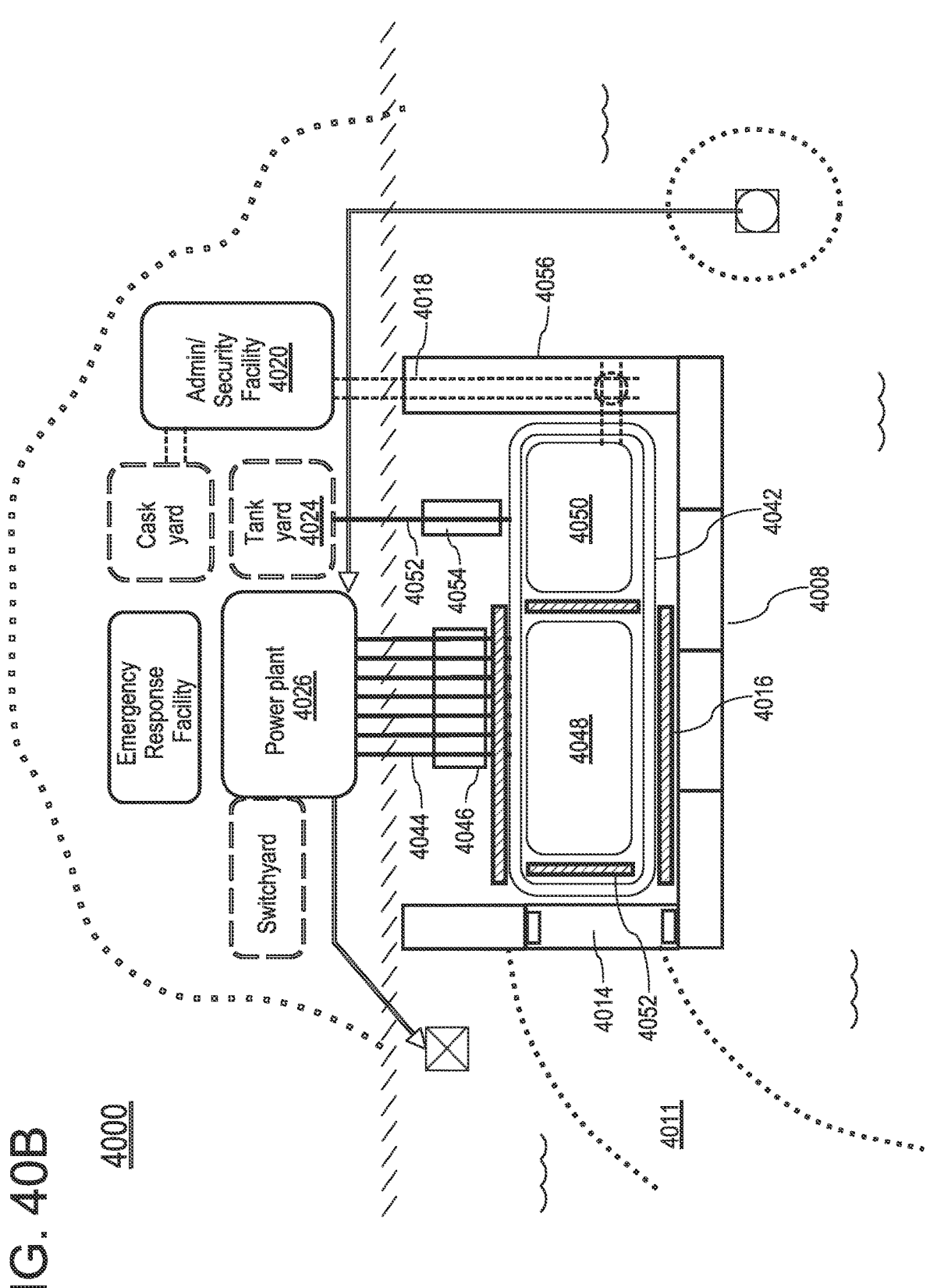

FIG. 40B is a schematic, top-down view of portions of the illustrative coastal deployment 4000 of FIG. 40A after docking of an MNP-D 4042 comprising some number of SMRs (not depicted). In the state of construction of deployment 4000 depicted in FIG. 40B, an MNP-D (symbolized by double outline block) 4042 has been ensconced in the dock 4008 beneath the lengthwise arching portion 4016 of the impact shield. A manifold of steam pipes (e.g., pipe 4044), supported by a pipe bridge 4046, conveys steam between the power plant 4026 and a nuclear plant (NP) 4048 comprised by the MNP-D 4042. The NP 4048 comprises all modules of the MNP-D 4042 that require impact shielding, including a control room module (not depicted). Fluids are also conveyed between the tank yard 4024 and an auxiliary systems module 4050 of the MNP-D 4042 by piping 4052 supported by a pipe bridge 4054. The auxiliary systems module 4050 comprises all modules of the MNP-D 4042 that do not require impact shielding. SMRs are preferably installed and removed from the MNP-D via the auxiliary module 4050; if the MNP-D 4042 is installed in the dock 4008 in the orientation shown in FIG. 40B. SMRs will preferably arrive and depart via a land route for directness of access to the auxiliary module 4050, being conveyed locally on the rail system 4018, which is supported by a causeway or bridge 4054. If the MNP-D 4042 is installed in the dock 4008 in the orientation opposite to that shown in FIG. 40B. SMRs will preferably arrive and depart via flotation. The impact shield around the NP 4048 is completed by two endcap shields (e.g., shield 4052) that are comprised by the MNP-D 4042. The moveable caisson 4014 has, after delivery of the MNP-D 4042, been stationed across the channel 4011, reversibly sealing the MNP-D 4042 into the dock 4008.

An advantage of deployment 4000, as of various other embodiments, some discussed herein, is that all components delivered as Manufactured Plant Units may be removed as they were delivered, by flotation, whether for decommissioning at a specialized facility or deployment at a different location, and one or more replacement Units may be installed at the deployment. Mobility and modularity thus are features of the nuclear power source as a whole, as of other Manufactured Plant Units comprised by the deployment: moreover. SMRs are preferably and typically small enough to be removed from the MNP, redeployed, decommissioned remotely, and/or replaced in a manner analogous to the MNP itself. Thus, advantages are obtained from modularity and mobility both at the deployment scale and at the scale of the individual small modular reactor.

Figure 41A:
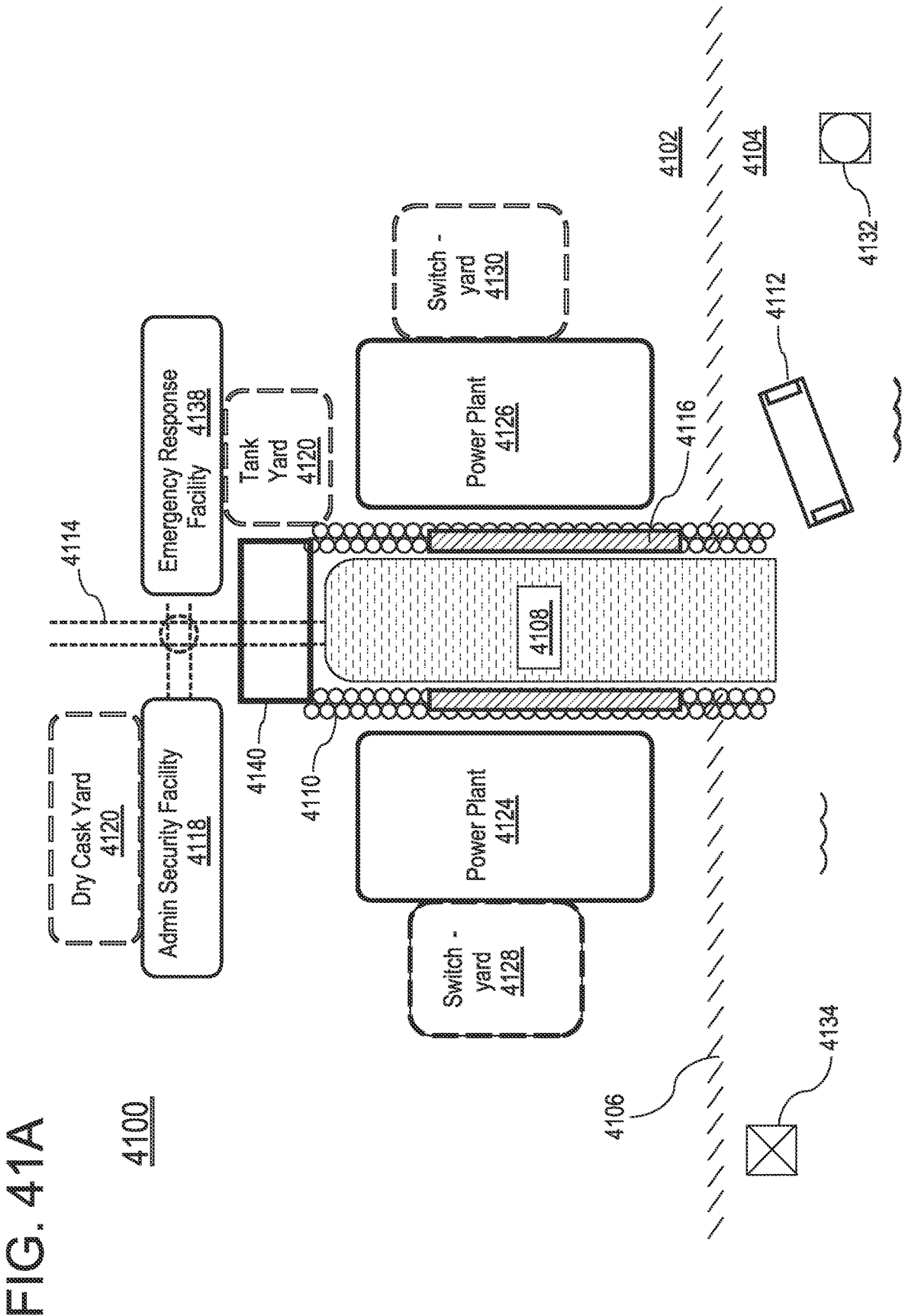
Figure 41B:
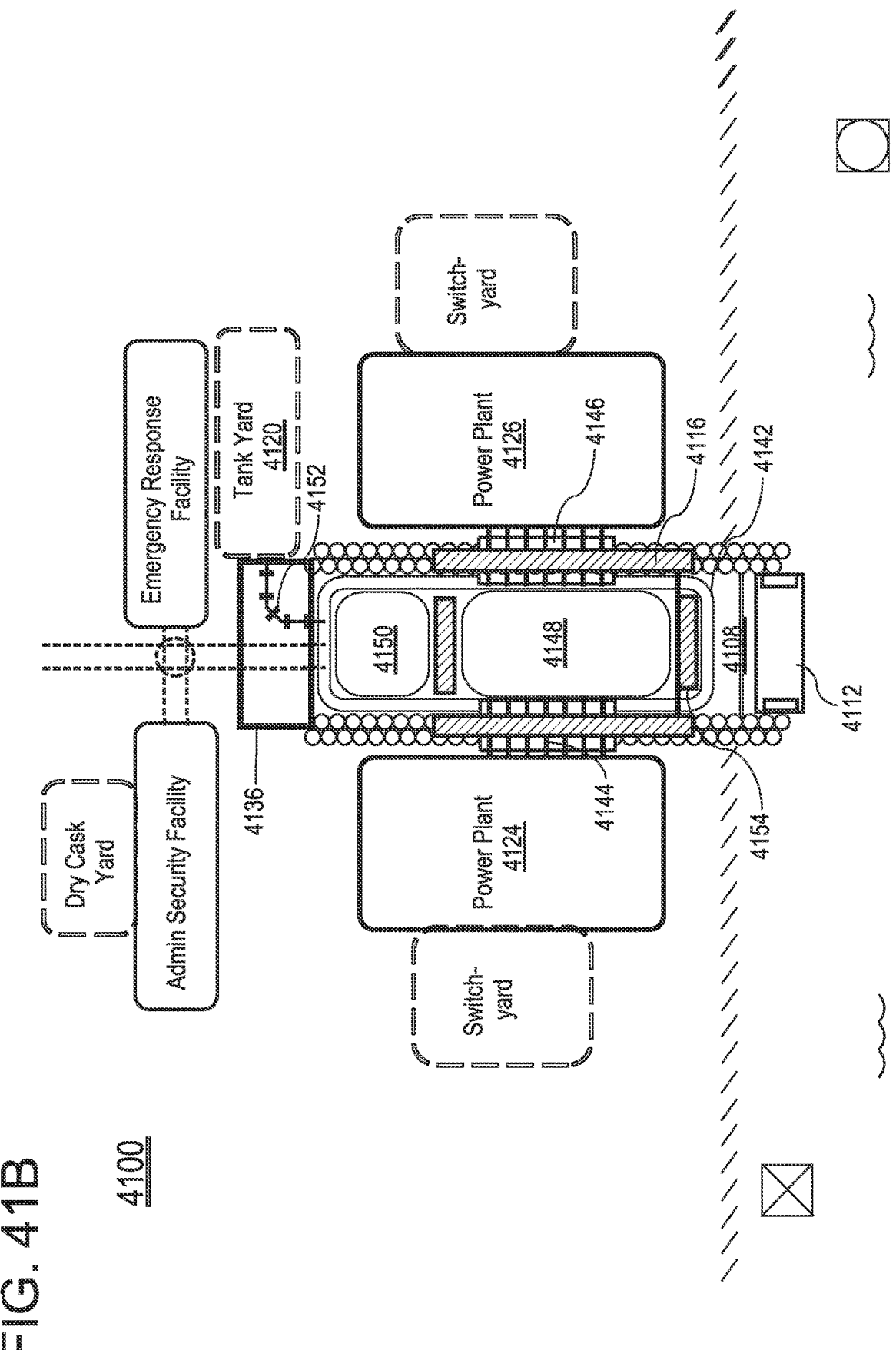

FIG. 41A is a schematic, top-down view of portions of an illustrative coastal deployment 4100 of a manufactured nuclear plant, basin-deployed (MNP-B) comprising some number of SMRs (not depicted). FIG. 41A depicts the site prior to the arrival of the MNP-B; FIG. 41B depicts the site after installation of the MNP-B. The deployment 4100 comprises a landmass 4102, water body 4104, and shoreline 4106 that are part of the coastal environment. The deployment 4100 also comprises a water-filled basin 4108 (i.e., depression cut into the landmass 4102 and in fluid communication with the environmental water body 4104) whose walls are defined and stabilized on at least two sides by rows or barriers of pilings (e.g., barrier 4110). Pilings may be conventionally driven or formed in situ. e.g., of pretensioned concrete poured in drilled shafts and/or tubes. The basin is of sufficient breadth and depth to permit delivery of an MNP-B and/or other manufactured plant units by flotation and is preferably floored by a prepared foundation. A relocatable caisson 4112 may be moved to close off the basin 4108. e.g., after delivery of an MNP-D to the basin 4108. That portion of the basin 1108 which will house the nuclear-materials portion of the MNP-B and thus require protection against impacts by missiles or aircraft is overarched lengthwise by a portion 4114 of an impact shield (depicted in cross-section), this lengthwise portion 4114 of the impact shield being open at both ends. A rail transfer system 4116 connects the basin 4108 to an administration and security facility 4118 onshore and thence to a cask yard 4120, enabling controlled exchange of nuclear and other materials (e.g., dry casks of cooled spent nuclear fuel) between the on-shore facilities and the basin 4108. A tank yard 4122 houses fluids such purified water for reactor operations and low-level liquid radioactive waste. Two power plants (turbine houses) 4124, 4126 receive steam from the MNP-B via pipes not depicted in FIG. 41A and converts a portion of the thermal energy thus delivered to electricity that is distributed to a grid or other consumers via switchyards 4128, 4130. Coolant water is collected from the environmental water body 4104 via a coolant intake 4132: heated coolant from the power plants 4124, 4126 is returned to the water body 4104 via an outlet 4134 that is preferably closer to the shore 4006 than the inlet 4132 and far enough from the inlet 4132 to prevent untoward mixing of heated outlet water with cool inlet water. Screening and piping for the coolant inlet 4130 and outlet 4132 are not depicted in FIG. 41A or subsequent Figures herein, but are preferably comprised. An emergency Response Facility 4134 acts as a backup control center for the MNP-D and its associated facilities, much as the Response Facility 4038 of FIG. 40A functions for deployment 4000. A support deck 4136 supports interface of the rail transfer system 4114 with the edge of the basin 4108.

FIG. 41B is a schematic, top-down view of portions of the illustrative coastal deployment 4100 of FIG. 41A after docking of an MNP-B 4142 comprising 12 SMRs (not depicted). In the state of construction of deployment 4100 depicted in FIG. 41B, an MNP-B 4042 has been ensconced in the basin 4108 beneath the lengthwise arching portion 4116 of the impact shield. Two manifolds of steam pipes (e.g., pipe 4144), supported by pipe bridges (e.g., pipe bridge 4146), convey steam between the NP 4048 comprised by the MNP-B 4042 and the two power plants 4124, 4126: preferably, one power plant 4124 exchanges steam with 6 SMRs in the MNP-B 4142, and the other power plant 4126 exchanges steam with the other 6 SMRs in the MNP-B 4142. Fluids are also conveyed between the tank yard 4120 and an auxiliary systems module 4150 of the MNP-B 4042 by piping 4152 supported by the support deck 4136. The impact shield around the NP 4148 is completed by two endcap shields (e.g., shield 4154) that are comprised by the MNP-B 4142. The moveable caisson 4112 has, after delivery of the MNP-B 4142, been stationed across the basin 4108, reversibly sealing the MNP-B 4142 into the basin 4108. The rail transfer system 4116 enables exchange of nuclear and other materials (e.g., dry casks of cooled spent nuclear fuel. SMRs) between the onshore facilities and the auxiliary module 4150; in other embodiments, the orientation of the MNP-B 4142 is reversed. i.e., the auxiliary module 4150) is at the seaward rather than the landward end, in which case casks and other loads are exchanged by flotation with the seaward end of the MNP-B 4142. The NP 4148 comprises all modules of the MNP-D 4042 that require impact shielding, including a control room module (not depicted). The auxiliary systems module 4150 comprises all modules of the MNP-D 4042 that do not require impact shielding.

Figure 42:
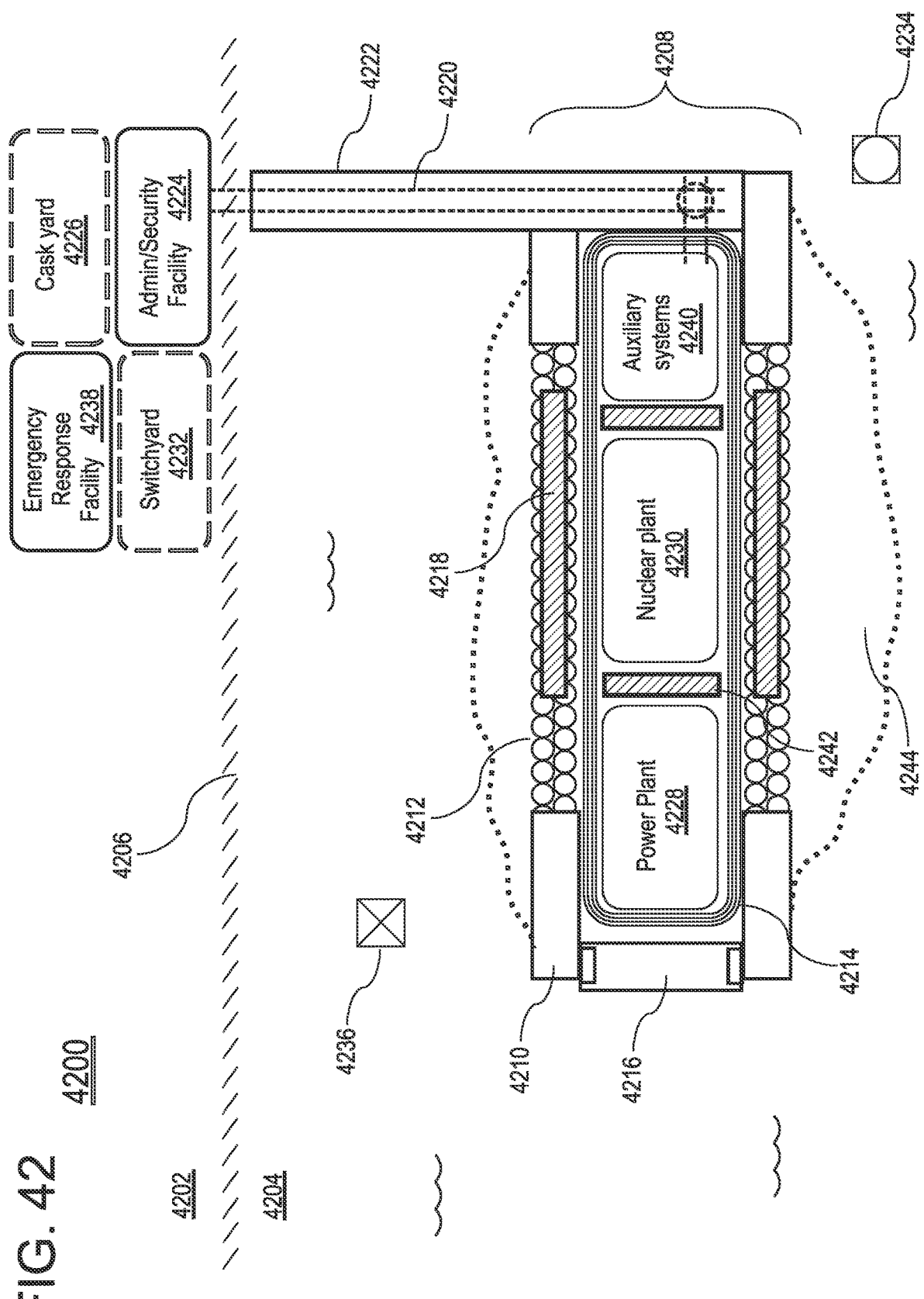

FIG. 42 is a schematic, top-down view of portions of an illustrative coastal deployment 4200 of a manufactured nuclear power plant, docked (MNPP-D. i.e., a Manufactured Unit comprising both a Nuclear source and a Power Plant) that comprises some number of SMRs (not depicted). The deployment 4200 comprises a landmass 4202, water body 4204, and shoreline 4206 that are part of the coastal environment. The water body 4204 is presumed to be deeper than that of deployments 4000 of FIG. 40A or 4100 of FIG. 41A, and/or the location of the offshore components of the deployment 4200 are farther from the shore 4206 (e.g., 1 km offshore); or, this deployment may be preferred in a particular instance for other reasons. The deployment 4200 comprises a dock 4208 that comprises a number of grounded concrete cessions (e.g., caisson 4210) and rows of pilings (e.g., row 4212) that enclose an MNPP-D 4214 on all four sides. The MNPP-D 4214 is grounded on a stationing area within the dock 4208 preferably floored by a prepared foundation. The opening through which the MNP-D 4214 is delivered to the interior of the dock 4208 is closed off by relocatable caisson 4216. That portion of the interior of the dock 4208 that houses the nuclear-materials portion of the MNPP-D is overarched lengthwise by a portion 4218 of an impact shield (depicted in cross-section), this lengthwise portion 4218 of the impact shield being open at both ends. A rail transfer system 4220 supported by a causeway or bridge 4222 connects the MNPP-D 4214 to an administration and security facility 4224 onshore: e.g., SMRs and waste casks may be transported along the rail system 4220 (in the case of casks, to or from a cask yard 4226). The MNPP-D 4214 comprises a power plant 4228 that converts a portion of the thermal energy delivered by SMRs in an NP 4230 to electricity that is distributed to a grid or other consumers via a switchyard 4232. Coolant water is collected from the environmental water body 4204 via a coolant intake 4234; heated coolant from the power plant 4228 is returned to the water body 4204 via an outlet 4236 that is preferably closer to the shore 4206 than the inlet 4234 and far enough from the inlet 4234 to prevent untoward mixing of heated outlet water with cool inlet water. An emergency Response Facility 4238 acts as a backup control center for the MNPP-D 4214 and its associated facilities, much as the Emergency Response Facility 4038 of FIG. 40A functions for deployment 4000. The MNPP-D 4214 also comprises an auxiliary systems module 4240) and endcap impact shields (e.g., shield 4242). Material dredged to form the stationing area within the dock 4208 has, in this illustrative deployment, been heaped up into berms alongside the dock 4208 (e.g., berm 4244, outline denoted by a dotted lines); the berms provide additional protection for the dock (e.g., against ramming by large vessels) and stability for the pilings. The NP 4230 comprises all modules of the MNPP-D 4214 that require impact shielding, including a control room module (not depicted). The auxiliary systems module 4240 comprises all modules of the MNP-D 4214 that do not require impact shielding.

If the MNPP-D 4214 is installed in the dock 4208 in the orientation shown in FIG. 42. SMRs will preferably arrive and depart via a land route for directness of access to the auxiliary systems module 4240, being conveyed locally on the rail system 4220. If the MNPP-D 4214 is installed in the dock 4208 in the orientation opposite to that shown in FIG. 42. SMRs will preferably arrive and depart via flotation.

Figure 43:
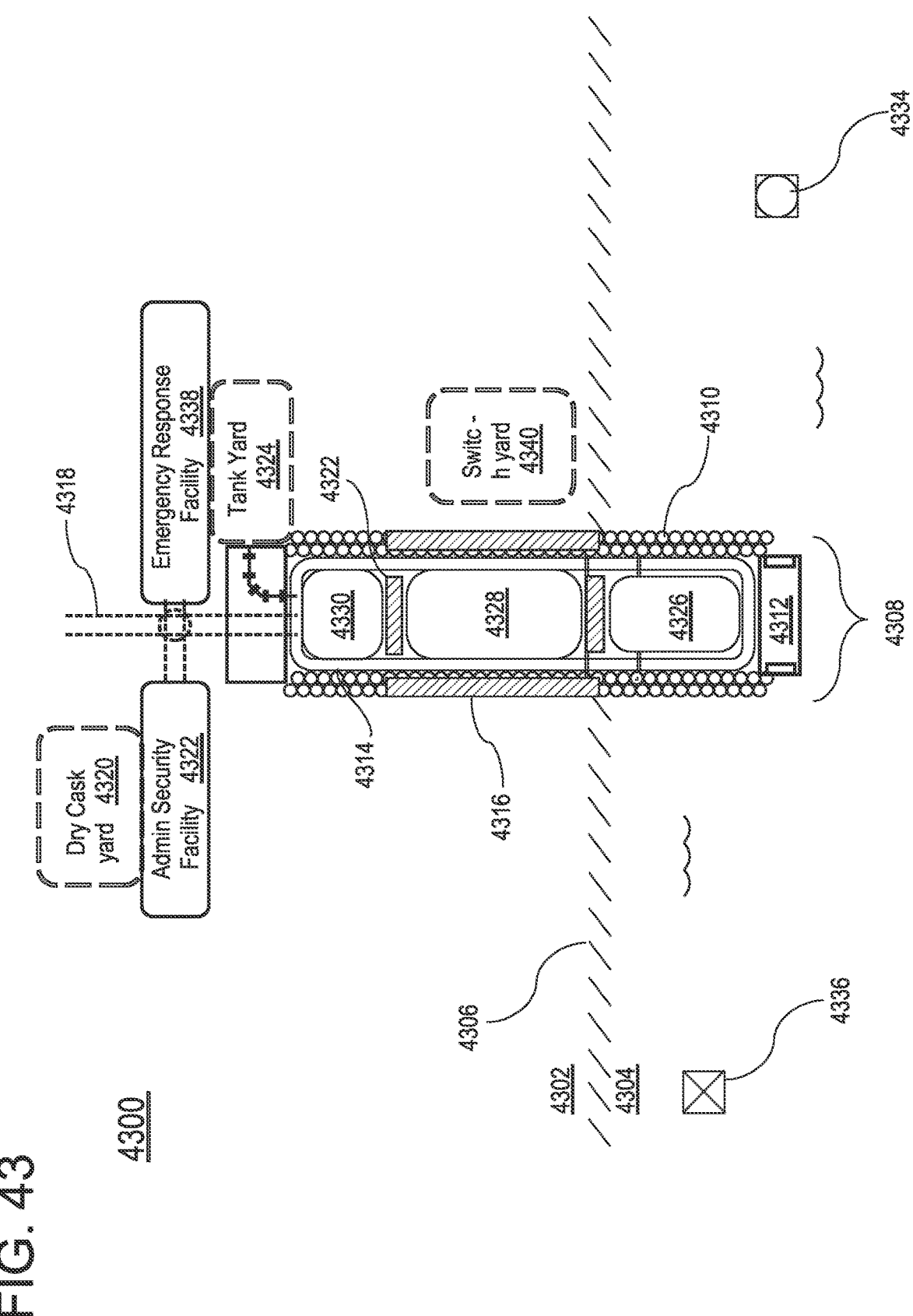

FIG. 43 is a schematic, top-down view of portions of an illustrative coastal deployment 4300 of a manufactured nuclear power plant, basin-deployed (MNPP-B) comprising some number of SMRs (not depicted). The deployment 4300 comprises a landmass 4302, water body 4304, and shoreline 4306. The deployment 4300 also comprises a water-filled hybrid basin-dock structure 4308, partly cut into the landmass 4302 and partly dredged out into the water body 4304, whose walls are defined and stabilized on at least two sides by rows or barriers of pilings (e.g., barrier 4310). The basin-dock is of sufficient breadth and depth to permit delivery of an MNPP-B and/or other manufactured plant units by flotation and is preferably floored by a prepared foundation. A relocatable caisson 4312 may is used to close off the seaward opening of the basin-dock 4308 after delivery of an MNPP-D 4314. That portion of the basin-dock 4308 which houses the nuclear-materials portion of the MNPP-B 4314 is overarched lengthwise by a portion 4316 of an impact shield (depicted in cross-section), this lengthwise portion 4316 of the impact shield being open at both ends. A rail transfer system 4318 connects the MNPP-D 4314 to an administration and security facility 4320 onshore and thence to a cask yard 4322. A tank yard 4324 houses fluids such purified water for reactor operations and low-level liquid radioactive waste. The MNPP-D 4314 comprises a power plant 4326, an NP 4328, and an auxiliary services unit 4330. The NP 4328 is bracketed by endcap impact barriers (e.g., barrier 4322). Coolant water is collected from the water body 4304 via a coolant intake 4334; heated coolant from the power plant 4326 is returned to the water body 4304 via an outlet 4336. An emergency Response Facility 4338 acts as a backup control center for the MNP-D and its associated facilities, much as the Response Facility 4038 of FIG. 40A functions for deployment 4000. The NP 4328 comprises all modules of the MNPP-D 4314 that require impact shielding, including a control room module (not depicted). The auxiliary systems module 4330 comprises all modules of the MNPP-D 4314 that do not require impact shielding. Electricity from the power plant 4326 is distributed to a grid or other consumers via a switchyard 4340. The deployment 4300 entails minimal site preparation as compared to the deployments 4000, 4100, and 4200 of FIGS. 40B. 41B, and 42, with little offshore construction required and all the heaviest machinery delivered aboard the MNPP-D 4314.

Figure 44:
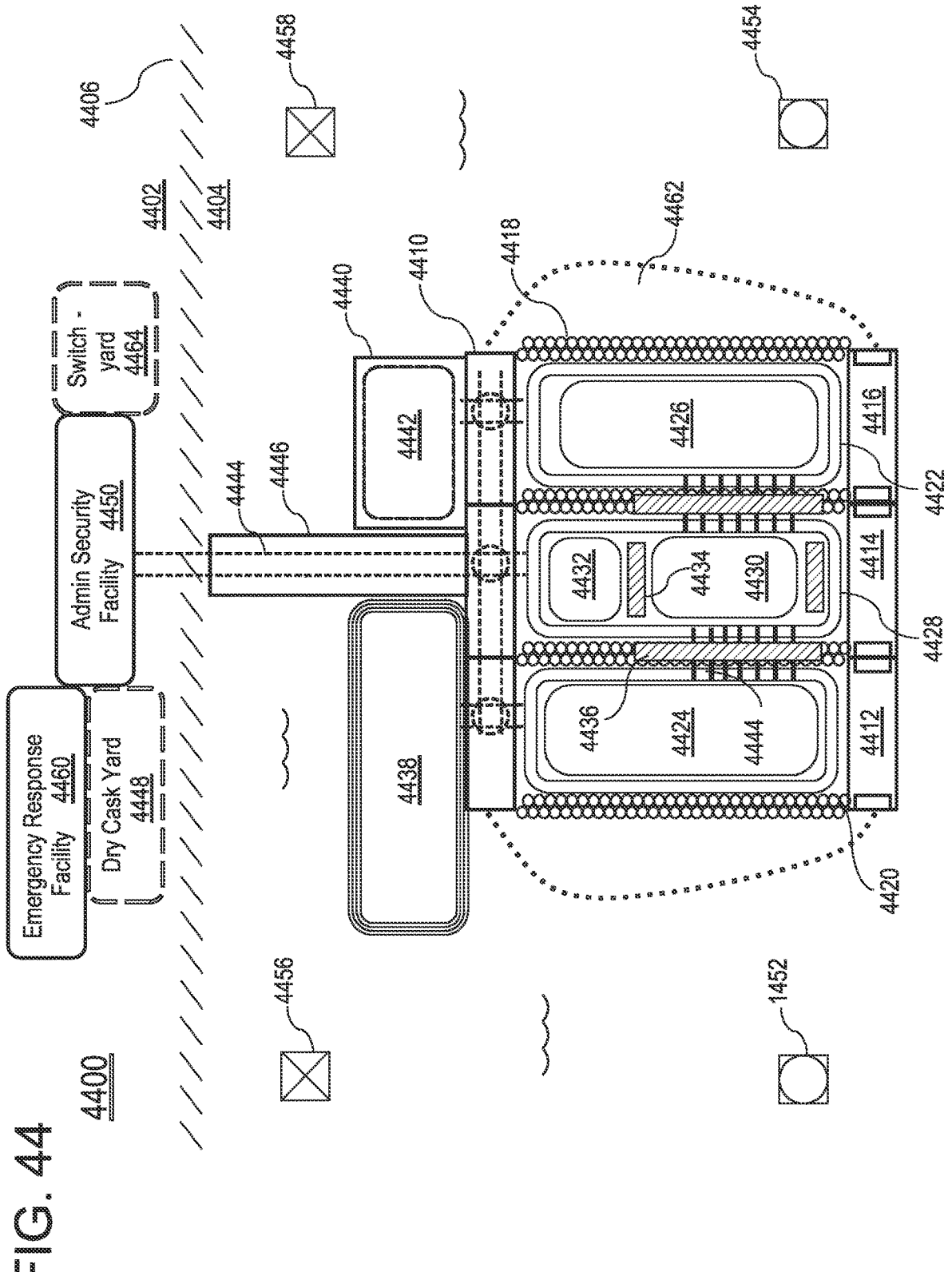

FIG. 44 is a schematic, top-down view of portions of an illustrative coastal deployment 4400 of an MNP that comprises 12 SMRs (not depicted). The deployment 4400 comprises a landmass 4402, water body 4404, and shoreline 4406, and a multi-port dock 4408 that comprises a number of grounded concrete cessions (e.g., caisson 4410), including moveable cessions 4412, 4414, 4416 used to block access openings after unit delivery, and rows of pilings (e.g., row 4418). The dock 4408 encloses an MNP comprising a number of Manufactured Plant Units (symbolized by double-outline blocks). In particular, the MNP housed by the dock 4408 comprises two MP-Ds 4420, 4422 housing two power conversion plants 4424, 4426, as well as an MNP-D 4428 comprising an NP 4430, an auxiliary services module 4432, and endcap impact barriers (e.g., barrier 4434). The MP-Ds 4420, 4422 and MNP-D 4428 are grounded in stationing areas within the dock 4408, preferably floored by prepared foundations: the foundation for the MNP-D 4428 is preferably seismically rated. That portion of the interior of the dock 4408 that houses the nuclear-materials portion of the MNP-D 4428 is overarched lengthwise by a portion 4436 of an impact shield (depicted in cross-section), this lengthwise portion 4436 of the impact shield being open at both ends. The NP 4430 comprises all modules of the MNP-D 4428 that require impact shielding, including a control room module (not depicted). The auxiliary systems module 4432 comprises all modules of the MNP-D 4428 that do not require impact shielding. An additional MN-P 4438 is grounded adjacent to the dock 4408 and acts as a docking and transfer point for barges conveying SMRs or other materials by flotation to the dock 4408. A large caisson 4440 houses fluid reserve tanks 4442. A rail transfer system 4444 supported by a causeway or bridge 4446 connects the MP-Ds 4420, 4422 and MNP-D 4428 to an administration and security facility 4448 onshore: e.g., SMRs and waste casks may be transported along the rail system 4444 (in the case of casks, to or from a cask yard 4450)). Coolant water is collected from the water body 4404 via coolant intakes 4452, 4454 and delivered to the power plants 4424, 4426; heated coolant from the power plants 4424, 4426 is returned to the water body 4404 via outlets 4456, 4458 that are preferably closer to the shore 4406 than the inlets 4452, 4454 and far enough from the inlets 4452, 4454 to prevent untoward mixing of heated outlet water with cool inlet water. Steam is exchanged between a first power plant 4424 and one set of 6 SMRs (not shown) comprised by the NP 4430, and between a second power plant 4426 and a second set of 6 SMRs comprised by the NP 4430. An emergency Response Facility 4460 performs functions similar to those of the Response Facility 4038 of FIG. 40A functions for deployment 4000. Material dredged to form the stationing areas within the dock 4408 has, in this illustrative deployment, been heaped up into berms alongside the dock 4408 (e.g., berm 4462, outline denoted by a dotted lines); the berms provide additional protection for the dock (e.g., against ramming by large vessels) and stability for the pilings. Electricity generated by the power plants 4424, 4426 is distributed to a grid or other consumers via a switchyard 4464.

If the MNP-D 4428 is installed in the dock 4408 in the orientation shown in FIG. 44. SMRs will preferably arrive and depart via a land route for directness of access to the auxiliary systems module 4432, being conveyed locally on the rail system 4444. If the MNP-D 4428 is installed in the dock 4408 in the orientation opposite to that shown in FIG. 44. SMRs will preferably arrive and depart via flotation.

An advantage of the deployment 4400, and of various other deployments in which a larger number of MPs are deployed rather than a smaller number combining several functions in each, is that smaller MPs tend to allow a larger variety of shipyards to participate, which in turn encourages diversification of supply chain, reduces construction time, and makes feasible access to a wider range of MP delivery sites.

Figure 45:
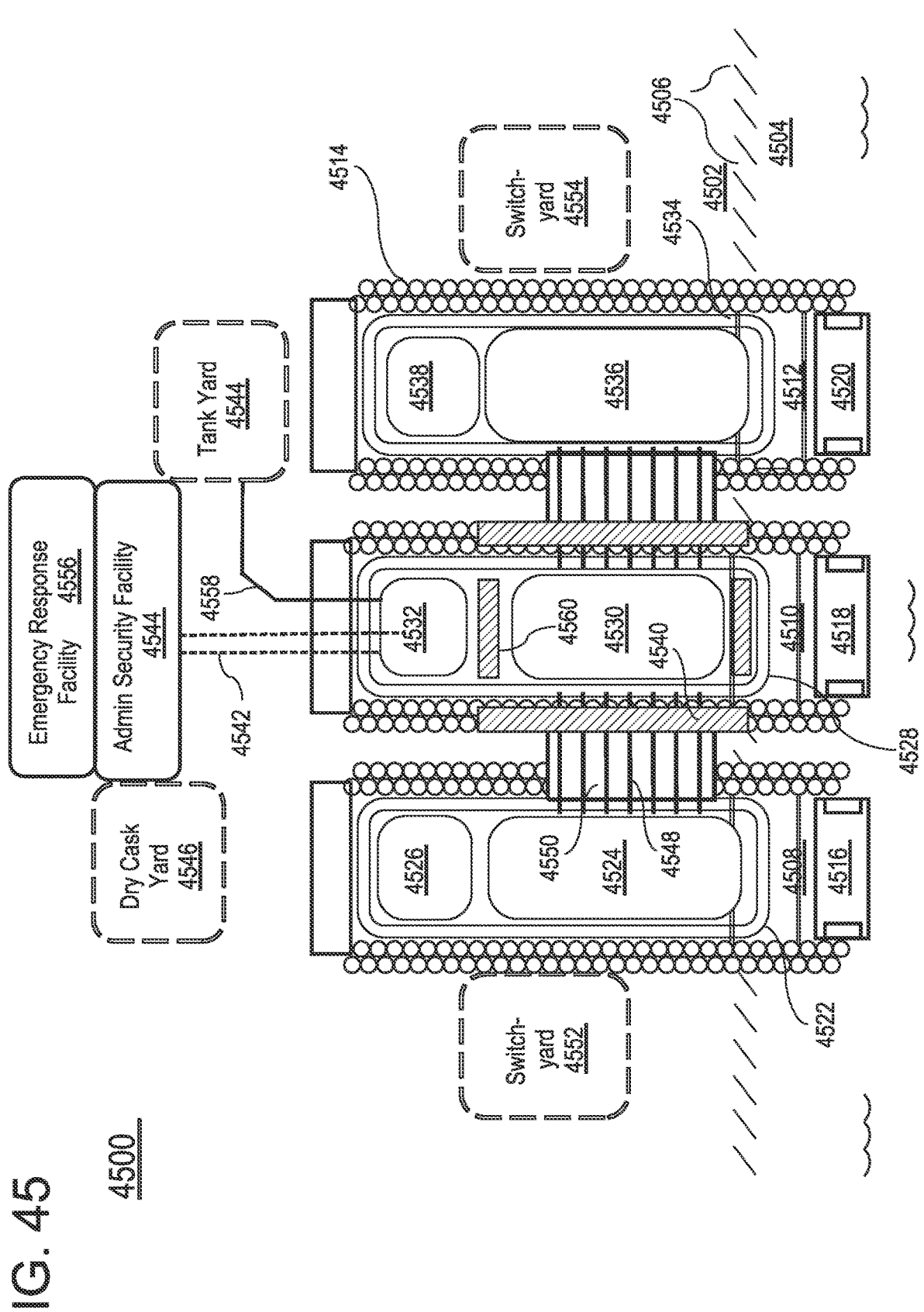

FIG. 45 is a schematic, top-down view of portions of an illustrative coastal deployment 4500 comprising manufactured nuclear plant, basin-deployed (MNP-B) that comprises some number of SMRs (not depicted). The deployment 4500 resembles that of FIG. 40B, but with power plants delivered to the site as Manufactured Plant Units rather than custom-assembled onsite in the traditional fashion. Deployment 4500 comprises a landmass 4502, water body 4504, and shoreline 4506, and three basins 4508, 4510, 4512, each of whose walls are defined and stabilized on at least two sides by rows or barriers of pilings (e.g., barrier 4514). Each of the basins 4508, 4510, 4512 is of sufficient breadth and depth to permit delivery of an MP-B by flotation and is preferably floored by a prepared foundation. Relocatable cessions 4516, 4518, 4520) close off each of the basins 4508, 4510, 4512 after delivery of an MP-B. In the illustrative deployment 4500, the first basin 4508 houses an MP-B 4522 comprising a power plant 4524 and auxiliary services unit 4526, the second basin 4510 houses an MNP-B 4528 comprising a nuclear plant 4530 and auxiliary services module 4532, and the third basin 4512 houses an MP-B 4534 comprising a power plant 4536 and auxiliary services unit 4538. The NP 4530 comprises all modules of the MNP-B 4528 that require impact shielding, including a control room module (not depicted). The auxiliary systems module 4432 comprises all modules of the MNP-B 4528 that do not require impact shielding.

That portion of the basin 4510 which houses the nuclear-materials portion of the MNP-B 4528 is overarched lengthwise by a portion 4540 of an impact shield (depicted in cross-section), this lengthwise portion 4540 of the impact shield being open at both ends. A rail transfer system 4542 connects the auxiliary unit 4532 of the MNP-D 4528 to an administration and security facility 4544 and thence to a cask yard 4546. A tank yard 4546 houses fluids such purified water for reactor operations and low-level liquid radioactive waste. The two power plants 4524, 4526 exchange steam with the NP 1530 via pipes. e.g., pipe 4548) supported by pipe bridges (e.g., pipe bridge 4550), and the resulting electricity distributed to a grid or other consumers via switchyards 4552, 4554. Preferably, one power plant 4524 exchanges steam with six (6) SMRs in the NP 4530, and the other power plant 4526 exchanges steam with the other six (6) SMRs in the NP 4530. Coolant water is collected from the environmental water body via inlets and outlets not depicted in FIG. 45. An emergency Response Facility 4556 acts as a backup control center for the MNP-D 4528 and its associated facilities, much as the Response Facility 4038 of FIG. 40A functions for deployment 4000.

Fluids are also conveyed between the tank yard 4546 and the auxiliary systems unit 4532 of the MNP-B 4528 by piping 4558. The impact shield around the NP 4430 is completed by two endcap shields (e.g., shield 4560) comprised by the MNP-B 4528. The rail transfer system 4542 enables exchange of nuclear and other materials (e.g., dry casks of cooled spent nuclear fuel. SMRs) between the onshore facilities and the auxiliary module 4532: in other embodiments, the orientation of the MNP-B 4528 is reversed, in which case casks. SMRs, and other loads are exchanged by flotation with the seaward end of the MNP-B 4528.

In an example, the deployment 4500 is advantageous over that of FIG. 40B when the costs of two additional basins and delivering power plants as Manufactured Plant Units are less than those of building traditional power plants onsite (as for deployment 4000 of FIG. 40B).

Variants of Reactor Refueling and Equipment

Figure 46:
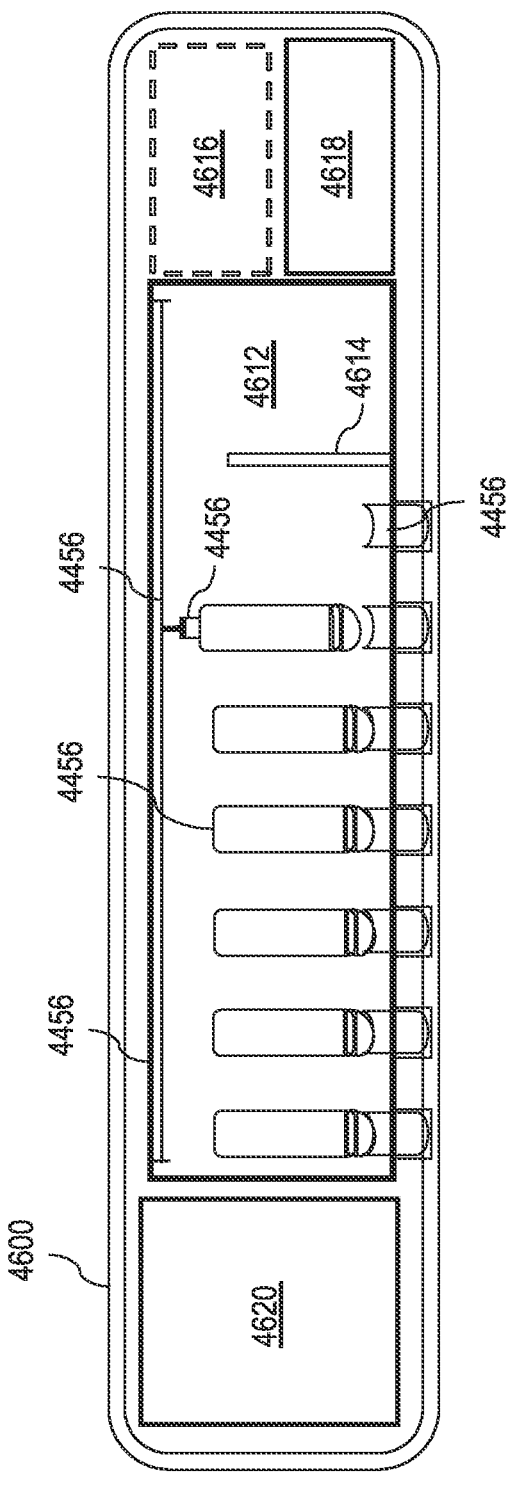
FIGS. 46, 47 and 48 are diagrammatic views of portions of an illustrative manufactured nuclear plant including a number of SMRs in which refueling of each SMR occurs outside of the SMR's containment in accordance with the present teachings.
Figure 47:
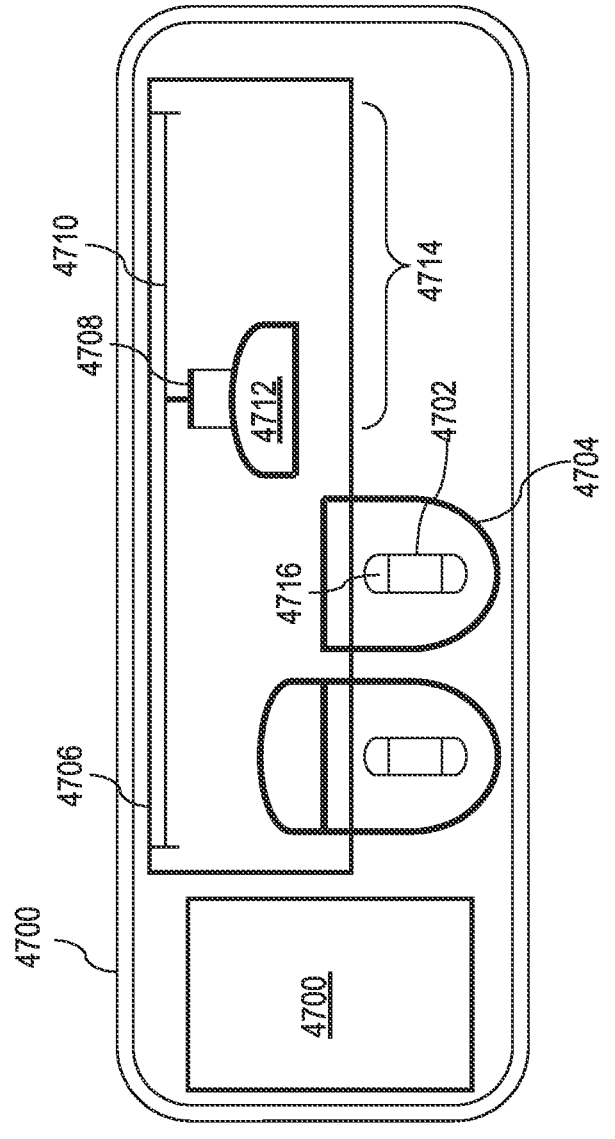
Figure 48:
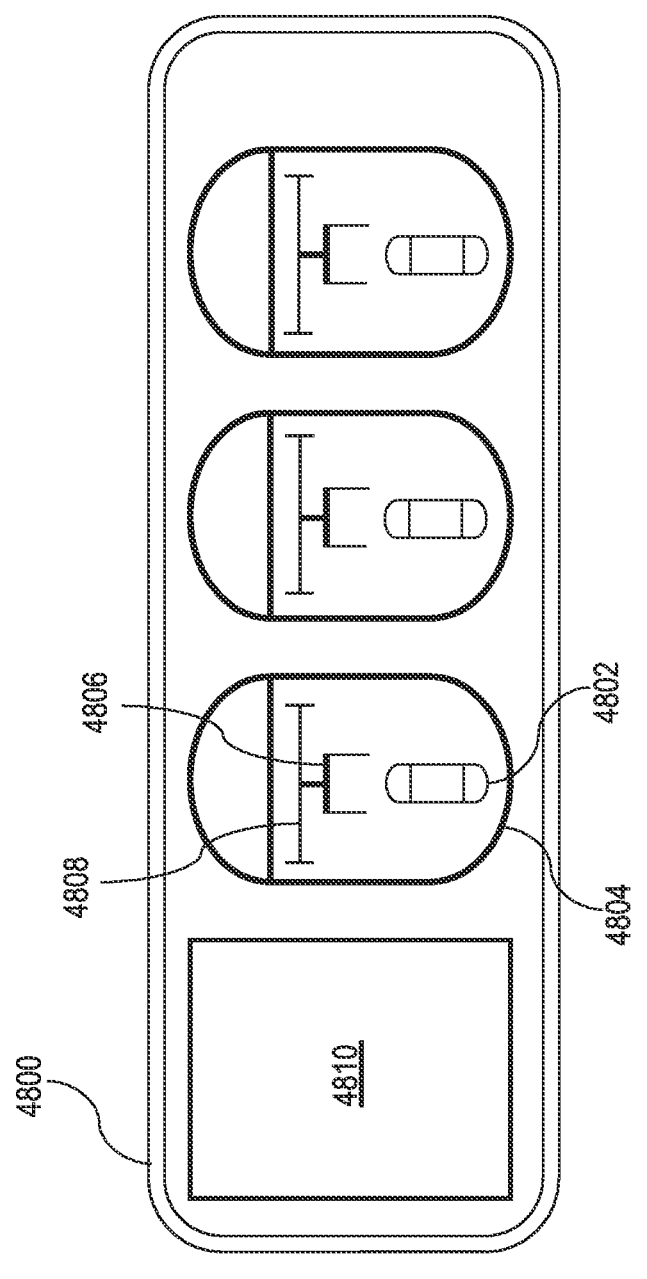

FIGS. 46-48 depict three illustrative classes of manufactured nuclear plant having different refueling systems.

FIG. 46 is a vertical cross-sectional schematic depiction of portions of an illustrative MNP 4600 comprising a number of SMRs in which refueling of each SMR occurs outside of the SMR's containment. MNP 4600 includes six (6) SMRs (e.g., SMR 4602) in a partly or wholly flooded reactor gallery 4604 that is of a self-contained, compact, moveable design each comprising its own containment structure. A crane mechanism 4608 moving on a rail system 4610 is capable of lifting each SMR and moving it within the gallery 4604. The gallery 4604 comprises a refueling and reactor transfer area 4612, separated partly from the rest of the gallery 4604 by a barrier 4614, in which an SMR may be partially disassembled (e.g., by opening of its containment) and refueled. Thus, refueling of SMRs in MNP 4600 is "extra-containment" in the sense that mechanisms external to the containment of each SMR carry out the refueling process. The MNP 4600 also comprises a reactor module transfer module 4616 that enables SMRs to be moved from the gallery 4602 outside the SMR 4600, or to be imported into the gallery 4602 from outside the SMR 4600. The SMR 4600 also comprises a number of other modules 4620, 4622 (e.g., a control room module, spent fuel storage module, power plant).

FIG. 47 is a vertical cross-sectional schematic depiction of portions of an illustrative MNP 4700 comprising a number of SMRs in which refueling of each SMR occurs outside of the SMR's containment. MNP 4700 includes two SMRs, each comprising a nuclear reactor within a pressure vessel (e.g., reactor pressure vessel 4702) within a stationary containment structure (e.g., containment 4704). The upper portion of each SMR is openable to a partly or wholly flooded upper refueling pool or gallery 4706. A crane mechanism 4708 moving on a rail system 4710 is capable of lifting the head of each containment vessel (e.g., containment vessel head 4712) and moving it about within the gallery 4706. The crane mechanism 4708 and/or a separate, dedicated fuel-handling machine (not depicted) is also capable of removing the heads of the reactor pressure vessels within the containment structures and of exchanging fuel bundles and other internal structures within each reactor pressure vessel. In a typical refueling procedure, the crane 4708 removes the containment vessel head 4712 from a containment 4704 and places it in a setdown area 4714: removes the reactor pressure vessel head 4716 from the reactor pressure vessel 4702 and places the head 4714 in the setdown area 4714: whereupon a fuel-handling machine (not depicted) proceeds to remove spent fuel from the reactor pressure vessel 4702 and emplace fresh fuel therein (fuel bundles not depicted). The SMR 4700 also comprises a number of other modules 4718 (e.g., a control room module, spent fuel storage module, power plant). In an alternative illustrative embodiment, each reactor pressure vessel is removed wholly from its containment vessel and moved by the crane 4708 to a refueling area in a manner similar to the movement of entire SMRs in FIG. 46.

FIG. 48 is a vertical cross-sectional schematic depiction of portions of an illustrative MNP 4800 comprising a number of SMRs in which refueling of each SMR occurs inside the SMR's containment. MNP 4800 includes three (3) SMRs, each comprising a nuclear reactor within a pressure vessel (e.g., reactor pressure vessel 4802) within a stationary containment structure (e.g., containment 4804). Each containment is partly or wholly flooded. Within each containment, a crane mechanism (e.g., crane 4806) moving on a rail system 4808 is capable of lifting the head of each pressure vessel (e.g., pressure vessel 4802) and moving it about within the containment 4804. The crane mechanism 4806 and/or a separate, dedicated fuel-handling machine (not depicted) is also capable of exchanging fuel bundles and other internal structures within each reactor pressure vessel. In a typical refueling procedure, the crane 4806 removes the head of pressure vessel 4802 and places it in a laydown area (not depicted) within the containment 4804, whereupon the crane 4806 or a fuel-handling machine (not depicted) proceeds to remove spent fuel from the reactor pressure vessel 4702 and emplace fresh fuel therein (fuel bundles not depicted). Fuel is transferred into and out of the containment 4804 through a horizontal flooded tube (not depicted), with standup-laydown mechanisms handling fuel bundles at each end of the tube. A gallery or chamber (not depicted) housing the containment vessels (e.g., containment 4804) within the MNP 4800 is partly or wholly flooded to enable the movement of hot fuel in an immersed condition. The SMR 4800 also comprises a number of other modules 4810 (e.g., a control room module, spent fuel storage module, power plant).

Illustrative Manufactured Nuclear Plant Unit Configurations

FIGS. 49-52 are illustrative of MNP configurations comprising various numbers and arrangements of SMRs.

Figure 49:
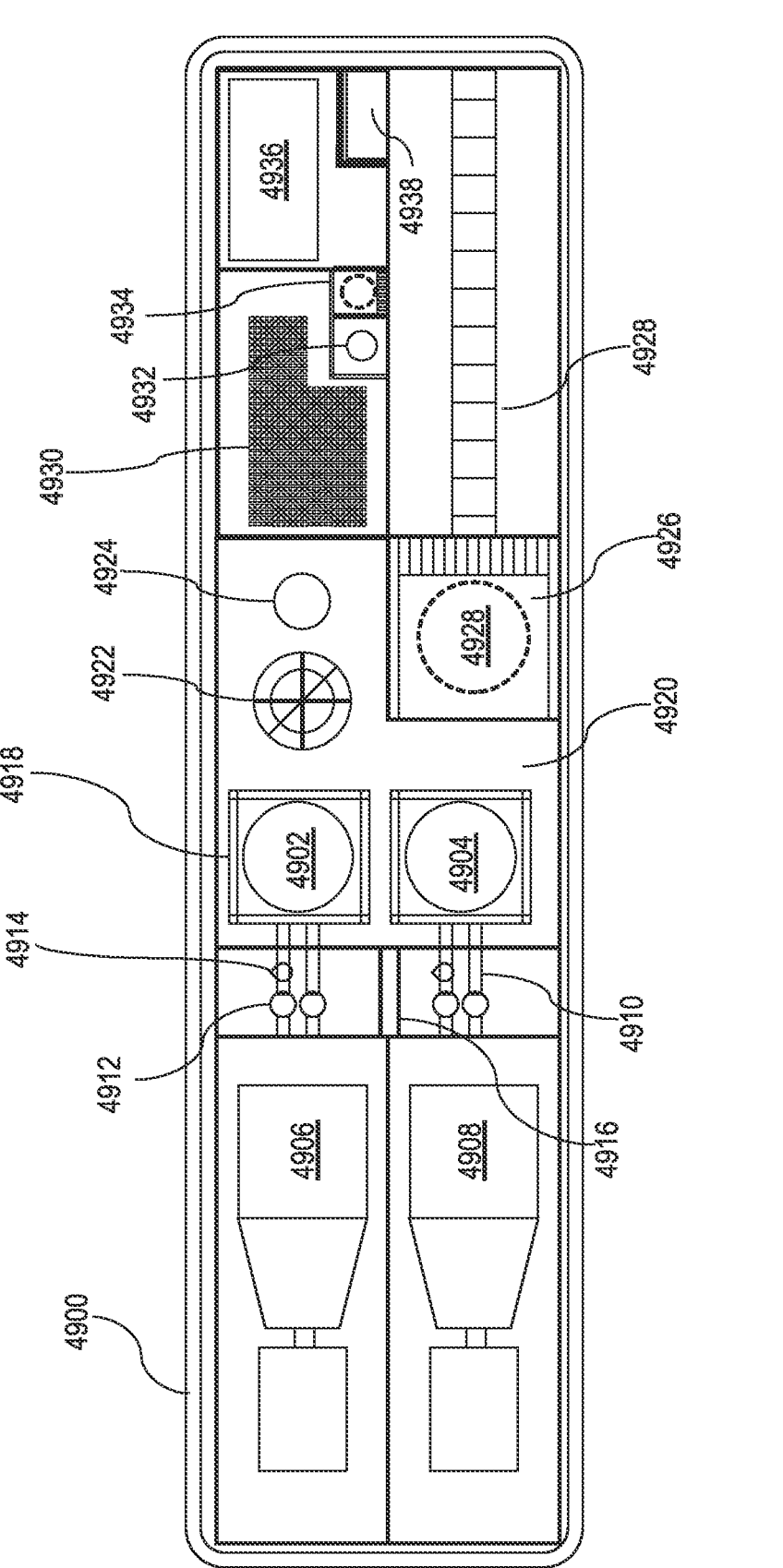
FIGS. 49, 50, 51 and 52 are diagrammatic views of portions of a manufactured nuclear plant including two small, self-contained SMRs each integrated with its own containment structure and small enough to be moved as a whole by appropriate machinery in accordance with the present teachings.

FIG. 49 is a horizontal cross-sectional schematic depiction of portions of an MNP 4900 comprising two small, self-contained SMRs 4902, 4904, i.e., SMRs each integrated with its own containment structure and small enough to be moved as a whole by appropriate machinery. MNP 4900 is barge-like in overall form, is (in an example) on the order of 80 m long. 10 m wide, and 20 m high, and is preferably delivered by flotation to its site of use. MNP 1900 also comprises two turbogenerator/condenser sets 4906, 4908, each, in an example, capable of 50 MW electrical output. Each SMR is connected to a turbogenerator set by a steam loop. e.g., loop 4914: each half of the steam loop can be shut off by a main steam isolation valve (e.g., valve 4912) and is protected by a safety relief valve (e.g., valve 4914). A bulkhead 4916 separates the steam line valve rooms so that a failure in one path does not disable or render inaccessible the other. Moreover, each SMR is housed in a containment vessel (CV) receptacle (e.g., receptacle 4918) that holds the reactor with its CV. The SMRs 4902, 4904 reside in partly or wholly flooded reactor hall 4920 which also contains a CV tool 4922 and a reactor pressure vessel (RPV) tool 24, and an overhead crane system (not depicted) capable of moving the SMRs 4902, 4904 and components thereof about in the hall 4920. During an illustrative refueling process, an SMR 4902 is moved from its receptacle 4918 into the CV tool 4922, where its containment is opened and its RPV transferred to the RPV tool 4924, where the RPV may be opened and fuel may be removed and inserted by a fuel-handling machine (not depicted). MNP 4900 also comprises a liftout pit 4926 where an SMR may be placed (indicated by dashed circle 4928) and a transfer system 4928 for movement of laid-down SMRs or other large objects (e.g., waste casks) either into or out of the MNP 4900, along with laydown/standup mechanism (not depicted) for reorienting SMRS entering or leaving the liftout pit 4926. MNP 4900 also comprises, among other modules, a spent-fuel storage area 4930, a dry-casking loading area 4932, a liftout pit 4934 for transferring casks to and from the conveyor mechanism 4928, a radioactive waste storage and handling module 4936, and a control room 4938.

Figure 50:
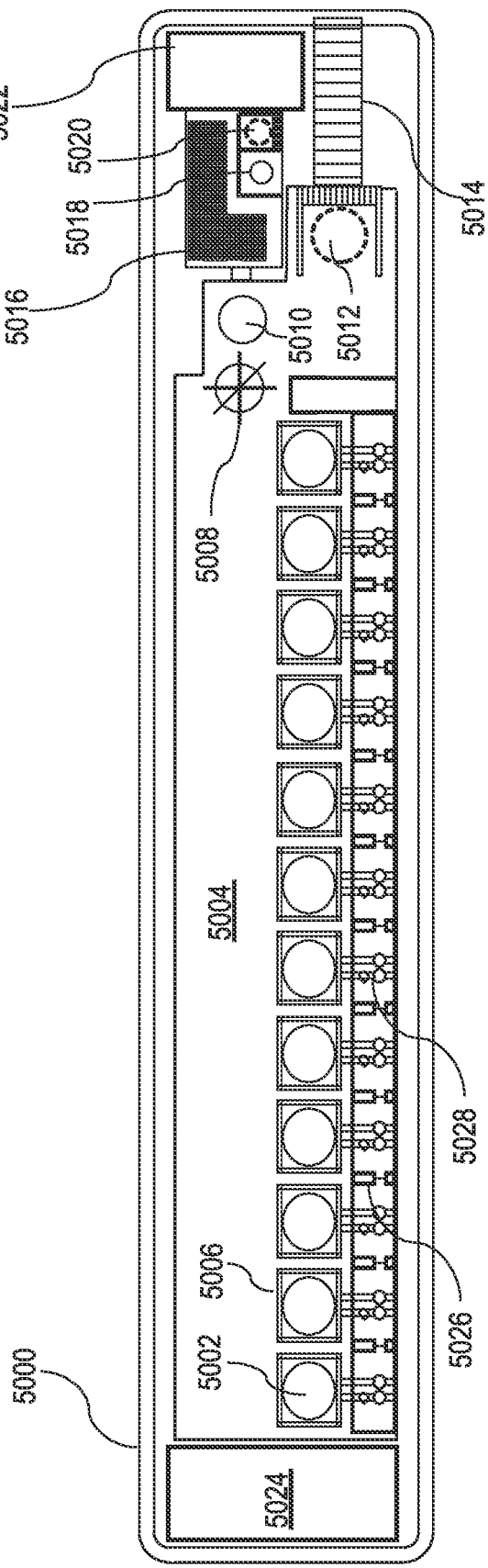

FIG. 50 is a horizontal cross-sectional schematic depiction of portions of an MNP 5000 comprising 12 small, self-contained SMRs (e.g., SMR 5002) housed in a partly or wholly flooded reactor hall or gallery 5004. MNP 5000 is barge-like in overall form, is (in an example) on the order of 150 m long. 15 m wide, and 20 m high, and is preferably delivered by flotation to its site of use. Each SMR is housed in a CV receptacle (e.g., receptacle 5006) that holds the reactor 5002 with its CV. The reactor hall 5004 also contains a CV tool 5008 and a reactor pressure vessel (RPV) tool 5010, and an overhead crane system (not depicted) capable of moving the SMRs and components thereof about in the hall 5004. During an illustrative refueling process, an SMR 5002 is moved from its receptacle 5006 into the CV tool 5008, where its containment is opened and its RPV transferred to the RPV tool 5010, where the RPV may be opened and fuel may be removed and inserted by a fuel-handling machine (not depicted). MNP 5000 also comprises a liftout pit 5012 where an SMR may be placed and a conveyor system 5014 for movement of laid-down SMRs or other large objects either into or out of the MNP 5000, along with a laydown/standup mechanism (not depicted) for reorienting SMRs entering or leaving the liftout pit 5012. MNP 5000 also comprises, among other modules, a spent-fuel storage area 5016, a dry-casking loading area 5018, a liftout pit 5020 for transferring casks to and from the conveyor mechanism 5014, a radioactive waste storage and handling module 5022, and a control room 5024. Each SMR is equipped with a steam loop (only partially depicted. e.g., loop 5026) that is connected to a turbogenerator set of an external power plant (not depicted in FIG. 50): the loops are valved as described for MNP 4900 of FIG. 49. Eleven bulkeads (e.g., 5028) separate the 12 steam line valve rooms so that a failure in one path does not disable or render inaccessible the other. Both MNP 4900 of FIG. 49 and MNP 5000 of FIG. 50 would be preferable for deployments in which transport of the MNP was constrained by width of a river, canal, or other flotation channels.

Figure 51:
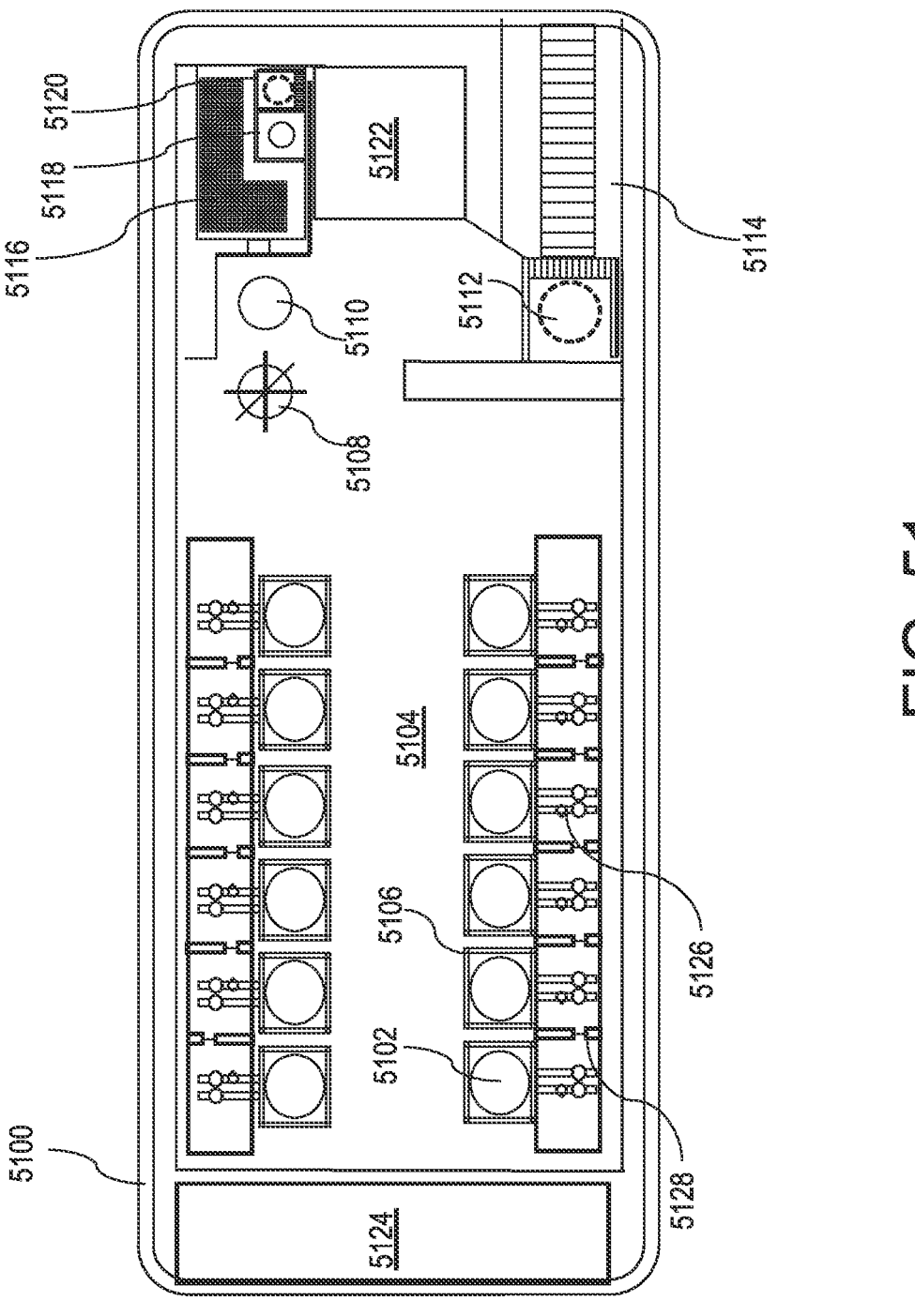

FIG. 51 is a horizontal cross-sectional schematic depiction of portions of an MNP 5100 comprising 12 small, self-contained SMRs (e.g., SMR 5102) in two rows of 6 housed in a partly or wholly flooded reactor hall or gallery 5104. MNP 5100 is barge-like in overall form, is (in an example) on the order of 80 m long. 30 m wide, and 20 m high, and is preferably delivered by flotation to its site of use. Each SMR is housed in a CV receptacle (e.g., receptacle 5106) that holds the reactor 5102 with its CV. The reactor hall 5104 also contains a CV tool 5108, reactor pressure vessel (RPV) tool 5110, and an overhead crane system (not depicted) capable of moving the SMRs and components thereof about in the hall 5104, a liftout pit 5112, a conveyor system 5114, a laydown/standup mechanism (not depicted) for reorienting SMRs entering or leaving the liftout pit 5112, a spent-fuel storage area 5116, a dry-casking loading area 5118, a liftout pit 5120 for transferring casks to and from the conveyor mechanism 5114, a radioactive waste storage and handling module 5122, and a control room 5124. The functions of these units are similar to those of corresponding units in MNP 5000 of FIG. 50. Other units may also be comprised. Each SMR is equipped with a steam loop (only partially depicted. e.g., loop 5126) that is connected to a turbogenerator set of an external power plant, where two external power plants (not depicted in FIG. 51) are contemplated, one for each row of six SMRs: the loops are valved as described for MNP 4900 of FIG. 49. Ten bulkheads (e.g., 5128) separate the 12 steam line valve rooms so that a failure in one path does not disable or render inaccessible the other. MNP 5100 of FIG. 51 would be preferable for deployments in which transport of the MNP was not constrained by the width of a flotation channel. Since MNP 5100 is more compact than the elongated MNPs 4900 and 5000, by general principles of mechanical support MNP 5100 would be less bulky and costly for a given SMR type and level of seaworthiness.

Figure 52:
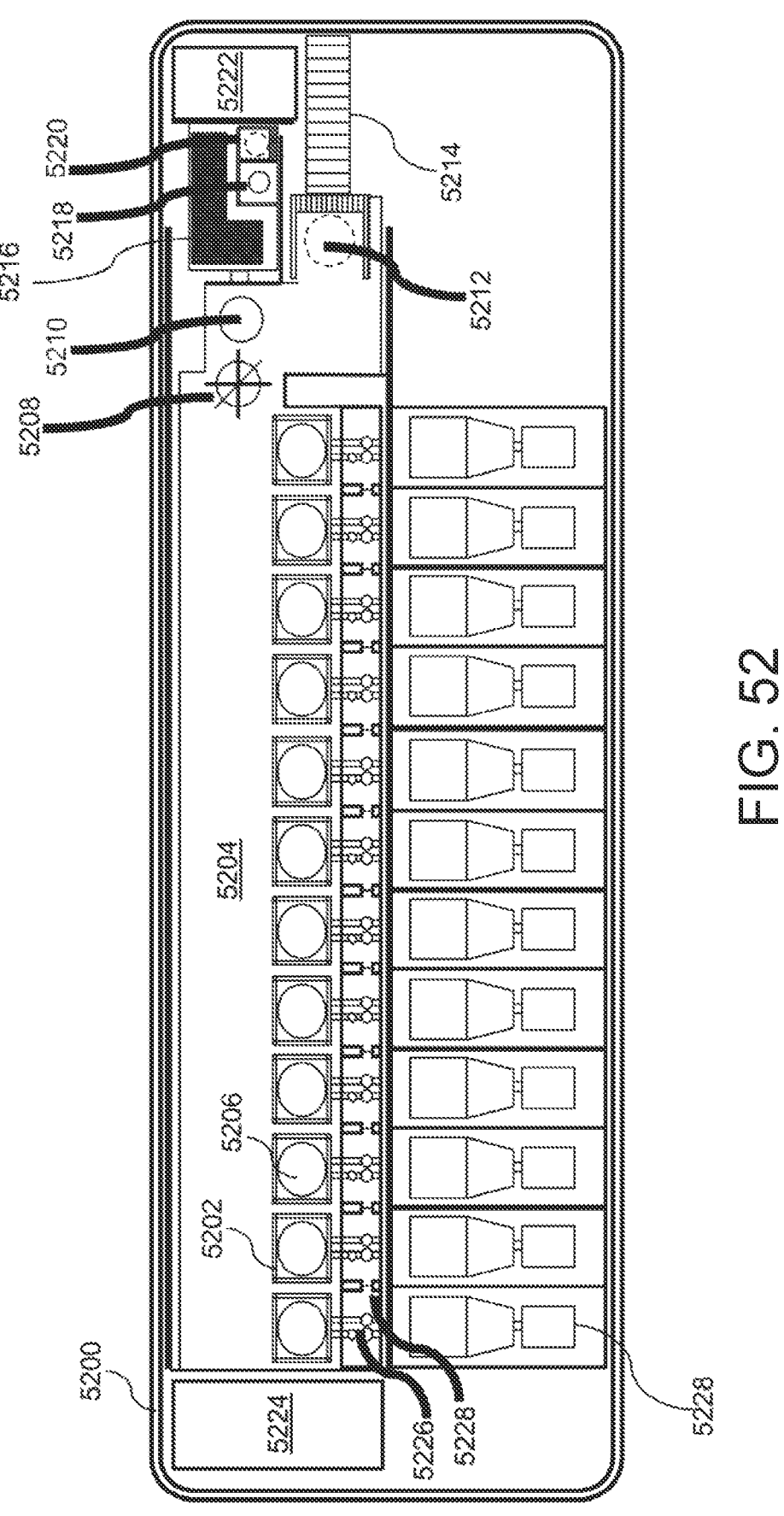

FIG. 52 is a horizontal cross-sectional schematic depiction of portions of an MNP 5200 comprising 12 small, self-contained SMRs (e.g., SMR 5202) housed in a partly or wholly flooded reactor hall or gallery 5204. MNP 5100 is barge-like in overall form, is (in an example) on the order of 150 m long. 80 m wide, and 20 m high, and is preferably delivered by flotation to its site of use. Each SMR is housed in a CV receptacle (e.g., receptacle 5206) that holds the reactor 5202 with its CV. The reactor hall 5204 also contains a CV tool 5208, reactor pressure vessel (RPV) tool 5210, and an overhead crane system (not depicted) capable of moving the SMRs and components thereof about in the hall 5204, a liftout pit 5212, a conveyor system 5214, a laydown/standup mechanism (not depicted) for reorienting SMRs entering or leaving the liftout pit 5212, a spent-fuel storage area 5216, a dry-casking loading area 5218, a liftout pit 5220 for transferring casks to and from the conveyor mechanism 5114, a radioactive waste storage and handling module 5222, and a control room 5224. The functions of these units are similar to those of corresponding units in MNP 5000 of FIG. 50. Other units may also be comprised. Each SMR is equipped with a steam loop (only partially depicted. e.g., loop 5226) that is connected to a turbogenerator set (e.g., turbogenerator set 5228): the loops are valved as described for MNP 4900 of FIG. 49. Eleven bulkheads (e.g., 5230) separate the 12 steam line valve rooms. MNP 5200 of FIG.

52 would be preferable for deployments in which transport of the MNP was not constrained by the width of a flotation channel and where it is desirable to integrate a PP with an NP.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented, in part or in whole, as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions, and the like. The processor may be or may include a signal processor, digital processor, embedded processor, microprocessor or any variant such as a co-processor (math co-processor, graphic co-processor, communication co-processor, and the like) and the like that may directly or indirectly facilitate execution of program code or program instructions stored thereon.

In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM. DVD, memory, hard disk, flash drive. RAM. ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack. RAM. ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service ("SaaS"), platform as a service ("PaaS"), and/or infrastructure as a service ("IaaS").

The methods, program codes, and instructions described herein and elsewhere may be implemented, in part or in whole, on a cellular network having multiple cells. The cellular network may either be frequency division multiple access ("FDMA") network or code division multiple access ("CDMA") network. The cellular network may include mobile devices, cell sites, base stations, repeaters, antennas, towers, and the like. The cell network may be a GSM, GPRS, 3G. EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer. RAM. ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time: semiconductor storage known as random access memory ("RAM"): mass storage typically for more permanent storage, such as optical discs, forms of magnetic storage like hard disks, tapes, drums, cards and other types: processor registers, cache memory, volatile memory, nonvolatile memory: optical storage such as CD. DVD: removable media such as flash memory (e.g., USB sticks or keys), floppy disks, magnetic tape, paper tape, punch cards, standalone RAM disks, zip drives, removable mass storage, off-line, and the like: other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the Figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a generalpurpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been provided in connection with the many embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising." "having." "including." and "containing" are to be construed as open-ended terms (i.e., meaning "including, but not limited to.") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiments and examples, but by all embodiments and examples within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present disclosure, the scope of the invention is reflected by the breadth of the claims below rather than interpreted in light of the embodiments described above.

What is claimed is:

1. A nuclear power plant unit comprising:
a hull module comprising at least one structural, load bearing member forming a hull of the nuclear power plant unit;
a nuclear plant module comprising at least one nuclear reactor, and a support structure configured to transfer load to the hull of the nuclear power plant unit;
a conversion module for converting output from the at least one nuclear reactor to electrical power;
an electrical interface for at least one of transmitting the electrical power generated by the at least one nuclear reactor or powering a system of the nuclear power plant unit;
a communications interface for communications internal or external to the nuclear power plant unit;

a user interface that is configured to permit a user to access a system of the nuclear power plant unit; and
a network interface for data communications to or from the nuclear power plant unit, wherein the nuclear power plant unit is subdivided into at least one arrangement of the hull module, the nuclear plant module, and the conversion module at a start of transport and is configured for rearrangement of the at least one arrangement during transport, and
wherein an interface system includes the electrical interface, the communications interface, the user interface and the network interface, and wherein the interface system is configured to provide human and machine interfaces in the at least one arrangement.

2. The nuclear power plant unit of claim 1, further comprising a physical interface for connecting structural elements of the nuclear power plant unit.

3. The nuclear power plant unit of claim 1, further comprising at least one functional requirement, wherein the at least one functional requirement includes at least one of a regulatory requirement, a constraint on shipyard size, a constraint on depth during transportation, a constraint on height during transportation, a water level requirement, or a power output requirement.

4. The nuclear power plant unit of claim 1, wherein the conversion module includes at least one of a turbine and condenser module for converting steam to electrical power or a balance-of-plant module for converting heat to electrical power.

5. A nuclear power plant unit comprising:
a hull module comprising at least one structural, load bearing member forming a hull of the nuclear power plant unit;
a nuclear plant module comprising at least one nuclear reactor, and a support structure configured to transfer load to the hull of the nuclear power plant unit;
a propulsion module for moving the nuclear power plant unit;
an electrical interface for at least one of transmitting electrical power generated or powering a system of the nuclear power plant unit;
a communications interface for communications internal or external to the nuclear power plant unit;
a user interface that is configured to permit a user to access a system of the nuclear power plant unit;
a network interface for data communications to or from the nuclear power plant unit;
an ownership interface for legal arrangements of the nuclear power plant unit; and
an implementation system for association with at least one of builders or maintainers of the nuclear power plant unit,
wherein the nuclear power plant unit is subdivided into one of at least two arrangements of the support structure, the nuclear plant module, and the propulsion module at a start of transport and is configured for rearrangement of the support structure, the nuclear plant module, and the propulsion module during transport,
wherein the at least two arrangements are configured to enable interconnection in at least two alternative geometries based on at least one functional requirement for the nuclear power plant unit, and
wherein each of the at least two alternative geometries is configured to provide human and machine interfaces to at least one of the electrical interface, the communications interface, the user interface, the network interface, or the ownership interface.

6. The nuclear power plant unit of claim 5, wherein the support structure includes an interface element configured to interface with the hull module.

7. The nuclear power plant unit of claim 5, further comprising a physical interface for connecting the support structure, the hull module, the at least one nuclear reactor, and the propulsion module.

8. The nuclear power plant unit of claim 5, further including a functional requirement, wherein the functional requirement includes at least one of a regulatory requirement, a constraint on shipyard size, a constraint on depth during transportation, a constraint on height during transportation, a water level requirement, or a power output requirement.

9. The nuclear power plant unit of claim 5, wherein the hull module further includes at least two of a stability skirt block module, a water intake block module, a side hull module, a ballast tank module, and a base plate block module.

\* \* \* \* \*